US009505510B2

(12) United States Patent
Hatherell

(10) Patent No.: US 9,505,510 B2
(45) Date of Patent: Nov. 29, 2016

(54) BEVERAGE CARBONATING SYSTEM AND METHOD FOR CARBONATING A BEVERAGE

(71) Applicant: Bonne O Inc., Toronto (CA)

(72) Inventor: Darren Hatherell, Toronto (CA)

(73) Assignee: Bonne O Inc., Toronto, Ontario (CA)

( * ) Notice: Subject to any disclaimer, the term of this patent is extended or adjusted under 35 U.S.C. 154(b) by 143 days.

(21) Appl. No.: 14/594,754

(22) Filed: Jan. 12, 2015

(65) Prior Publication Data

US 2015/0125578 A1    May 7, 2015

Related U.S. Application Data

(63) Continuation of application No. 13/929,372, filed on Jun. 27, 2013, now Pat. No. 8,985,561, which is a continuation-in-part of application No. 13/782,449, filed on Mar. 1, 2013, now abandoned, which is a continuation-in-part of application No. 13/537,476, filed on Jun. 29, 2012, now abandoned.

(51) Int. Cl.
*B01F 3/04* (2006.01)
*A23L 2/54* (2006.01)
(Continued)

(52) U.S. Cl.
CPC ............. *B65B 31/025* (2013.01); *A23L 2/54* (2013.01); *A23L 2/56* (2013.01); *B01F 3/04794* (2013.01); *B65B 57/005* (2013.01); *B65D 1/06* (2013.01); *B65D 85/73* (2013.01); *A23V 2002/00* (2013.01)

(58) Field of Classification Search
CPC .. B01F 3/04; B01F 3/04099; B01F 3/04106; B01F 3/04794; A23L 2/54; A23L 2/00; A23L 2/56; B65D 1/06; B65D 85/73

USPC ............ 426/474, 477; 99/323.1, 323.2; 261/DIG. 7
See application file for complete search history.

(56) References Cited

U.S. PATENT DOCUMENTS 565,922 A    8/1896    Prax
1,577,235 A    3/1926    Hucks
(Continued)

FOREIGN PATENT DOCUMENTS

CN        202067824       12/2011
DE        102007001609    7/2008
(Continued)

OTHER PUBLICATIONS

Priority document made available under the Patent Cooperation Treaty (PCT) for PCT/US2011/023157 (WO2011094677): U.S. Appl. No. 61/337,184, filed Feb. 1, 2010.
(Continued)

*Primary Examiner* — Robert A Hopkins
(74) *Attorney, Agent, or Firm* — Bereskin & Parr LLP/S.E.N.C.R.L., s.r.l.

(57) ABSTRACT

A beverage carbonation system, container, carbonator and method for carbonating a beverage are provided. The beverage carbonation system has a container that is removably engageable with a carbonator. The container has a container outlet valve and a container inlet valve that are fluidly engageable with a carbonator outlet port and carbonator inlet port, respectively. At least one pump transfers liquid and carbon dioxide gas between a container chamber and a carbonation chamber when the container is engaged with the carbonator, thereby carbonating the liquid. When the container is disengaged from the carbonator, the container outlet valve and the container inlet valve are closed to fluidly seal the container containing the carbonated liquid.

20 Claims, 32 Drawing Sheets

(51) Int. Cl.
  *B65D 1/06* (2006.01)
  *B65B 31/02* (2006.01)
  *B65D 85/73* (2006.01)
  *A23L 2/56* (2006.01)
  *B65B 57/00* (2006.01)

(56) References Cited

U.S. PATENT DOCUMENTS

| | | |
|---|---|---|
| 1,587,320 A | 6/1926 | Hucks |
| 1,975,722 A | 10/1934 | Hucks |
| 2,102,920 A | 12/1937 | Savage |
| 2,205,147 A | 6/1940 | Madsen |
| 2,603,569 A | 7/1952 | Alther et al. |
| 2,742,363 A | 4/1956 | Hughes |
| 2,851,359 A | 9/1958 | Diller |
| 2,851,360 A | 9/1958 | Diller |
| 2,851,361 A | 9/1958 | Diller |
| 2,888,040 A | 5/1959 | Terwilliger et al. |
| 2,953,459 A | 9/1960 | Diller |
| 2,975,603 A | 3/1961 | Barnes et al. |
| D201,497 S | 6/1965 | Ninger |
| 3,241,977 A | 3/1966 | Mitchell et al. |
| 3,441,417 A | 4/1969 | Feldman et al. |
| 3,467,526 A | 9/1969 | Mitchell et al. |
| 3,476,520 A | 11/1969 | Hovey |
| 3,492,671 A | 1/1970 | Hovey |
| 3,556,803 A | 1/1971 | Ehrreich III et al. |
| 3,576,644 A | 4/1971 | Anderson et al. |
| 3,667,962 A | 6/1972 | Fritzberg et al. |
| D224,591 S | 8/1972 | Roberts |
| 3,687,684 A | 8/1972 | Wentworth et al. |
| D225,992 S | 1/1973 | Langauer |
| 3,723,614 A | 3/1973 | Langauer |
| D229,049 S | 11/1973 | Roberts |
| 3,881,636 A | 5/1975 | D'Aubreby |
| 3,888,998 A | 6/1975 | Sampson et al. |
| 3,926,342 A | 12/1975 | Selvia et al. |
| 3,992,493 A | 11/1976 | Whyte et al. |
| 4,007,134 A | 2/1977 | Liepa et al. |
| 4,009,285 A | 2/1977 | Spooner |
| 4,025,655 A | 5/1977 | Whyte et al. |
| 4,040,342 A * | 8/1977 | Austin ............... B01J 7/02 220/293 |
| 4,110,255 A | 8/1978 | Liepa et al. |
| 4,123,390 A | 10/1978 | Sherman et al. |
| 4,147,808 A | 4/1979 | Liepa et al. |
| 4,186,215 A | 1/1980 | Buchel |
| 4,215,104 A | 7/1980 | Ullman et al. |
| 4,251,473 A | 2/1981 | Gilbey |
| 4,285,977 A | 8/1981 | Yezek et al. |
| D260,477 S | 9/1981 | Jones |
| 4,316,409 A | 2/1982 | Adams et al. |
| 4,399,081 A | 8/1983 | Mabb |
| 4,458,584 A | 7/1984 | Annese et al. |
| 4,460,612 A | 7/1984 | Saleeb et al. |
| 4,466,342 A | 8/1984 | Basile et al. |
| 4,475,448 A | 10/1984 | Shoaf et al. |
| 4,520,950 A | 6/1985 | Jeans |
| 4,636,337 A | 1/1987 | Gupta et al. |
| 4,650,669 A | 3/1987 | Alexander et al. |
| 4,695,468 A | 9/1987 | Boston |
| 4,719,056 A | 1/1988 | Scott |
| 4,760,138 A | 7/1988 | So et al. |
| 4,760,865 A | 8/1988 | Rilett |
| D298,061 S | 10/1988 | Flury et al. |
| 4,785,973 A | 11/1988 | Kobe |
| 4,786,519 A | 11/1988 | Gupta |
| 4,854,343 A | 8/1989 | Rilett |
| 4,871,571 A | 10/1989 | Jensen et al. |
| 4,927,569 A | 5/1990 | Robinson |
| 5,021,219 A | 6/1991 | Rudick et al. |
| 5,112,539 A | 5/1992 | Parnet |
| 5,174,901 A | 12/1992 | Smith |
| 5,182,084 A | 1/1993 | Plester |
| 5,192,513 A * | 3/1993 | Stumphauzer ....... A23L 2/54 222/129.1 |
| 5,226,450 A | 7/1993 | Lambourn |
| 5,260,081 A | 11/1993 | Stumphauzer et al. |
| 5,300,308 A | 4/1994 | Louridas |
| 5,325,765 A | 7/1994 | Sylvan et al. |
| 5,350,587 A | 9/1994 | Plester |
| 5,353,958 A | 10/1994 | Hawkins |
| 5,460,846 A | 10/1995 | Stumphauzer et al. |
| 5,549,037 A | 8/1996 | Stumphauzer et al. |
| 5,743,433 A | 4/1998 | Hawkins et al. |
| D404,231 S | 1/1999 | Woodring |
| 5,870,944 A | 2/1999 | Vander Zalm et al. |
| 5,918,768 A | 7/1999 | Ford |
| 6,113,080 A | 9/2000 | Kazuma |
| D440,650 S | 4/2001 | Hite et al. |
| D452,433 S | 12/2001 | Lazaris |
| 6,505,758 B2 | 1/2003 | Black et al. |
| 6,607,762 B2 | 8/2003 | Lazaris et al. |
| D485,942 S | 1/2004 | McLeish |
| D504,325 S | 4/2005 | Vovan |
| D505,335 S | 5/2005 | Grenda |
| 6,926,170 B2 | 8/2005 | Groesbeck |
| D515,880 S | 2/2006 | Lerner |
| D535,390 S | 1/2007 | Stawski et al. |
| 7,213,505 B2 | 5/2007 | Kollep |
| D560,492 S | 1/2008 | Markowicz et al. |
| D566,388 S | 4/2008 | Nevins |
| D586,397 S | 2/2009 | Farnworth et al. |
| D590,596 S | 4/2009 | Dretzka |
| D595,155 S | 6/2009 | Larson |
| D610,406 S | 2/2010 | Rauckman |
| D613,031 S | 4/2010 | Pawlowski et al. |
| 7,706,671 B2 | 4/2010 | Brown |
| D619,240 S | 7/2010 | Swagler et al. |
| D621,718 S | 8/2010 | Mehdizadeh |
| 7,798,055 B2 | 9/2010 | Mandralis et al. |
| D626,214 S | 10/2010 | Spengler |
| 7,838,056 B2 | 11/2010 | Forgac et al. |
| D633,341 S | 3/2011 | Smyers |
| D641,863 S | 7/2011 | Spengler |
| D641,864 S | 7/2011 | Spengler |
| 7,975,988 B2 | 7/2011 | Thomson et al. |
| D655,165 S | 3/2012 | Jensen et al. |
| D672,029 S | 12/2012 | Inoue |
| 2002/0136816 A1 | 9/2002 | Kim |
| 2003/0007923 A1 | 1/2003 | Copenhafer et al. |
| 2003/0211204 A1 | 11/2003 | Fields et al. |
| 2004/0245279 A1 | 12/2004 | Bradley et al. |
| 2005/0181108 A1 | 8/2005 | Kushner et al. |
| 2006/0112831 A1 | 6/2006 | Greenwald et al. |
| 2007/0012051 A1 | 1/2007 | Acton et al. |
| 2007/0175927 A1 | 8/2007 | Ozanne et al. |
| 2008/0050500 A1 | 2/2008 | Muranishi et al. |
| 2008/0115674 A1 | 5/2008 | Huang et al. |
| 2009/0121364 A1 | 5/2009 | Scott |
| 2009/0136632 A1 | 5/2009 | Gutwein et al. |
| 2009/0219140 A1 | 9/2009 | Guard et al. |
| 2009/0223375 A1 | 9/2009 | Verbeek |
| 2010/0003384 A1 | 1/2010 | Iacovone et al. |
| 2010/0018406 A1 | 1/2010 | Koopman et al. |
| 2010/0028495 A1 | 2/2010 | Novak et al. |
| 2010/0034889 A1 | 2/2010 | Rau et al. |
| 2010/0050880 A1 | 3/2010 | Suter |
| 2010/0129490 A1 | 5/2010 | Williams et al. |
| 2010/0166915 A1 | 7/2010 | Mathisen et al. |
| 2010/0209582 A1 | 8/2010 | Wyss et al. |
| 2010/0288131 A1 | 11/2010 | Kilber et al. |
| 2011/0020500 A1 | 1/2011 | Eichler et al. |
| 2011/0020508 A1 | 1/2011 | Santoiemmo |
| 2011/0076361 A1 | 3/2011 | Peterson et al. |
| 2011/0226343 A1 | 9/2011 | Novak et al. |
| 2011/0244040 A1 | 10/2011 | Ono et al. |
| 2012/0082769 A1 | 4/2012 | Singh |
| 2012/0292790 A1 | 11/2012 | Tatera |
| 2014/0004240 A1 | 1/2014 | Hatherell |
| 2014/0065266 A1 | 3/2014 | Shalev |
| 2014/0070431 A1 | 3/2014 | Hatherell |

(56) References Cited

U.S. PATENT DOCUMENTS

2014/0079856 A1 3/2014 Hatherell
2014/0141078 A1 5/2014 Slaboden

FOREIGN PATENT DOCUMENTS

| EP | 2341008 | 4/2013 |
|---|---|---|
| GB | 323102 | 12/1929 |
| GB | 2038953 | 7/1980 |
| GB | 2139910 | 11/1984 |
| WO | 94/16579 | 8/1994 |
| WO | 2004072351 | 8/2004 |
| WO | 2005079361 | 9/2005 |
| WO | 2008124851 | 10/2008 |
| WO | 2009114119 | 9/2009 |
| WO | 2011094677 | 8/2011 |
| WO | 2014000092 | 1/2014 |
| WO | 2014033705 | 3/2014 |

OTHER PUBLICATIONS

Written Opinion; PCT Application No. PCT/CA2013/000605; Dated Oct. 1, 2013.
International Search Report; PCT Application No. PCT/CA2013/000605; Dated Oct. 1, 2013.
Vignesh Ramachandran, "SPRiZZi Drink Machine Is Like a Keurig for Soda"; Webpages from http://mashable.com/2013/05/02/sprizzi-drink-machine; Published May 2, 2013.
Sprizzi Drink-Co; Webpages from http://www.sprizzidrink.com; Accessed Dec. 4, 2013.
Michael Breault; "Kickstarter: Drink Machine by SPRiZZi . . . The Ultimate Beverage Solution!"; Webpages from http://www.kickstarter.com/projects/sprizzi/drink-machine-by-sprizzi-the-ultimate-beverage-sol.com; Earliest update noted in document: May 1, 2013.
Sprizzi Drink-Co.; Webpages archived from www.sprizzidrink.com, by the "Internet Archive Wayback Machine" at http://web.archive.org/web/20120615195921/http://www.sprizzidrink.com; Archive Date: Jun. 15, 2012.
Sodastream; Webpages from http://www.sodastream.ca/en/index.php; Accessed Dec. 4, 2013.
Wikipedia, "Sodastream"; Webpages from http://en.wikipedia.org/wiki/Sodastream; Modified Jun. 3, 2013; Accessed Jul. 18, 2013.
U.S. Appl. No. 61/693,820, filed Aug. 28, 2012.
Office Action; Design U.S. Appl. No. 29/447,447; Mailed Jul. 2, 2014.
Office Action; Design U.S. Appl. No. 29/484,536; Mailed Jul. 1, 2014.
Written Opinion; International Application No. PCT/CA2013/001067; Dated Apr. 8, 2014.
International Search Opinion; International Application No. PCT/CA2013/001067; Dated Apr. 8, 2014.
Watson, Elaine; Green Mountain Coffee Roasters: 'Game-changing' Keurig 2.0 will tackle unlicensed K-Cup challenge; Dated Nov. 22, 2013; webpages from http://www.foodnavigator-usa.com/Manufacturers/Green-Mountain-Coffee-Roasters-Game-changing-Keurig-2.0-will-tackle-unlicensed-K-Cup-challenge.
Notice of Allowance; Design U.S. Appl. No. 29/469,588; mailed Apr. 10, 2014.
Kelley, Brian; Sullivan, Kevin; Hartley, Kevin "Innovation Pipeline", KeurigTM Green MountainTM Investor Presentation; first accessed online Sep. 10, 2013 at http://investor.keurig-greenmountain.com/investorday.cfm.

* cited by examiner

BEVERAGE CARBONATING SYSTEM AND METHOD FOR CARBONATING A BEVERAGE

RELATED APPLICATION

This application is a continuation of U.S. patent application Ser. No. 13/929,372, filed Jun. 27, 2013, which is a continuation-in-part of U.S. patent application Ser. No. 13/782,449, filed Mar. 1, 2013, which is a continuation-in-part of U.S. patent application Ser. No. 13/537,476, filed Jun. 29, 2012. The entire contents of each of the aforementioned applications are hereby incorporated by reference.

FIELD

The described embodiments relate to a beverage carbonation system, container and carbonator, and a method for carbonating a beverage.

BACKGROUND

Carbonated beverages such as, for example, sodas and sparkling water are popular with consumers. Many carbonated beverages are prepared at a factory and shipped to stores, where consumers travel to purchase them. Each of the preparation, shipping and travel may contribute to a higher cost per beverage for the consumer. Accordingly, it may be desirable to have a beverage carbonation system usable by a consumer in his/her home, for example. This may also be more convenient for a consumer.

Beverage carbonation systems are known in the art. See, for example, United States Patent Application No. 2011/0226343 to Novak et al. and U.S. Pat. No. 5,260,081 to Stumphauzer et al.

When exposed to the atmosphere, a carbonated beverage will eventually lose its "freshness" or "go flat". It is desirable to provide a beverage carbonation system that may be used in the home and allows a user to prepare a carbonated beverage for immediate or later consumption, while still maintaining a sufficient level of carbonation or "freshness" for the later consumption.

SUMMARY

In a first aspect, some embodiments of the invention provide a beverage carbonation system comprising a container and a carbonator removably engageable with the container. The container comprises a shell defining a container chamber for holding a liquid. The container also comprises a container outlet valve having a closed position and an open position, and a container inlet valve having a closed position and an open position. The carbonator comprises a carbonator outlet port fluidly engageable with the container outlet valve when the container outlet valve is in the open position. The carbonator outlet port is fluidly connected to a carbonation chamber containing a carbon dioxide source that produces a carbon dioxide gas. The carbonator further comprises at least one pump in fluid communication with the container chamber and the carbonation chamber to transfer the liquid between the container chamber and the carbonation chamber. The carbonator also comprises a carbonator inlet port fluidly engageable with the container inlet valve when the container inlet valve is in the open position. The carbonator inlet port is in fluid communication with the carbonation chamber to transfer the carbon dioxide gas between the carbonation chamber and the container chamber when the container is engaged with the carbonator, thereby carbonating the liquid. When the container is disengaged from the carbonator, the container outlet valve and the container inlet valve are closed to fluidly seal the container containing the carbonated liquid.

In some embodiments, the carbonator further comprises a port actuator connected to one of the carbonator inlet port and the carbonator outlet port to fluidly engage the one of the carbonator inlet port and the carbonator outlet port with a respective one of the container inlet valve and the container outlet valve.

In some embodiments, the port actuator further comprises a port holder connected to the one of the carbonator inlet port and the carbonator outlet port, and a port driver configured to selectively act upon the port holder to move the one of the carbonator inlet port and the carbonator outlet port into fluid engagement with the respective one of the container inlet valve and the container outlet valve.

In some embodiments, the carbonator further comprises a second port actuator connected to an other one of the carbonator inlet port and the carbonator outlet port to fluidly engage the other one of the carbonator inlet port and the carbonator outlet port with a respective other one of the container inlet valve and the container outlet valve.

In some embodiments, the port driver that acts upon the port holder, to move the one of the carbonator inlet port and the carbonator outlet port into fluid engagement with the respective one of the container inlet valve and the container outlet valve moves an other one of the carbonator inlet port and the carbonator outlet port into fluid engagement with a respective other one of the container inlet valve and the container outlet valve.

In some embodiments, the container further comprises a mouth defined by the shell for receiving the liquid into the container chamber and a closure for sealing the mouth.

In some embodiments, one of the container outlet valve and the container inlet valve are in the closure.

In some embodiments, the container outlet valve is in the closure, and the container inlet valve is in the shell of the container.

In some embodiments, the container outlet valve is located at a top end of the container, and the container inlet valve is located at a bottom end of the container.

In some embodiments, the closure is removably attachable to the shell of the container, and when the closure is attached to the shell of the container to seal the mouth and the container outlet valve and the container inlet valve are closed, the container containing the carbonated liquid is sealed.

In some embodiments, the beverage carbonation system also comprises a carbonation tube fluidly connected to the container outlet valve and extending inwardly into the container chamber. The carbonation tube is configured to receive carbon dioxide gas from the container chamber for recirculation between the container outlet valve and the container inlet valve.

In some embodiments, the beverage carbonation system the container outlet valve is in a closure for sealing a mouth defined by the shell of the container, the carbonation tube is attached to the closure and extends inwardly from the closure to the container chamber.

In some embodiments, an elevated pressure occurs in the container chamber when the carbonated liquid is formed therein, and the elevated pressure is substantially maintained during disengagement of the container and the carbonator.

In some embodiments, the carbon dioxide source is a solid material that is chemically reactive with the liquid to emit the carbon dioxide gas when the liquid contacts the carbon dioxide source.

In some embodiments, the solid material is a mixture of sodium bicarbonate and citric acid, and the liquid is water.

In some embodiments, the beverage carbonation system comprises a waste reservoir located in the carbonator outside the carbonation chamber and at least partially removable from a remaining portion of the carbonator, and a waste valve in fluid communication with the carbonation chamber that is openable to release a waste product from the carbonation chamber into the waste reservoir.

In some embodiments, the beverage carbonation system also comprises a carbon dioxide cartridge for containing the carbon dioxide source and a transfer mechanism for transferring the carbon dioxide source from the carbon dioxide cartridge to the carbonation chamber.

In some embodiments, the carbonation chamber is integrally formed in the carbonator, and the transfer mechanism comprises at least one cutter configured to cut away at least a portion of the carbon dioxide cartridge to release the carbon dioxide source from the carbon dioxide cartridge into the carbonation chamber.

In some embodiments, the beverage carbonation system comprises a flavor chamber containing a flavor source and fluidly connected to the carbonator inlet port. In some cases, the carbonation chamber is fluidly connected to the carbonator inlet port via the flavor chamber, and when the container inlet port is open, the carbon dioxide gas pressurized in the carbonation chamber travels into and through the flavor chamber to force the flavor source in the flavor chamber into the container via the container inlet valve, to flavor and carbonate the liquid in the container.

In some embodiments, the carbonator further comprises a heater in fluid communication with the pump and the carbonation chamber, to heat the liquid transferring from the container chamber to the carbonation chamber In some embodiments, the carbonation chamber has an opening sized to permit a carbon dioxide source tablet to pass therethrough and into the carbonation chamber, the flavor chamber has an opening through which the flavor source is receivable therethrough and into the flavor chamber, and the carbon dioxide source tablet is larger than the opening of the flavor chamber, whereby the flavor chamber blocks the passage of the carbon dioxide source tablet through the opening of the flavor chamber and into the flavor chamber.

In some embodiments, the carbonation chamber receives the liquid from the container chamber via a carbonation inlet. In some cases, the flavor chamber and the carbonation chamber are adjacent to one another and are separated by a chamber wall extending therebetween and the flavor chamber and the carbonation chamber are in fluid communication with one another by a chamber aperture in the chamber wall. In some cases, when the carbon dioxide gas travels into and through the flavor chamber, the carbonation chamber is fluidly sealed except for the chamber aperture and the carbonation inlet.

In some embodiments, the beverage carbonation system comprises a flavor cartridge for containing the flavor source and a transfer mechanism for transferring the flavor source from the flavor cartridge to the flavor chamber.

In some embodiments, the beverage carbonation system comprises a combination cartridge having a carbon dioxide cartridge for containing the carbon dioxide source and a flavor cartridge for containing the flavor source and a transfer mechanism for transferring the flavor source from the flavor cartridge to the flavor chamber and the carbon dioxide source from the carbon dioxide cartridge to the carbonation chamber. In some cases, the carbon dioxide cartridge and the flavor cartridge are coupled to one another.

In some embodiments, the beverage carbonation system comprises a filter chamber in the carbonator and containing a removable filter in fluid communication with the container chamber to filter the liquid.

In some embodiments, the carbonator has a container holder rotatably connected to the remaining portion of the carbonator about a pivot axis, the container holder is rotatable about the pivot axis to an open position for receiving the container therein, and the container holder is rotatable about the pivot axis to a closed position for carbonating the liquid in the container when the container is in the container holder.

In some embodiments, the pivot axis is proximate a bottom end of the carbonator.

According to another aspect, some embodiments of the invention provide a container for making a carbonated beverage. In these embodiments, the container is removably engageable with a carbonator having a carbonator outlet port fluidly connected to a carbonation chamber containing a carbon dioxide source that produces a carbon dioxide gas and having a carbonator inlet port fluidly connected to the carbonation chamber. The container comprises a shell defining a container chamber for holding a liquid, a container outlet valve having a closed position and an open position, and a container inlet valve having a closed position and an open position. The container outlet valve is fluidly engageable with the carbonator outlet port when the container outlet valve is in the open position. The container chamber is fluidly engageable with at least one pump in fluid communication with the carbonation chamber to transfer the liquid between the container and the carbonation chamber. The container inlet valve is fluidly engageable with the carbonator inlet port when the container inlet valve is in the open position. The carbonator inlet port is in fluid communication with the carbonation chamber to transfer the carbon dioxide gas between the carbonation chamber and the container chamber when the container is engaged with the carbonator, thereby carbonating the liquid. When the container is disengaged from the carbonator, the first container outlet valve and the container inlet valve are closed to fluidly seal the container containing the carbonated liquid.

In some embodiments, the container inlet valve is fluidly engageable with the carbonation chamber via a flavor chamber in the carbonator and containing a flavor source. When the container inlet port is open, the carbon dioxide gas pressurized in the carbonation chamber travels into and through the flavor chamber to force the flavor source in the flavor chamber into the container via the container inlet valve, to flavor and carbonate the liquid in the container.

According to a yet another aspect, some embodiments of the invention provide a carbonator for making a carbonated beverage. In these embodiments, the carbonator is removably engageable with a container having a container outlet valve having a closed position and an open position and a container inlet valve having a closed position and an open position. The carbonator comprises a carbonator outlet port fluidly engageable with the container outlet valve when the container outlet valve is in the open position. The carbonator outlet port is fluidly connected to a carbonation chamber containing a carbon dioxide gas source that produces a carbon dioxide gas. The carbonator also comprises at least one pump in fluid communication with the carbonation chamber and fluidly engageable with the container chamber to transfer the liquid between the container chamber and the carbonation chamber. The carbonator also comprises a carbonator inlet port fluidly engageable with the container inlet valve when the container inlet valve is in the open position, wherein the carbonator inlet port is in fluid communication with the carbonation chamber to transfer the carbon dioxide gas between the carbonation chamber and the container chamber when the container is engaged with the carbonator, thereby carbonating the liquid. When the container is disengaged from the carbonator, the container outlet valve and the container inlet valve are closed to fluidly seal the container containing the carbonated liquid.

In some embodiments, the carbonator also comprises a flavor chamber containing a flavor source and fluidly connected to the carbonator inlet port. The carbonation chamber is fluidly connected to the carbonator inlet port via the flavor chamber. When the container inlet port is open, the carbon dioxide gas pressurized in the carbonation chamber travels into and through the flavor chamber to force the flavor source in the flavor chamber into the container via the container inlet valve, to flavor and carbonate the liquid in the container.

In some embodiments, the carbonation chamber receives the liquid from the container chamber via a carbonation inlet. In some cases, the flavor chamber and carbonation chamber are adjacent to one another and are separated by a chamber wall extending therebetween and the flavor chamber and the carbonation chamber are in fluid communication with one another by a chamber aperture in the chamber wall. In some cases, when the carbon dioxide gas travels into and through the flavor chamber, the carbonation chamber is fluidly sealed except for the chamber aperture and the carbonation inlet.

According to yet a further aspect, some embodiments of the invention provide a method of making a carbonated beverage. The method comprises introducing a liquid into a container, sealing the container with a closure, engaging the container with a carbonator, placing a carbon dioxide source in a carbonation chamber of the carbonator, opening a container outlet valve in the container to transfer a portion of the liquid to the carbonation chamber to react with the carbon dioxide source in the carbonation chamber to produce a carbon dioxide gas, opening a container inlet valve in the container to transfer the carbon dioxide gas produced by the carbon dioxide source into the container to obtain a carbonated liquid in the container, closing the container outlet valve and the container inlet valve to seal the container, and disengaging the container from the carbonator.

In some embodiments, the method comprises, prior to closing the container outlet valve and the container inlet valve to seal the container and disengaging the container from the carbonator, placing a flavor source in a flavor chamber of the carbonator and transferring the pressurized carbon dioxide gas produced in the carbonation chamber into and the through the flavor chamber to transport the flavor source and the carbon dioxide gas to the container inlet valve. Opening the container inlet valve in the container transfers the carbon dioxide gas produced by the carbon dioxide source and the flavor source into the container to produce a carbonated and flavored liquid in the container.

In some embodiments, the method further comprises heating the portion of the liquid transferring from the container chamber to the carbonation chamber.

BRIEF DESCRIPTION OF THE DRAWINGS

A preferred embodiment of the present invention will now be described in detail with reference to the drawings, in which.

DESCRIPTION OF EXEMPLARY EMBODIMENTS

Figure 1:
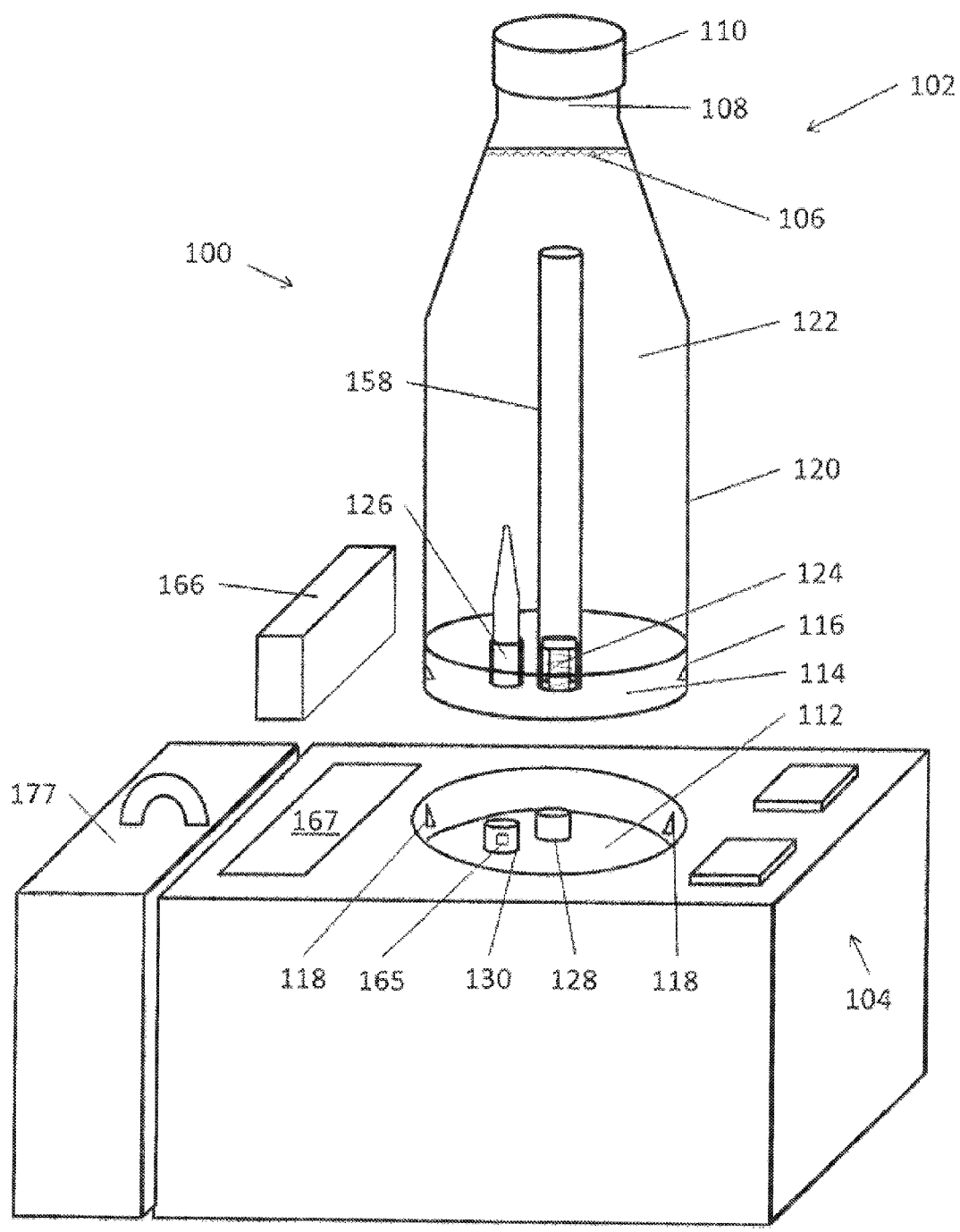
FIG. 1 is an exploded perspective view of an exemplary beverage carbonation system.

Reference is first made to FIG. 1, which shows an example embodiment of a beverage carbonation system 100. In the example shown, beverage carbonation system 100 comprises a container 102 and a carbonator 104. Carbonator 104 is removably engageable with container 102.

Continuing to refer to FIG. 1, a user of beverage carbonation system 100 may fill container 102 with a liquid 106, such as, but not limited to, water, juice, coffee and alcohol. In some cases, container 102 has a mouth 108 and a closure 110 for sealing mouth 108. After the user fills container 102 with liquid 106, the user may seal mouth 108 with closure 110. When container 102 is filled with liquid 106 and engaged with carbonator 104, carbonator 104 can draw a quantity of liquid 106 from container 102 for mixing with a reactive carbon dioxide source in the carbonator 104 to produce gaseous carbon dioxide. The gaseous carbon dioxide is introduced into container 102 to mix with the liquid therein to form a carbonated liquid in container 102. In addition, the carbonator may circulate the liquid through a flavor chamber containing a flavor source (e.g. flavor crystals, coffee grinds, or syrup) to obtain a flavored liquid. The user is able to disengage the container 102 from carbonator 104 to obtain a sealed carbonated beverage that may be opened for immediate consumption or stored for later use. The sealed carbonated beverage may share some characteristics with a store bought carbonated beverage, because sealed container 102 limits exposure to ambient pressure and reduces carbonation losses.

Continuing to refer to FIG. 1, carbonator 104 may comprise a cavity 112 for receiving at least a portion of container 102. In the example shown, carbonator 104 comprises a cavity 112 sized to receive a base 114 of container 102. Optionally, cavity 112 and base 114 have corresponding circular shapes. In some embodiments, one or more of base 114 and cavity 112 comprise retentive elements for securing container 102 to carbonator 104. The retentive elements may comprise, for example, mating magnetic elements, mating threads, a friction grip or a detent mechanism. In the example shown in FIG. 1, base 114 has recesses 116 for receiving latches 118 of cavity 112. In an alternative embodiment, the recesses are located in cavity 112, and the latches are located in base 114 (not shown).

The retentive elements (ex. recesses 116 and latches 118) may engage automatically upon the insertion of container 102 into cavity 112. Each latch 118 may be biased inwardly (by a spring, for example) toward a corresponding recess 116. Alternatively, the retentive elements may be actuated in response to an additional action by the user. For example, the movement of a button may cause latches 118 to insert into recesses 116. In other embodiments, the retentive elements may be electronically actuated. For example, a controller may power mating electromagnets upon the start of the carbonation process. Or alternatively, the retentive elements may be engaged by the user with a manual lever, latch or lock (not shown).

The retentive elements may be releasable automatically upon disengagement of container 102 and carbonator 104. For example, the action of pulling container 102 apart from carbonator 104 may provide enough outward force to overcome the inward bias of springed latches 118. Alternatively, latches 118 may recede from recesses 116 by the movement of a button. In another example, a controller disconnects mating electromagnets from a power source to disengage latches 118 and recesses 116. Or alternatively, the retentive elements may be disengaged by the user with a manual lever, latch or lock (not shown).

Continuing to refer to the embodiment shown in FIG. 1, container 102 comprises a shell 120 defining a container chamber 122 for holding liquid 106. Shell 120 may be made of glass or plastic, for example. As illustrated, base 114 is a part of shell 120. Container 102 may be a bottle. Container 102 may also have a mouth 108 defined by shell 120 for introducing the liquid into container chamber 122. Optionally, mouth 108 is located at the top of container 102 and provides an upwardly facing opening when container 102 stands upright. Optionally, at least a portion of shell 120 tapers inwardly towards mouth 108, to facilitate liquid consumption directly from mouth 108, if desired.

Referring to the example embodiment shown in FIG. 1, container 102 may also comprise a closure 110 for sealing mouth 108. Closure 110 may be configured to operatively open and seal mouth 108. To open mouth 108, closure 110 may be removed entirely from mouth 108. As shown, closure 110 may be a lid that is removably engageable with mouth 108. Closure 110 and mouth 108 may have mating threads that permit a user to twist closure 110 onto and off of container 102. Optionally, closure 110 is made of rubber material or has a rubber gasket therein to create a seal with mouth 108. Alternatively, closure 110 may be manipulated to have an opening therethrough (ex. by having a sliding or hinged door built into the closure, which are not shown). When the closure 110 operatively opens mouth 108, the user can pour a liquid into or out of mouth 108. When closure 110 operatively seals mouth 108, mouth 108 is sealed in a substantially gas-tight and liquid-tight manner. Although closure 110 is illustrated as a threaded lid, other non-limiting examples for closure 110 include a removable adhesive film, a resilient plug or a cork.

In the example embodiment shown in FIG. 1, container 102 has first container outlet valve 124 in shell 120. Optionally, first container outlet valve 124 is located in base 114. First container outlet valve 124 has a closed position and an open position. When first container outlet valve 124 is in the open position, it provides an open passageway for fluid to travel between container chamber 122 and the external atmosphere. When first container outlet valve 124 is in the closed position, fluid is blocked from exiting container chamber 122 via first container outlet valve 124.

In the example embodiment shown in FIG. 1, container 102 also has container inlet valve 126 in shell 120. Optionally, container inlet valve 126 is located in base 114. Container inlet valve 126 has a closed position and an open position. When container inlet valve 126 is open, it provides an open passageway for fluid to travel between container chamber 122 and the external atmosphere. When container inlet valve 126 is closed, fluid is blocked from exiting container chamber 122 via container inlet valve 126.

Continuing to refer to FIG. 1, when container 102 is engaged with carbonator 104, first container outlet valve 124 and container inlet valve 126 may be opened to allow fluid to pass between container 102 and carbonator 104. When container 102 is disengaged from carbonator 104, first container outlet valve 124 and container inlet valve 126 are closed to fluidly seal container 102 containing carbonated liquid (not shown in FIG. 1). The terminology of container "outlet" and "inlet" valves used throughout this disclosure refer to the flow direction of fluid relative to the container (exemplified as container 102 in FIG. 1). A container "outlet valve" is applicable to fluid flow out of the container. Conversely, a container "inlet valve" is applicable to fluid flow into the container.

First container outlet valve 124 and container inlet valve 126 may be configured (e.g. biased by a spring or otherwise) to seal automatically on or prior to the release of container 102 from carbonator 104. For example, first container outlet valve 124 and container inlet valve 126 may be, as non-limiting examples, a mechanical spring valve or a check valve. First container outlet valve 124 and container inlet valve 126 may be one-way valves. When open, first container outlet valve 124 may only allow fluid to flow out of container chamber 122. When open, container inlet valve 126 may only allow fluid to flow into container chamber 122. More specifically, first container outlet valve 124 and container inlet valve 126 may be a ball check valve, a stop check valve, a lift check valve, or a duckbill valve.

In the example embodiment shown in FIG. 1, carbonator 104 has a first carbonator outlet port 128. First carbonator outlet port 128 is fluidly engageable with first container outlet valve 124 when first container outlet valve 124 is in the open position. When first carbonator outlet port 128 is fluidly engaged with first container outlet valve 124, the first carbonator outlet port and the first container outlet valve are, directly or indirectly, fluidly coupled to one another. When the first container outlet valve 124 is open and fluidly engages first carbonator outlet port 128, fluid is able to flow through first container outlet valve 124 and first carbonator outlet port 128. In this manner, fluid passes between container chamber 122 and carbonator 104.

In the example embodiment shown in FIG. 1, carbonator 104 also has a carbonator inlet port 130. Carbonator inlet port 130 is fluidly engageable with container inlet valve 126 when container inlet valve 126 is in the open position. When carbonator inlet port 130 is fluidly engaged with container inlet valve 126, the carbonator inlet port 130 and container inlet valve 126 are, directly or indirectly, fluidly coupled to one another. When the container inlet valve 126 is open and fluidly engages carbonator inlet port 130, fluid is able to flow through container inlet valve 126 and carbonator inlet port 130. In this manner, fluid passes between carbonator 104 and container chamber 122. The terminology of carbonator "outlet" and "inlet" ports used throughout this disclosure refer to the flow direction of fluid relative to the container (exemplified as container 102 in FIG. 1). An "outlet port" of the carbonator (exemplified as first carbonator outlet port 128 of carbonator 104 in FIG. 1) engages an outlet valve of the container (exemplified as first outlet valve 124 of container 102 in FIG. 1) and represents a carbonator port that provides fluid flow out of the container. Conversely, an "inlet port" of the carbonator (exemplified as carbonator inlet port 130 of carbonator 104 in FIG. 1) engages an inlet valve of the container (exemplified as inlet valve 126 of container 102 in FIG. 1) and represents a carbonator port that provides fluid flow into the container.

Optionally, first carbonator outlet port 128 and carbonator inlet port 130 are located in cavity 112 of carbonator 104.

Figure 2:
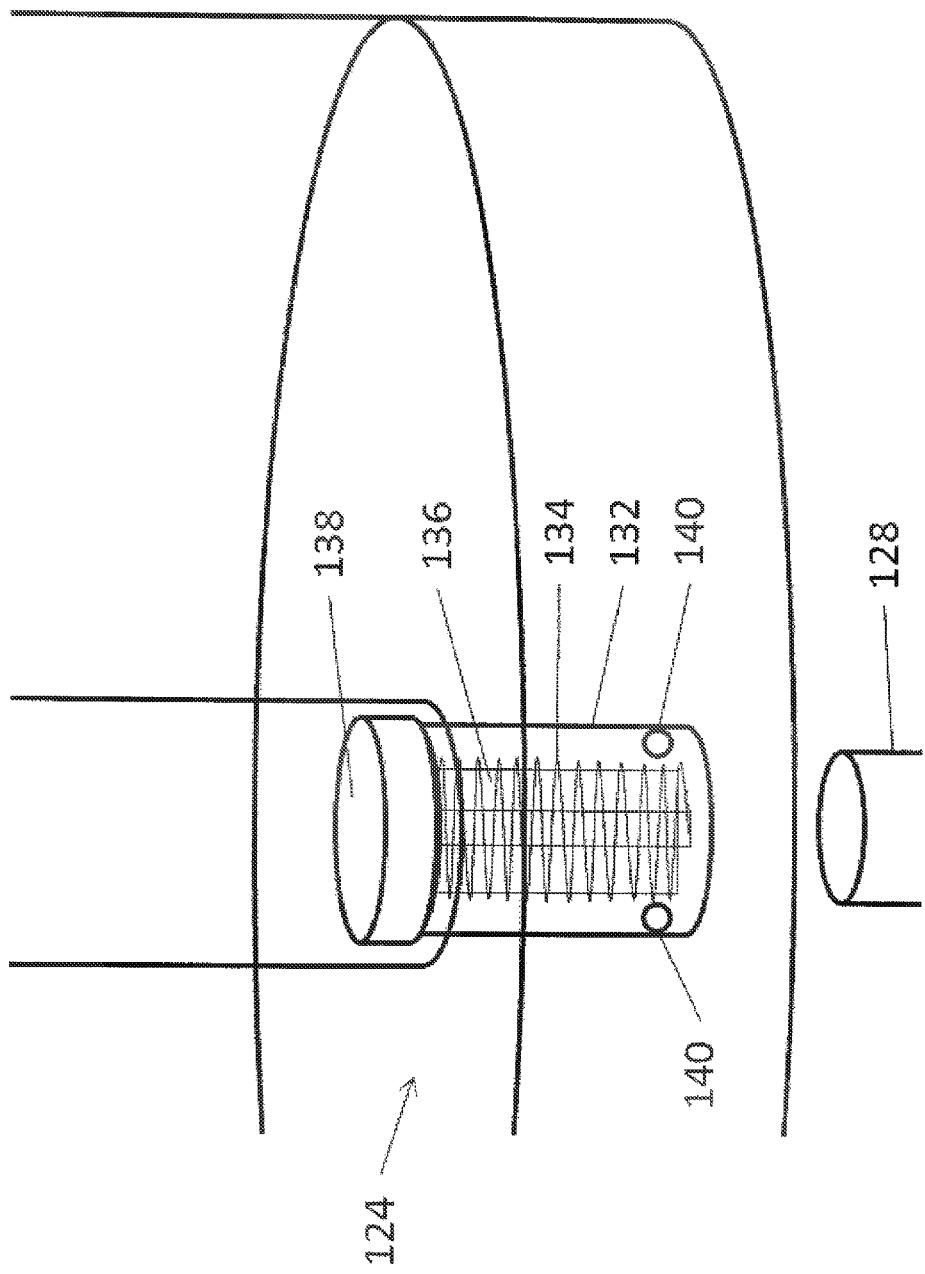
FIG. 2 is a perspective view of an exemplary first carbonator outlet valve of the beverage carbonation system of FIG. 1, in the closed position.

FIG. 2 shows an example first container outlet valve 124, in the form of a mechanical spring valve. In the example shown, first container outlet valve 124 comprises a housing 132, spring 134, shaft 136, cap 138 and seals 140. First carbonator outlet port 128 of carbonator 104 (see FIG. 1) is receivable by housing 132, which has a hollow cylindrical shape. Seals 140 are located between shaft 136 and housing 132. Spring 134 is coupled to the top of housing 132 and the bottom of shaft 136 to bias cap 138 toward a closed position against the top of housing 132. FIG. 2 shows first container outlet valve 124 in the closed position.

Figure 3:
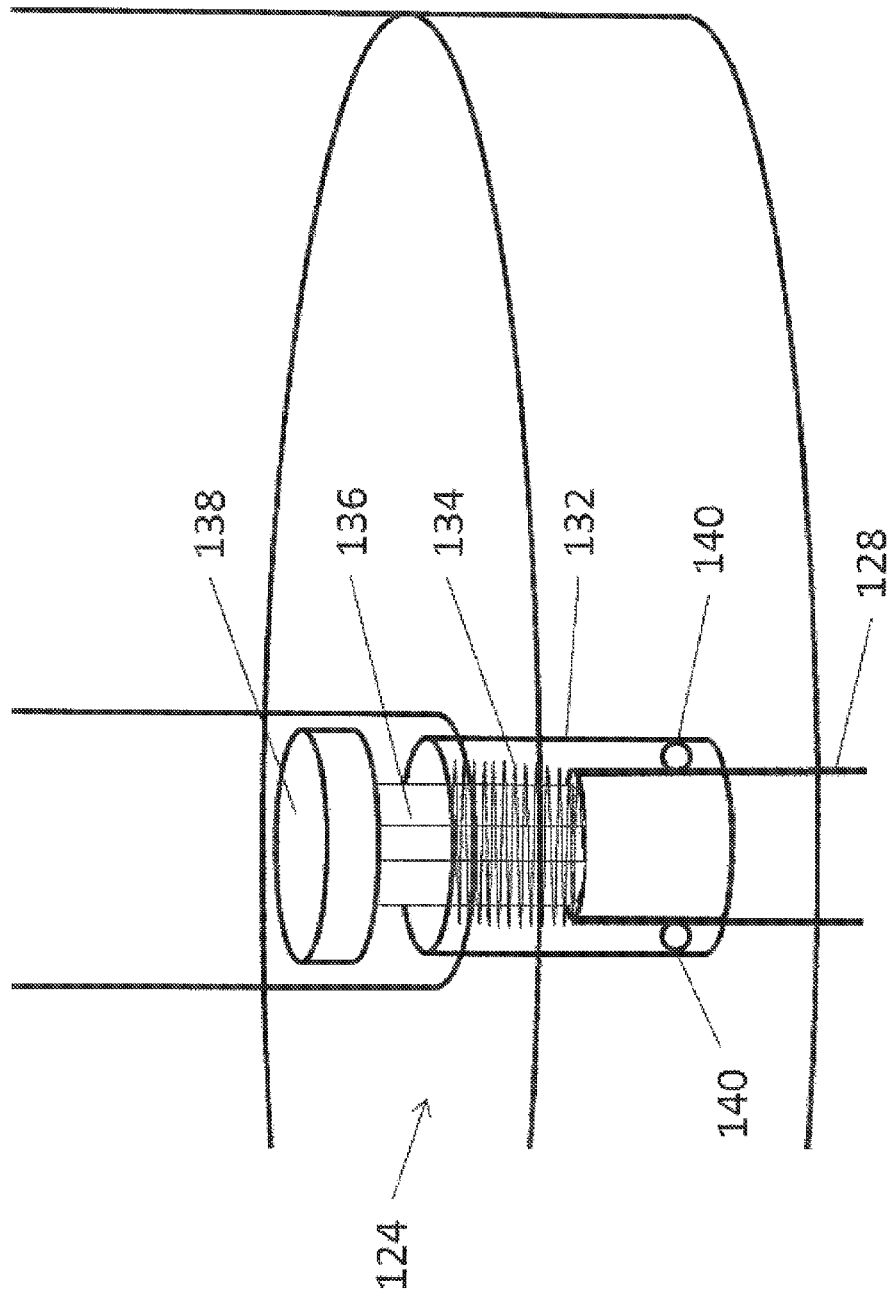
FIG. 3 is a perspective view of the first carbonator outlet valve of FIG. 2, in the open position.

As exemplified in FIG. 3, when first carbonator outlet port 128 is received by housing 132, it displaces shaft 136 such that seals 140 become wedged between first carbonator port 128 and housing 132. In this manner, a fluid tight seal may be provided by seals 140. When first carbonator outlet port 128 is received inside housing 132, it pushes shaft 136 out of housing 132, moving cap 138 away from the top of housing 132. When shaft 136 is pushed by first carbonator outlet port 128, spring 134 compresses to accommodate the movement of shaft 136. The gap created between cap 138 and the top of housing 132 provides an open passage (i.e. the valve is open). When open, first container outlet valve 124 permits fluid to pass from container chamber 122 into carbonator 104 (see FIG. 1) via first carbonator outlet port 128. Conversely, when first carbonator outlet port 128 is withdrawn from housing 132, cap 138 seats onto and seals the top of housing 132 under the bias of spring 134, thereby closing first container outlet valve 124.

Typically, container inlet valve 126 is a one-way valve that, when open, allows fluid to flow into container chamber 122, but not out of container chamber 122. More specifically, container inlet valve 126 may be a check valve that is biased closed (by a spring, for example) and configured to open when the net fluid pressure across the valve rises above a threshold value. Alternatively, container inlet valve 126 may be a mechanical spring valve that operates in similar manner to the first container outlet valve 124 shown in FIGS. 2 and 3.

Figure 4:
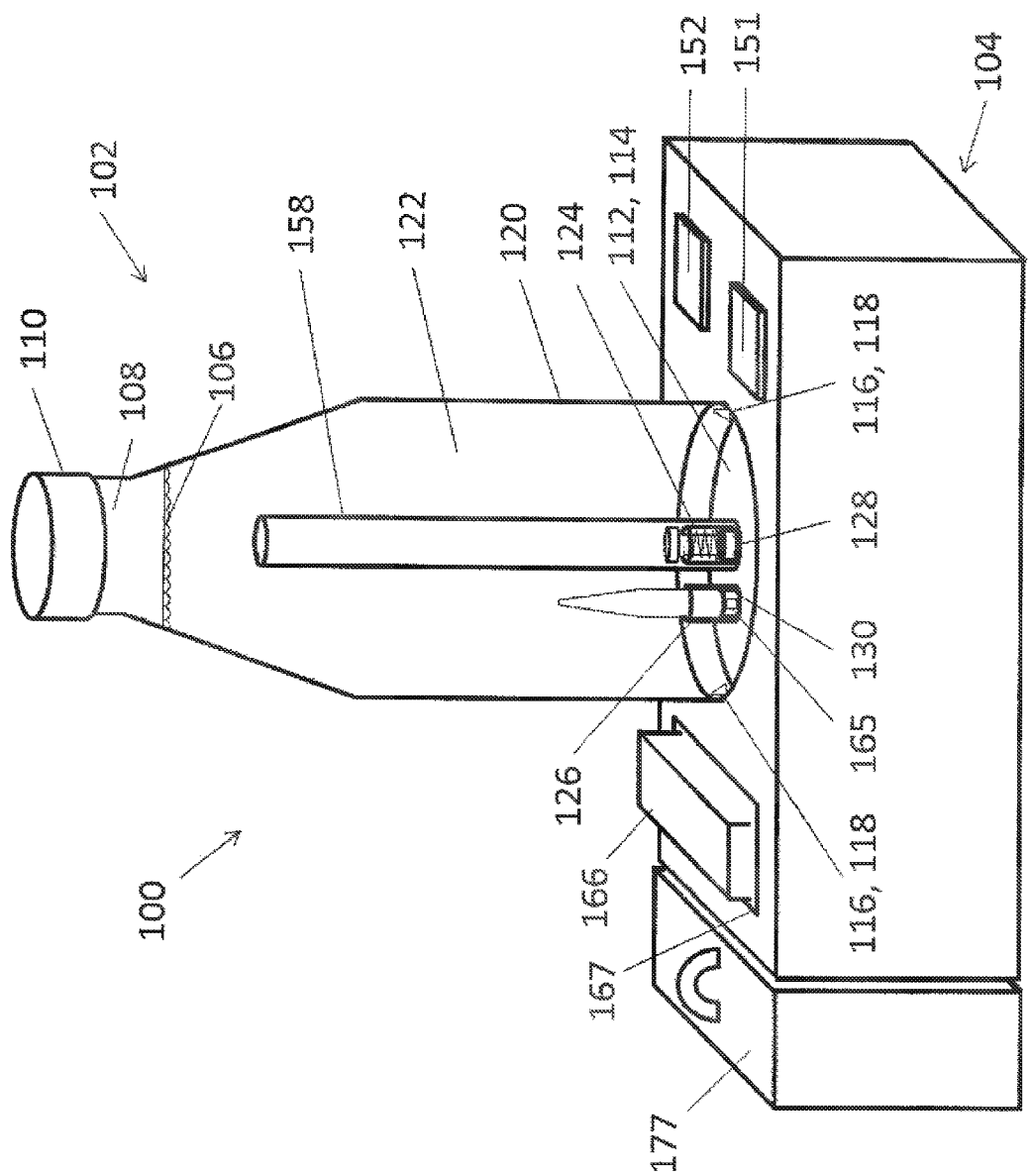
FIG. 4 is a perspective view of the beverage carbonation system of FIG. 1, wherein the container and carbonator are engaged.

FIG. 4 exemplifies container 102 engaged with carbonator 104. Container 102 may be received in a cavity 112. When container 102 engages carbonator 104, this fluidly engages first container outlet valve 124 with first carbonator outlet port 128 and container inlet valve 126 with carbonator inlet port 130.

Figure 5:
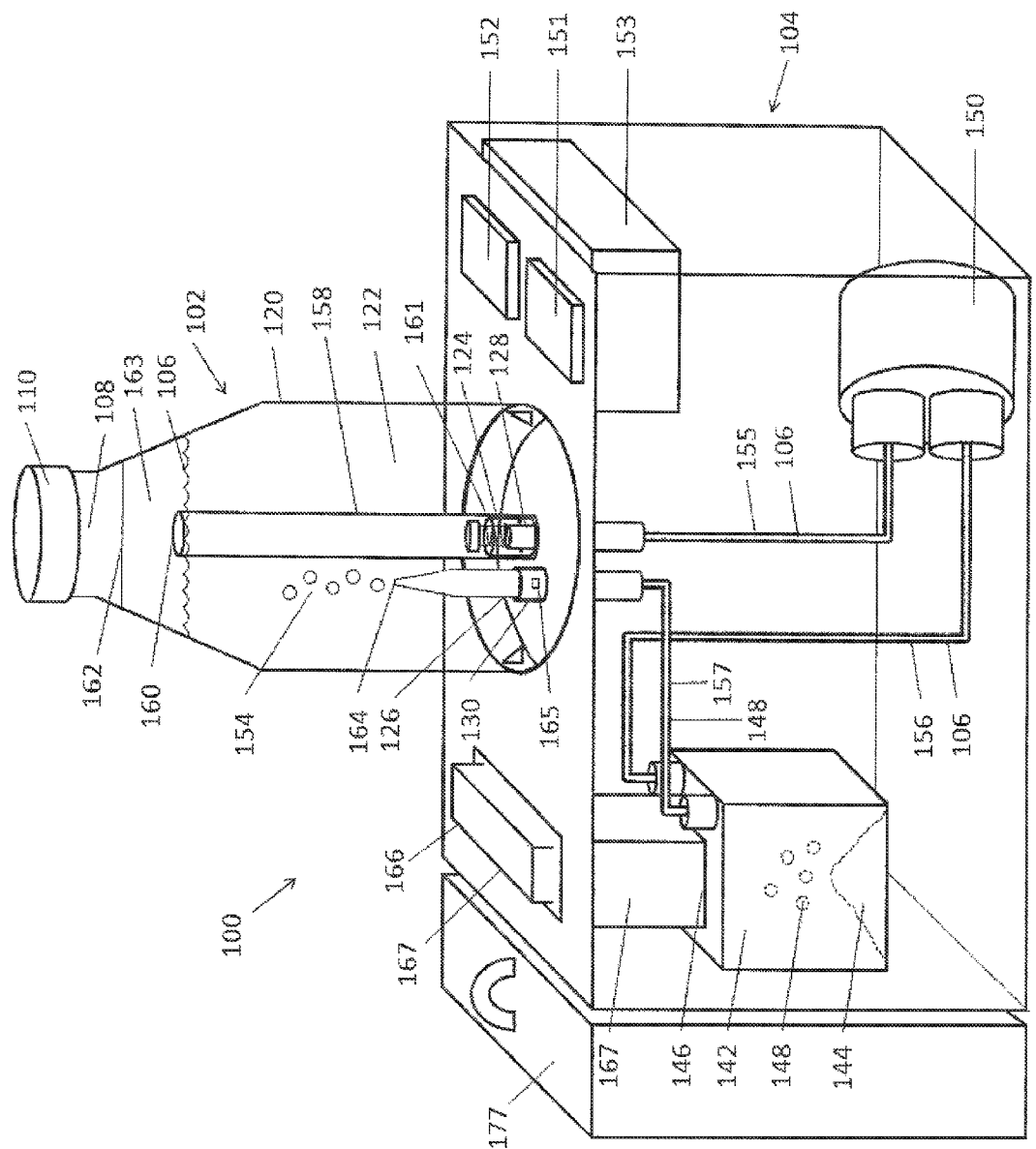
FIG. 5 is a cut-away perspective view of the beverage carbonation system of FIG. 4.

Referring now to the example embodiment shown in FIG. 5, carbonator 104 may have a start actuator 151 and stop actuator 152, which are optionally in the form of depressible buttons connected to a controller 153. Activation of start actuator 151 or stop actuator 152 sends a corresponding signal to controller 153 to perform the desired operation. Controller 153 may comprise any logic board suitably configured to control the operation of carbonator 104.

Start actuator 151 may be activated after the container 102 and carbonator 104 are engaged. In some embodiments, activation of start actuator 151 opens first container outlet valve 124 and container inlet valve 126. In some embodiments, activation of start actuator 151 temporarily locks container 102 and carbonator 104 into engagement with one another. In some embodiments, activation of start actuator 151 simultaneously opens the container valves and temporarily locks container 102 to carbonator 104.

Referring to the example embodiment shown in FIG. 5, activation of start actuator 151 sends a corresponding signal to controller 153 to activate at least pump 150.

Referring to FIGS. 1 and 5, when closure 110 removed from mouth 108, liquid 106 may be introduced into container chamber 122 through mouth 108. FIG. 1 illustrates liquid 106 inside container chamber 122. In some embodiments, a user may manually fill container chamber 122 (e.g. by pouring a liquid into mouth 108). In variant embodiments, beverage carbonation system 100 may comprise a source of liquid (not shown), which introduces liquid into container 102. For example, system 100 may comprise plumbing fluidly connected with a municipal water supply.

After liquid 106 is introduced into container chamber 122, closure 110 may be secured to mouth 108 of container 102 to seal mouth 108. Liquid 106 may be added before container 102 is engaged with carbonator 104 (as shown in FIG. 1) or after container 102 is engaged with carbonator 104 (as shown in FIG. 5).

Referring to the example embodiment shown in FIG. 5, carbonator 104 has carbonation chamber 142. Optionally, carbonation chamber 142 is integrally formed in carbonator 104. Carbonation chamber 142 contains a carbon dioxide source 144. Optionally, carbonation chamber 142 has an access hatch 146 for introducing carbon dioxide source 144 into carbonation chamber 142. Carbon dioxide cartridge source 144 is reactive with liquid 106 to produce carbon dioxide gas 148 when the liquid contacts carbon dioxide source 144. Optionally, carbon dioxide source 144 is a solid material that is chemically reactive with liquid 106 to emit carbon dioxide gas 148 when the liquid contacts the solid material. Examples of liquid 106 include, but are not limited to, water, juice, coffee, tea and alcohol. Carbon dioxide source 144 may be, for example, an acid mixed with a carbonate, in wet or dry form, combined or separate until required. In some cases, a solid material carbon dioxide source 144 is a mixture of sodium bicarbonate and citric acid, and liquid 106 is water. More specifically, the solid material may be a dry solid material, such as a powder. Sodium bicarbonate and citric acid are advantageous for use with water because when they react with water they do not create heat during the reaction. This is desirable for producing a cooled carbonated beverage. In some cases, dry citric acid and sodium bicarbonate have some benefits, including for example, being relatively inexpensive, non-toxic, relatively easy to handle and/or capable of pre-mixing.

As shown in FIG. 5, first carbonator outlet port 128 is fluidly connected to carbonation chamber 142 containing carbon dioxide source 144 that produces carbon dioxide gas 148. Carbonator inlet port 130 is fluidly connected to carbonation chamber 142.

When first container outlet valve 124 is open and fluidly engages first carbonator outlet port 128, liquid 106 flows from container chamber 122 into carbonation chamber 142 to interact with the carbon dioxide source 144 to form carbon dioxide gas 148 in carbonation chamber 142.

When container inlet valve 126 is open and fluidly engages carbonator inlet port 130, carbon dioxide gas 148 flows from carbonation chamber 142 to container chamber 122 to mix with liquid 106 in container chamber 122 to form a carbonated liquid 154 in container chamber 122.

Carbonator 104 comprises at least one pump 150 in fluid communication with container chamber 122 and carbonation chamber 142. At least one pump 150 transfers liquid 106 between container chamber 122 and carbonation chamber 142 when container 102 is engaged with carbonator 104. At least one pump 150 also transfers carbon dioxide gas 148 between carbonation chamber 142 and container chamber 122 when container 102 is engaged with carbonator 104, thereby carbonating liquid 106.

Optionally, carbonator 104 has one pump 150. In this case, pump 150 pumps liquid 106 from first carbonator outlet port 128 to pump 150 via line 155, then from pump 150 to carbonation chamber 142 via line 156. Pump 150 then pumps carbon dioxide gas 148 from carbonation chamber 142 to carbonator inlet port 130 via line 157. Alternatively, multiple pumps 150 may be employed (not shown). As referred to throughout this disclosure, a pump (exemplified as pump 150) is any mechanism capable of facilitating fluid flow through the system. Pump 150 may be, but is not necessarily limited to, an electrical pump. The pump may include, as non-limiting examples, a mechanism that facilitates fluid flow using differential pressure, negative pressure, gravity, or a combination thereof.

As shown in FIG. 5, beverage carbonation system 100 may have carbonation tube 158. Carbonation tube 158 is fluidly connected to first container outlet valve 124 and extends inwardly into container chamber 122. Optionally, carbonation tube 158 is in the shape of a straw, and extends vertically upwardly into container chamber 122 from base 114. To carbonate liquid 106, a portion of liquid 106 enters a first end 160 of carbonation tube 158. Optionally, first end 160 is the top end of carbonation tube 158. Optionally, second end 161 of carbonation tube is connected to first container outlet valve 124.

As exemplified in FIG. 5, in some cases, it may be desirable to limit the quantity of liquid that is drawn into carbonation chamber 142. When pump 150 is activated, a portion of liquid 106 is drawn through first end 160 of carbonation tube 158 and drawn to first container outlet valve 124. As this process continues, the level of liquid 106 inside the container chamber 122 falls. At a certain point, the liquid becomes level with first end 160 of carbonation tube 158. When the level of liquid 106 is at or below first end 160 of carbonation tube 158, no more liquid is drawn through carbonation tube 158. Accordingly, the height of carbonation tube 158 limits the amount of liquid 106 that may be drawn into the carbonation chamber 142 of carbonator 104. More specifically, the maximum volume of liquid 106 that may be drawn into the container chamber 122 may be equal to the volume of container chamber 122 situated at an elevation above first end 160 of carbonation tube 158. In some cases, it takes approximately 10 seconds to lower the level of liquid 106 to first end 160 of carbonation tube 158. In some embodiments, as the level of liquid 106 is lowered, liquid 106 is pumped into carbonation chamber 122 for approximately 5 to 15 seconds.

In some embodiments, shell 120 of container 102 may comprise a fill line 162. Fill line 162 may correspond to an ideal level of liquid 106. When the liquid is filled to fill line 162, there may be an ideal volume of liquid 106 located at an elevation above first end 160 of carbonation tube 158. The ideal volume of liquid 106 may correspond with the specific quantity of liquid required to mix with carbon dioxide source 144 to produce carbon dioxide gas 148 at a rate sufficient to carbonate the liquid 106 inside container chamber 122. Optionally, fill line 162 corresponds to a volume of between 5% and 20%, of the total liquid 106 volume prior to commencement of the carbonation process. As one example, the total volume of liquid 106 in container chamber 122 may be 1000 mL and the volume between fill line 162 and first end 160 may be approximately 50 mL to 200 mL of liquid prior to commencement of the carbonation process.

In the example embodiment shown in FIG. 5, carbonation tube 158 is configured to receive carbon dioxide gas 148 from container chamber 122 for recirculation between first container outlet valve 124 and container inlet valve 126. Once the level of liquid falls at or below first end 160 of carbonation tube 158, no more liquid enters the carbonation tube. However, as the process continues, some carbon dioxide gas 148 injected into container chamber 122 from carbonation chamber 142 passes through the liquid in container chamber 122 and into headspace 163. Recirculating gas from headspace 163 permits carbon dioxide gas that passed through liquid 106, but did not diffuse into the liquid, to diffuse back into liquid 106. This reduces the time required to reach a desirable level of beverage carbonation because the recycled carbon dioxide gas is forced through the liquid at a faster rate than if it were to passively dissolve from headspace 163 into liquid 106.

Optionally, pump 150 is a liquid-gas pump that can pump liquid 106 from container chamber 122, through carbonation chamber 142, and back to container chamber 122, and can also pump carbon dioxide gas along a similar flow path. Alternatively, one gas pump and one liquid pump may be used.

In some embodiments, a diffuser 164 may be fluidly connected to container inlet valve 126. In the example shown in FIG. 5, diffuser 164 comprises a nozzle that can accelerate fluid passing through it to produce a jet. This facilitates the diffusion of carbon dioxide gas 148 into liquid 106 to carbonate liquid 106 at a faster rate. Diffuser 164 may help to send carbonated liquid 154 away from container inlet valve 126 at such a rate that liquid 106 is agitated and increases the surface area of the liquid that is in contact with the carbon dioxide. In this manner, diffuser 164 may be used to increase the rate at which sufficient carbonation of liquid 106 is achieved.

Continuing to refer to FIG. 5, once the beverage has been carbonated to the desired extent, the user may activate stop actuator 152 to shutdown pump 150. Activation of stop actuator 152 sends a corresponding signal to controller 153 to perform the desired operation. Shutting down pump 150 stops the carbonation process described above. Conversely, pump 150 may automatically shut down when a sensor 165 indicates to the controller 153 that a sufficient level of pressure has been achieved in container chamber 122 to indicate a satisfactory level of beverage carbonation. Sensor 165 may be mounted to carbonator inlet port 130. In some embodiments, pump 150 shuts down after the pressure within the system (equalized across carbonator 104 and container 102) reaches approximately 50 to 80 psi. Alternatively, pump 150 may be shut down after a pre-programmed time period. Optionally, the liquid 106 cycles through the carbonation process for approximately 30 to 120 seconds. However, the appropriate time duration varies with the volume of liquid 106 to be carbonated. Activation of stop actuator 152 may close first container outlet valve 124 and container inlet valve 126 prior to container 102 being disengaged from carbonator 104. Activation of stop actuator 152 may unlock container 102 and carbonator 104 out of engagement with one another. For example, activation of stop actuator 152 may unlock latches 118 from recesses 116. Activation of stop actuator 152 may cause one or more of the operations outlined above to occur. Conversely, a stop actuator 152 is not required when the above outlined operations occur automatically. When these operations occur automatically, an indicator (such as a light, for example, not shown) may illuminate to let the user know that carbonation has completed and that the container 102 may be disengaged from carbonator 104. Alternatively, container 102 may be unlocked with a manual latch by the user after a timed cycle is complete.

Continuing to refer to FIG. 5, during the carbonation process, liquid 106 in container chamber 122 is at least partially replaced by a carbonated liquid 154. When carbonated liquid 154 is formed in container chamber 122, an elevated pressure occurs in container chamber 122. As discussed above with reference to the example embodiment shown in FIG. 1, when container 102 is disengaged from carbonator 104, first container outlet valve 124 and container inlet valve 126 close to seal container chamber 122. In this manner, during disengagement of container 102 and carbonator 104, the elevated pressure is substantially maintained in the container chamber. In some cases, a pressure of approximately 50 to 80 psi is maintained in container chamber 122 following the disengagement of container 102 and carbonator 104. This is advantageous because the user can store the container (in a refrigerator or on a counter, for example) for later consumption. The closed container valves allow the container to remain sealed, to minimize carbonation losses to the external atmosphere. This prevents the carbonated beverage from going "flat" during storage, and preserves the carbonated taste for later consumption.

Figure 6:
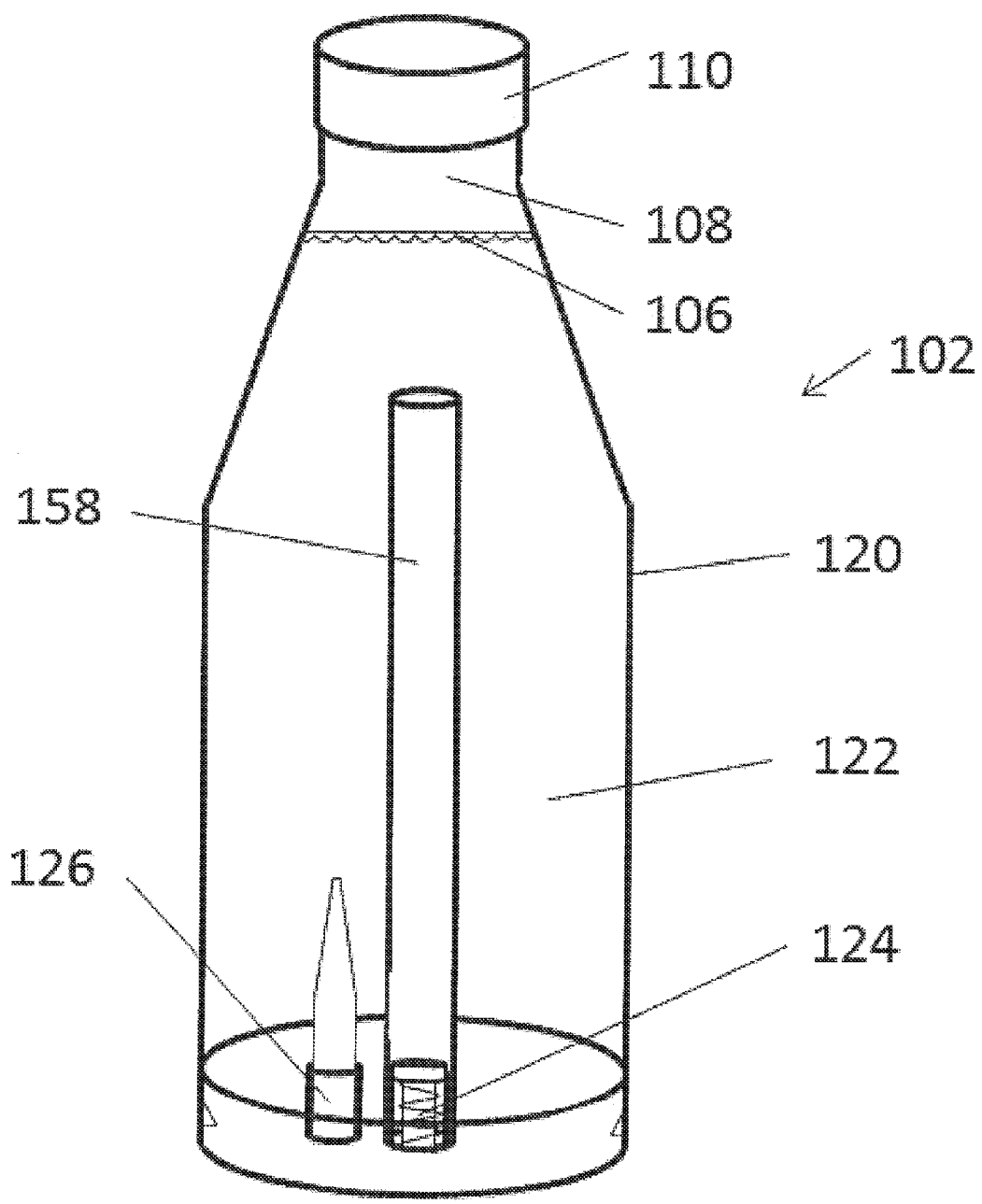
FIG. 6 is a cut-away perspective view of an exemplary container.

A further embodiment of the invention consists of container 102 for making a carbonated beverage, as discussed above with respect to FIG. 5 and further shown in FIG. 6. Container 102 shown in FIGS. 5 and 6 is removably engageable with a carbonator (such as carbonator 104 shown in FIG. 5, for example).

Referring to the example embodiment shown in FIG. 5, first container outlet valve 124 is fluidly engageable with first carbonator outlet port 128 when first container outlet valve 124 is in the open position. Container inlet valve 126 is fluidly engageable with carbonator inlet port 130 when container inlet valve 126 is in the open position. Container chamber 122 is engageable with at least one pump 150 in fluid communication with carbonation chamber 142 to transfer liquid 106 between container 102 and carbonation chamber 142 and transfer carbon dioxide gas 148 between carbonation chamber 142 and the container chamber 122 when container 102 is engaged with carbonator 104, thereby carbonating liquid 106. When container 102 is disengaged from carbonator 104 (as exemplified in FIG. 1), first container outlet valve 124 and container inlet valve 126 are closed to fluidly seal container 102 containing carbonated liquid 154. In this manner, the carbonated liquid substantially maintains its carbonation level for later consumption.

Figure 7:
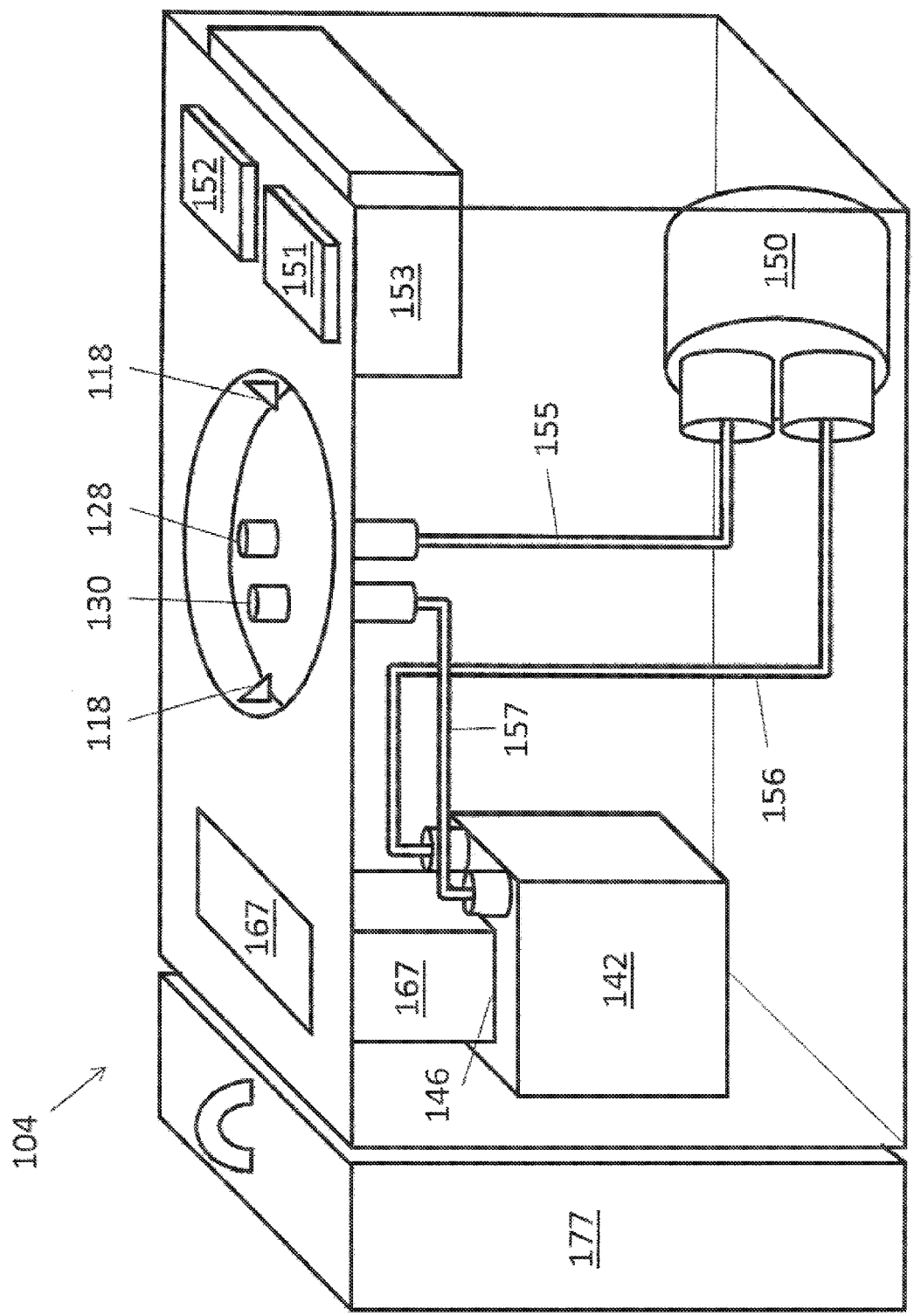
FIG. 7 is a cut-away perspective view of an exemplary carbonator.

A further embodiment of the invention consists of carbonator 104 for making a carbonated beverage, as discussed above with respect to FIG. 5 and exemplified in FIG. 7. The carbonator is removably engageable with a container (such as container 102 shown in FIG. 5, for example). Carbonator 104 has at least one pump in fluid communication with carbonation chamber 142 and is fluidly engageable with container chamber 122. Referring to the example embodiment shown in FIG. 5, when container 102 is disengaged from carbonator 104, first container outlet valve 124 and container inlet valve 126 are closed to fluidly seal container 102 containing the carbonated liquid.

Referring to the example embodiment shown in FIG. 5, for liquid 106 to be carbonated, a carbon dioxide source 144 is present in carbonation chamber 142. An example structure and process related to providing carbon dioxide source 144 in carbonation chamber 142 will now be discussed in detail.

As exemplified in FIG. 5, beverage carbonation system 100 may comprise a carbon dioxide cartridge 166 for containing carbon dioxide source 144. As exemplified in FIG. 5, carbonator 104 has a cartridge holder 167 for receiving at least a portion of carbon dioxide cartridge 166. Optionally, as shown in FIG. 5, carbon dioxide cartridge 166 is inserted into cartridge holder 167 so that a portion of carbon dioxide cartridge 166 remains exposed. In this manner, the user can grasp a portion of carbon dioxide cartridge 166 to remove the carbon dioxide cartridge from carbonator 104. Alternatively, carbon dioxide cartridge 166 may be fully inserted into carbonator 104. In this case, carbon dioxide cartridge may be accessible directly or by an opening mechanism (such a hinged or sliding cover, for example, not shown).

Figure 8:
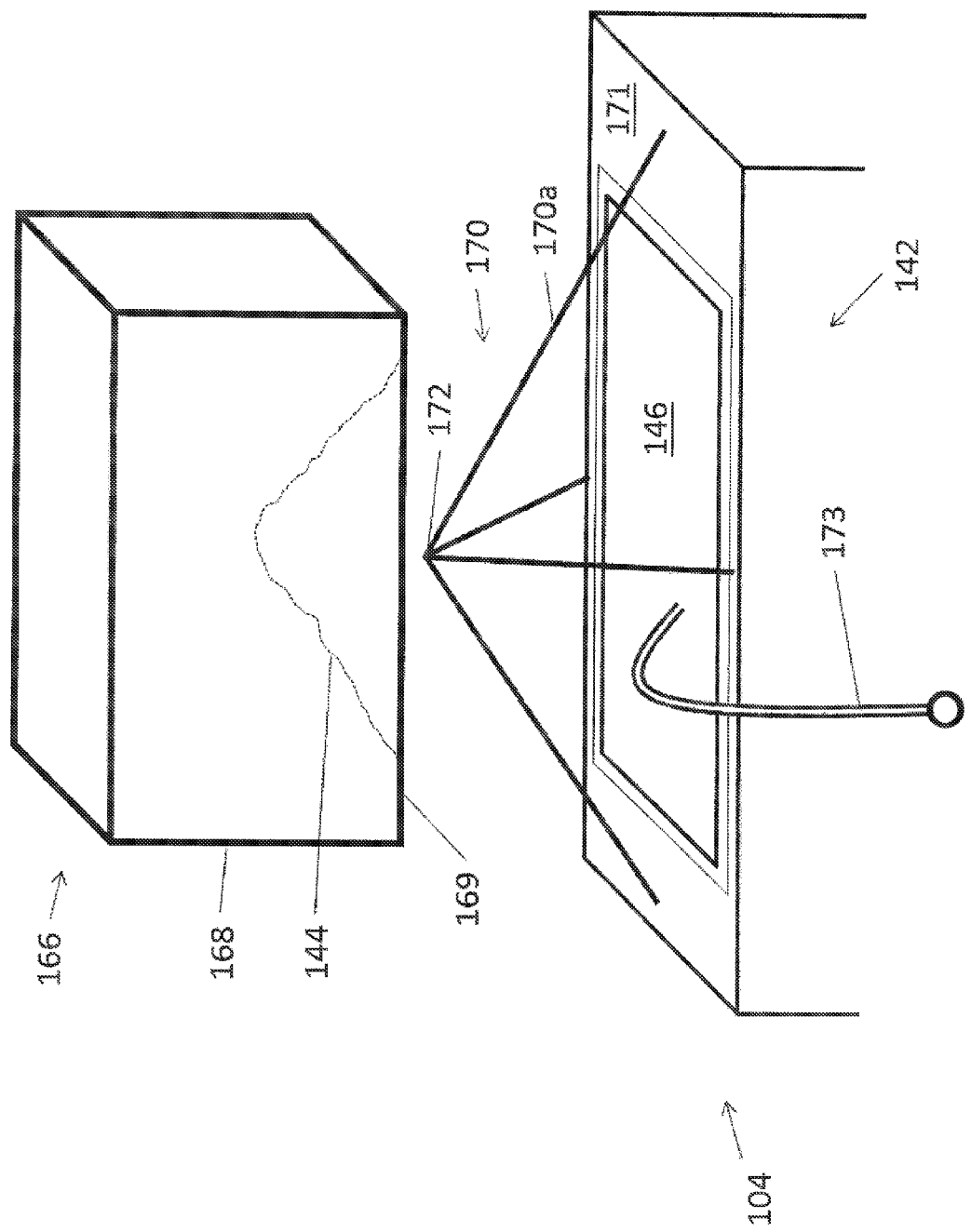
FIG. 8 is a perspective view of an exemplary carbon dioxide cartridge and transfer mechanism, wherein the carbon dioxide cartridge is sealed.

For greater clarity, FIG. 8 exemplifies carbonation chamber 142 and carbon dioxide cartridge 166 in the absence of cartridge holder 167. Optionally, carbon dioxide cartridge 166 comprises a hollow housing 168 for storing carbon dioxide source 144 therein. More specifically, hollow housing 168 of carbon dioxide cartridge 166 may seal the carbon dioxide source 144 therein so that the user cannot access the carbon dioxide source prior to its insertion into carbonator 104. Sealing carbon dioxide source 144 inside carbon dioxide cartridge 166 may offer the advantages of maintaining source purity, keeping carbon dioxide source 144 dry until needed and ensuring the right quantity of carbon dioxide source 144 is used in the reaction. Hollow housing 168 may have a pierceable portion 169. Optionally, pierceable portion 169 runs along a bottom surface of hollow housing 168. More specifically, pierceable portion 169 may be made of aluminum foil, while the remainder of hollow housing 186 may be made of plastic.

As described above, with reference to FIG. 5, liquid 106 contacts carbon dioxide source 144 in carbonation chamber 142. In some embodiments, carbonator 104 has transfer mechanism 170 (as exemplified in FIG. 8) for transferring carbon dioxide source 144 from carbon dioxide cartridge 166 to carbonation chamber 142. Carbonation chamber 142 may be integrally formed in carbonator 104. In the example embodiment shown in FIG. 8, transfer mechanism 170 comprises at least one cutter 170a configured to cut away at least a portion of the carbon dioxide cartridge 166 when the carbon dioxide cartridge 166 is inserted into carbonator 104 to release the carbon dioxide source 144 from the carbon dioxide cartridge 166 into carbonation chamber 142.

Figure 9:
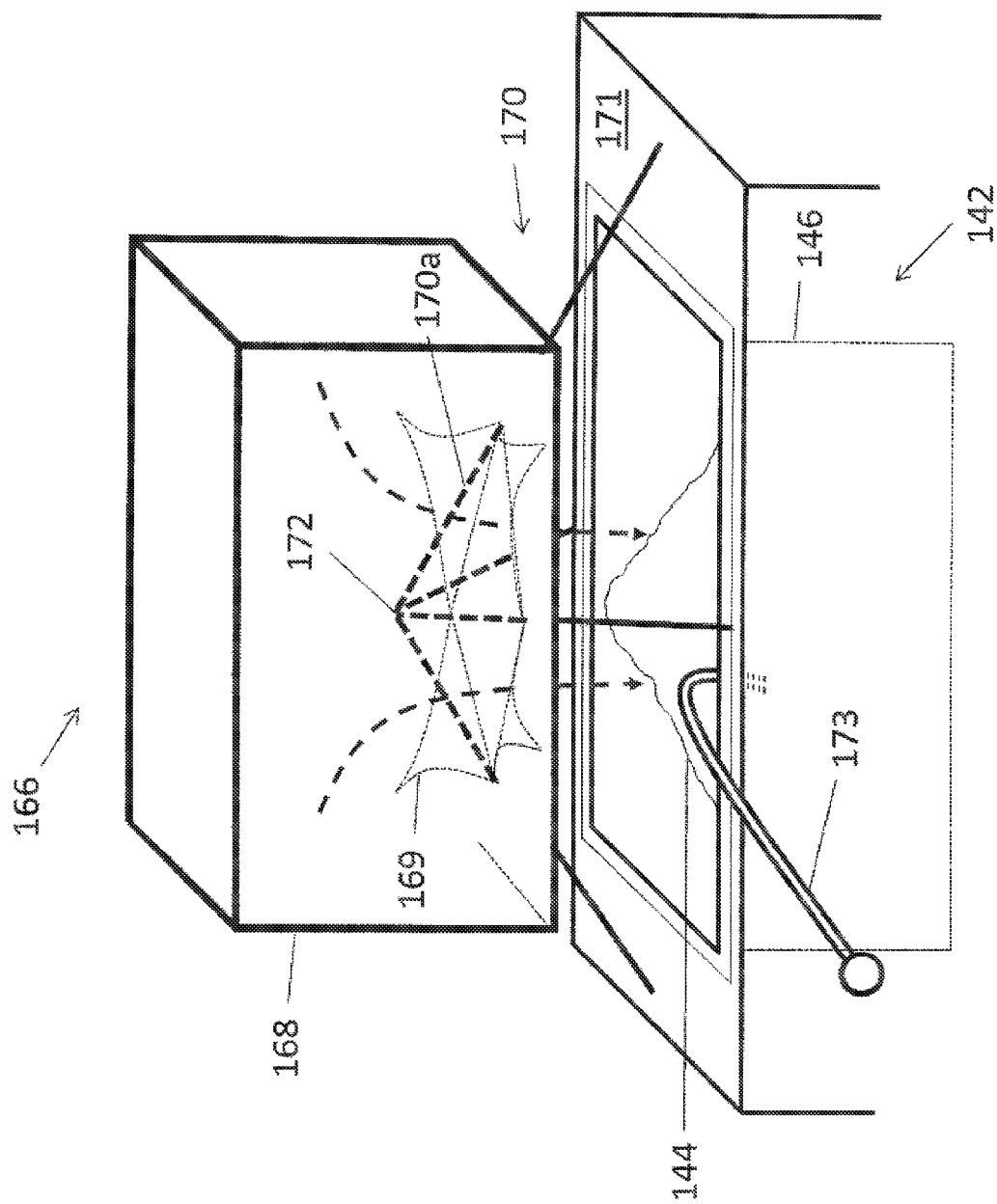
FIG. 9 is a perspective view of the carbon dioxide and transfer mechanism of FIG. 8, wherein the carbon dioxide cartridge is open.

In the example embodiment shown in FIG. 8, cutter 170a may sit on top surface 171 of carbonation chamber 142. As illustrated, cutter 170a may be a pyramid shaped metal wire that converges at a sharp apex 172. Optionally, cutter 170a is recessed into cartridge holder 167 (see FIG. 5, not shown in FIG. 8) to minimize the risk that cutter 170a injures the user's hand when carbon dioxide cartridge 166 is placed into cartridge holder 167. As exemplified, top surface 171 of carbonation chamber 142 has an access hatch 146 that falls downwardly when the user pulls lever 173. Access hatch 146 is illustrated as a hinged door, but it may also be a sliding door, for example FIG. 8 exemplifies access hatch 146 in the closed position. FIG. 9 exemplifies access hatch 146 in the open position, after the user has pulled lever 173. In the alternative, a depressible button may be used to open access hatch 146. As exemplified in FIG. 9, when the user advances carbon dioxide cartridge 166 into cartridge holder 167 (see FIG. 5, not shown in FIG. 9), pierceable portion 169 comes into contact with apex 172 of cutter 170a, and is pierced or punctured to create an opening in carbon dioxide cartridge 166.

Referring to the example embodiment shown in FIG. 9, once cutter 170a creates an opening in hollow housing 168 of carbon dioxide cartridge 166, carbon dioxide source 144 is transferred from carbon dioxide cartridge 166 to carbonation chamber 142. Optionally, carbonation chamber 142 is located below cartridge holder 167, and transfer mechanism 170 is configured to create an opening in the bottom of hollow housing 168. In this case, once hollow housing 168 is opened, carbon dioxide source 144 falls from carbon dioxide cartridge 166 into carbonation chamber 142. Alternatively, cartridge holder 167 is not necessarily located above carbonation chamber 142. In this case, a negative pressure pump (not shown) may be used to draw the carbon dioxide source 144 from carbon dioxide cartridge 166 into carbonation chamber 142.

Referring to the example embodiment shown in FIG. 9, after carbon dioxide source 144 moves into carbonation chamber 142, the lever may be returned to its original position to close access hatch 146. Once access hatch 146 has closed, the carbonation process may be commenced. In turn, the carbon dioxide source 144 reacts with the liquid in carbonation chamber 142 to form the carbon dioxide gas therein, which then travels to container chamber 122 (see FIG. 5).

Figure 10:
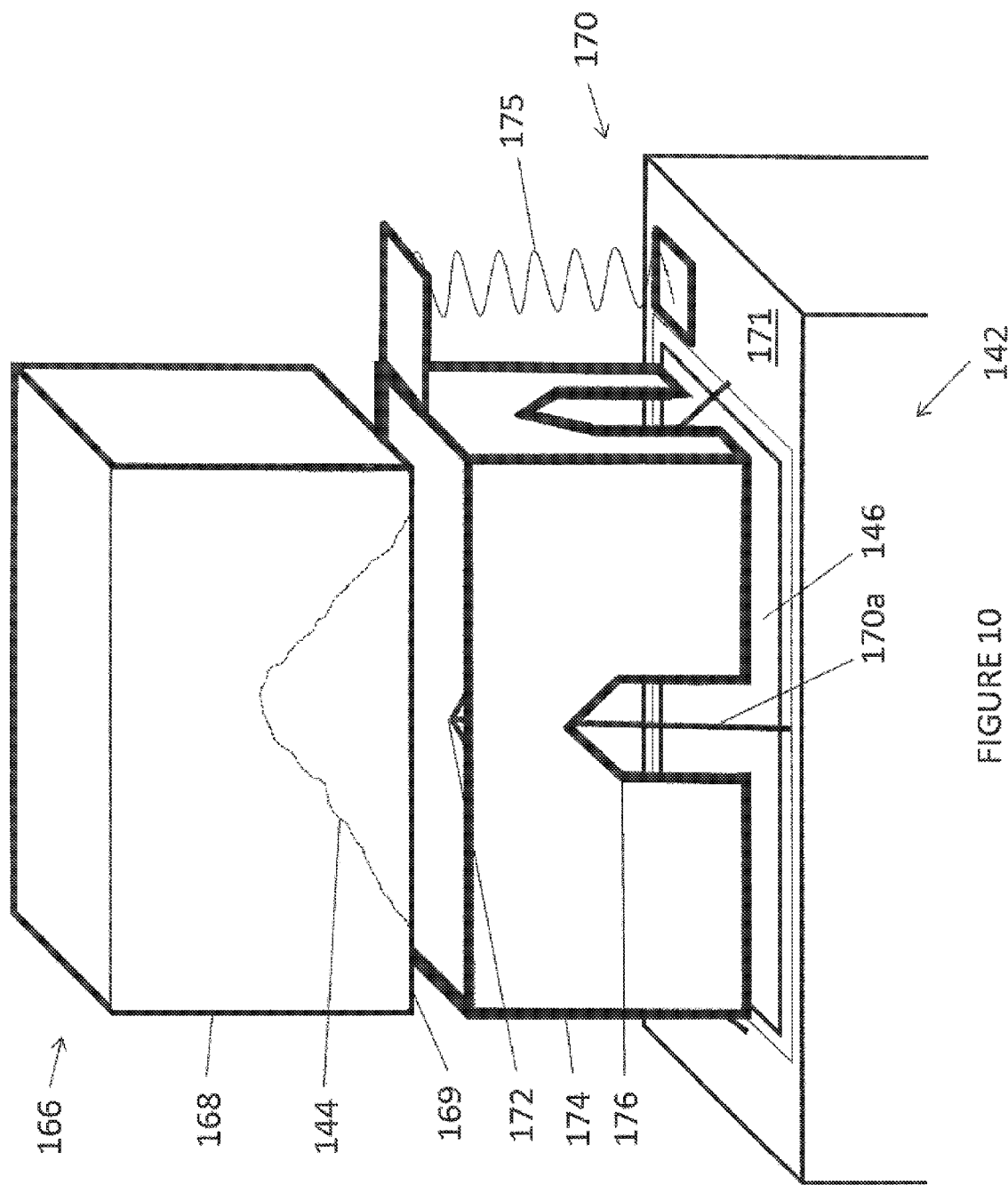
FIG. 10 is a perspective view of the carbon dioxide cartridge of FIG. 8 and another exemplary transfer mechanism, wherein the carbon dioxide cartridge is sealed.
Figure 11:
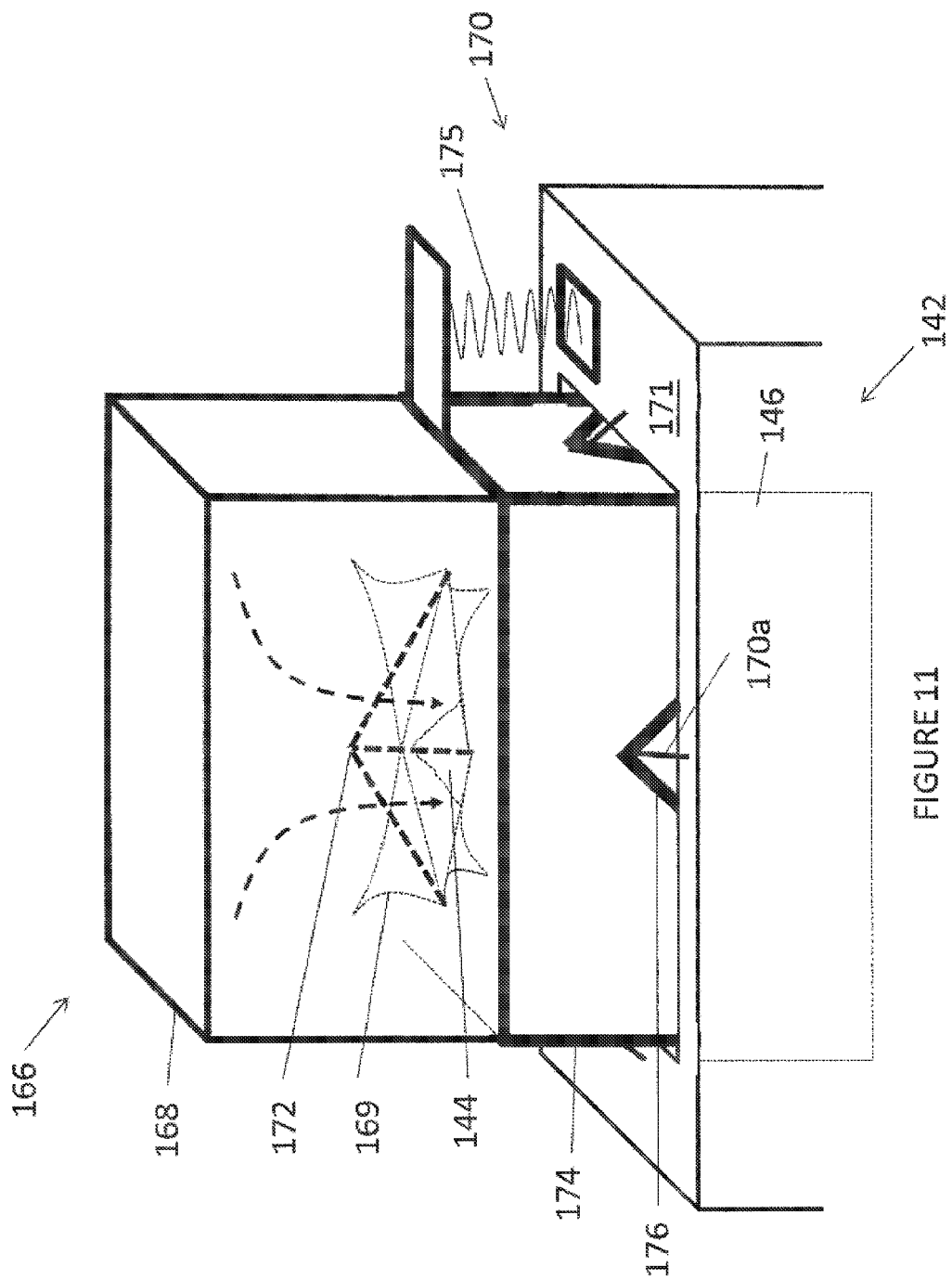
FIG. 11 is a perspective view of the carbon dioxide cartridge and transfer mechanism of FIG. 10, wherein the carbon dioxide cartridge is open.

An alternative transfer mechanism 170 is illustrated in FIGS. 10 and 11. FIG. 10 shows access hatch 146 and cutter 170a as discussed above. However, in this embodiment, a moveable shaft 174 is biased away from access hatch 146 by spring 175. Moveable shaft 174 has recesses 176 therein for accommodating cutter 170a. In the embodiment shown in FIG. 11, when the user places carbon dioxide cartridge 166 into cartridge holder 167 (FIG. 5), carbon dioxide cartridge 166 pushes moveable shaft 174 against access hatch 146 to push access hatch 146 into carbonation chamber 142. Once carbonation chamber 142 is open, carbon dioxide source 144 is transferred to carbonation chamber 142 (by gravity or a pressure differential, for example).

When the user removes carbon dioxide cartridge 166 from cartridge holder 167, spring 175 biases moveable shaft 174 to its initial position, thereby allowing access hatch 146 to move to a closed position. Alternatively, the process of lifting moveable shaft 174 may be started automatically my opening a latch that otherwise holds moveable shaft 174 down. Optionally, access hatch 146 is spring-loaded (not shown), and thereby biased to the closed position. Once access hatch 146 has closed, the carbonation process may begin.

Although transfer mechanism 170 has been explained as comprising at least one cutter 170a, transfer mechanism 170 may operate without a cutter. As one example, negative pressure may be used to tear away a perforated portion of carbon dioxide cartridge 166, to access carbon dioxide source 144 therein.

For the example embodiment shown in FIG. 5, when at least a portion of carbon dioxide cartridge 166 is inserted into carbonator 104, carbon dioxide cartridge 166 is optionally removed from carbonator 104 after a single carbonation process has been completed, as discussed above. Optionally, carbon dioxide cartridge 166 is disposable, and may be discarded into the trash or recycled after use.

In an alternative embodiment, carbon dioxide cartridge 166 may be manually openable by the user. It may be similar to a coffee creamer pack, for example, as is known in the art to have a peel-off lid. Referring to FIG. 1, in this case, the user may open the carbon dioxide cartridge 166 outside of the carbonator 104 and pour the carbon dioxide source 144 (shown in FIG. 8) from the cartridge into carbonation chamber 142, without inserting any portion of carbon dioxide cartridge 166 into carbonator 104.

In some embodiments, carbonator 104 has a waste reservoir 177 (see FIG. 1). Some particular liquids and carbon dioxide sources react with one another to produce residual waste products. For example, tap water will react with a mixture of citric acid and sodium bicarbonate to produce some solid residual waste product, such as, for example, sodium citrate. As illustrated in FIG. 1, waste reservoir 177 may be located in carbonator 104 outside carbonation chamber 142. Waste reservoir 177 is at least partially removable from a remaining portion of carbonator 104 (i.e. the portion of carbonator remaining after waste reservoir 177 is removed). Waste reservoir 177 may be a container that is removable from the remainder of carbonator 104, as shown in FIG. 1. In some embodiments, waste reservoir is a sliding tray the user can pull at least partially out of carbonator 104 to access a waste product therein (not shown).

In one embodiment, waste reservoir 177 may be removed from carbonator 104 and rinsed or dumped into the trash, then reinserted into carbonator 104 for reuse. Typically, the user should clean and/or empty waste reservoir 177 after approximately every 5 to 10 carbonation cycles. In more specific embodiments, waste reservoir 177 may be cleaned and/or emptied after approximately 5 cycles. In some embodiments, the waste reservoir 117 may be configured to be cleaned out and/or emptied after every carbonation cycle. However, this will vary with the volume of liquid being carbonated per cycle, and the type of liquid and carbon dioxide source used.

Figure 12:
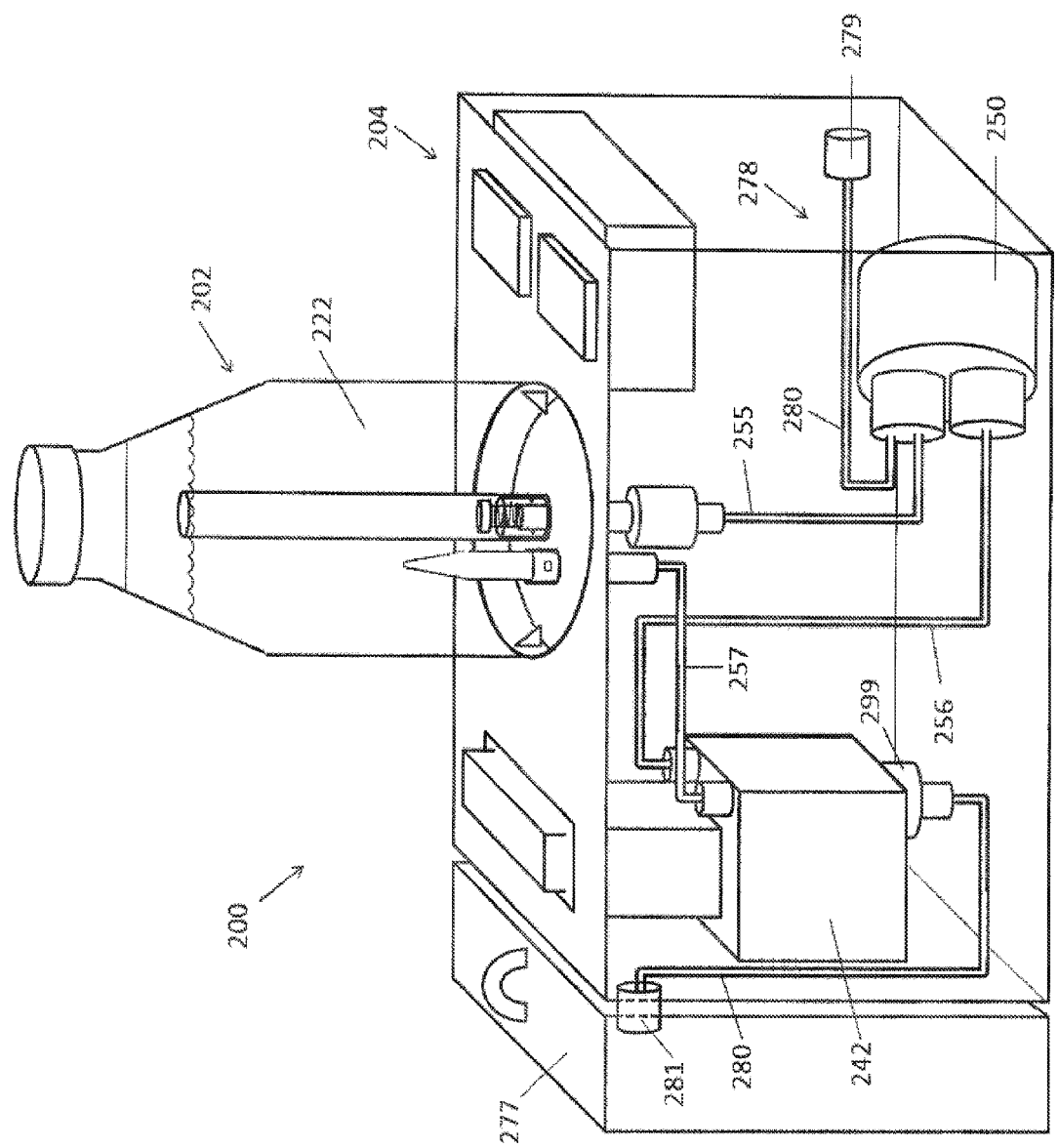
FIG. 12 is a cut-away perspective view of another exemplary beverage carbonation system.

Another exemplary beverage carbonation system is shown in FIG. 12. FIG. 12 illustrates another example beverage carbonation system 200. It will be appreciated that for simplicity and clarity of illustration, elements of beverage carbonation system 200 corresponding or analogous to elements of beverage carbonation system 100 are labeled with the same reference numerals as for beverage carbonation system 100 (plus 100). For brevity, the description of corresponding or analogous elements is not repeated.

Referring to FIG. 12, a waste valve 299 may be located in a wall of carbonation chamber 242 that is openable to release a waste product (not shown) from the carbonation chamber into waste reservoir 277. Waste valve 299 may be a directional control valve. More specifically, waste valve 299 may be an electrically controlled hydraulic directional control valve, such as, for example a solenoid valve. Alternatively, waste valve 299 may be a diaphragm valve or a pinch valve. Optionally, waste reservoir 277 is located below carbonation chamber 242 and waste valve 299 is located in a bottom wall of carbonation chamber 142. In this configuration (not shown), the waste product may be gravity and/or pressure fed into waste reservoir 277. In some embodiments, the waste product may be pumped out of carbonation chamber 242 through a wall that may or may not be a bottom wall of carbonation chamber 242, as will be discussed in more detail below.

In the embodiment shown in FIG. 12, beverage carbonation system 200 has waste evacuation system 278. Waste evacuation system 278 facilitates the removal of waste products from carbonation chamber 242. In some cases, waste evacuation system 278 removes the waste product (not shown) and some pressure from carbonation chamber 242, while substantially maintaining the pressure in container chamber 222.

As exemplified in FIG. 12, evacuation inlet 279 receives external air from the atmosphere. Pump 250 may draw the external air into evacuation inlet 279. Pump 250 then forces the external air through lines 280 and 256. In turn, the external air passes through carbonation chamber 242, then out of the remainder of carbonator 204 through evacuation outlet 281. In some embodiments external air is pumped through waste evacuation system 278 for approximately 15 seconds. In some embodiments, external air is pumped through waste evacuation system 278 for approximately 5 to 15 seconds. When the external air is forced through carbonation chamber 242, it dislodges residual waste (not shown) from the walls of carbonation chamber 242. Once the residual waste has been dislodged from the inside of the walls of carbonation chamber 242, it may fall (or be pumped) into waste reservoir 277 for removal by the user, as discussed above.

Figure 13:
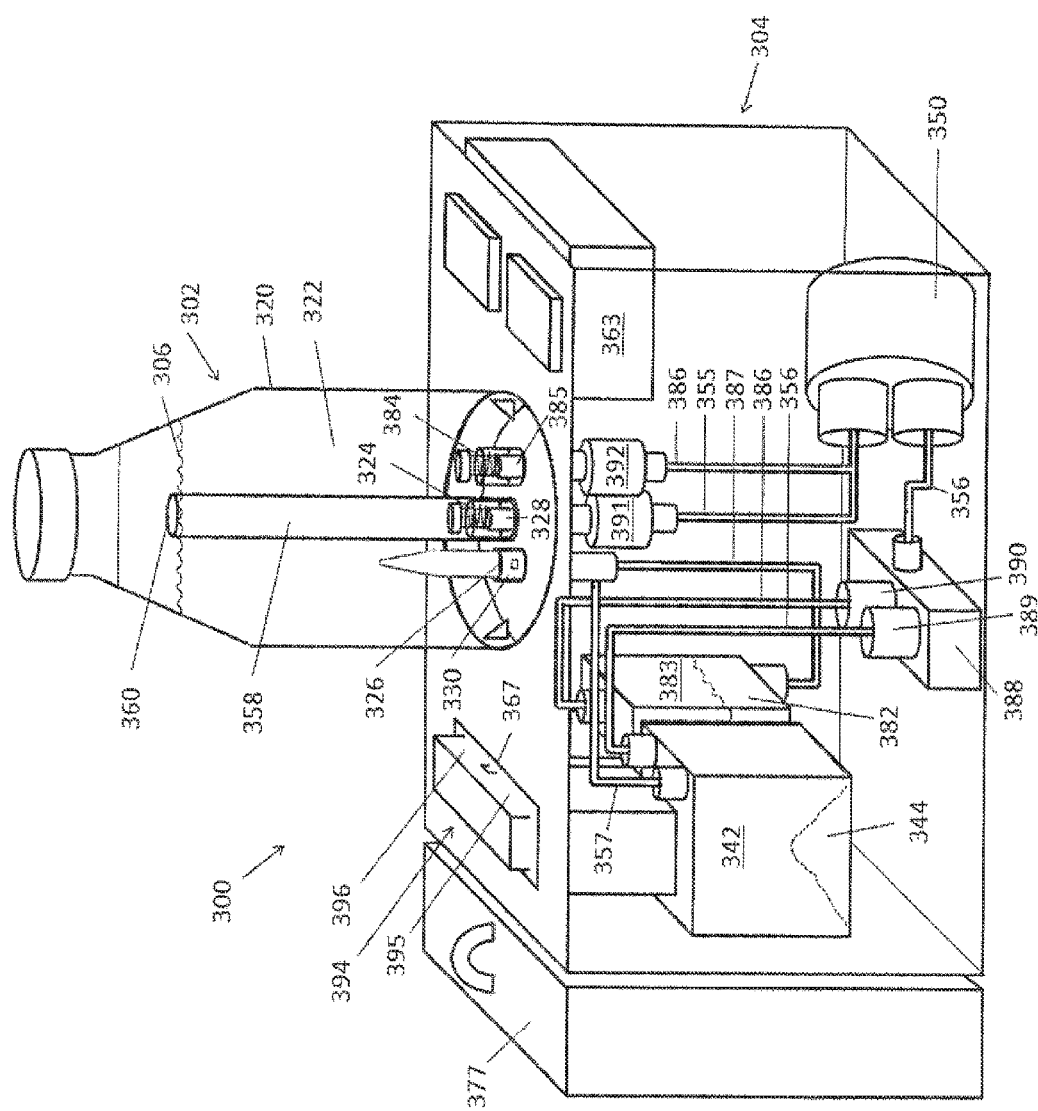
FIG. 13 is a cut-away perspective view of yet another exemplary beverage carbonation system.

FIG. 13 illustrates another example beverage carbonation system 300. It will be appreciated that for simplicity and clarity of illustration, elements of beverage carbonation system 300 corresponding or analogous to elements of beverage carbonation system 100 are labeled with the same reference numerals as for beverage carbonation system 100 (plus 200). For brevity, the description of corresponding or analogous elements is not repeated.

In this embodiment shown in FIG. 13, beverage carbonation system 300 has a flavor source 382 located in a flavor chamber 383. Flavor chamber 383 may be integrally formed in carbonator 304. Flavor source 382 may be, for example, flavor crystals, coffee grinds, instant coffee, syrup, minerals, concentrated juice, honey or any other beverage additive. Optionally, the flavor source 382 alters the taste of liquid 306. Flavor source 382 is in fluid communication with container chamber 322 to mix with liquid 306 to create flavored beverage in container chamber 322.

Waste evacuation system 278 has been described above with reference to FIG. 12 for removing residual waste (not shown) from carbonation chamber 242. Notably, waste evacuation system 278 may be used in a similar manner to remove a left-over flavor source 382 from flavor chamber 383 (see FIG. 13).

For the embodiment illustrated in FIG. 13, the flavoring process may start before, during or after the carbonation process outlined above. It will be appreciated that if the flavoring process starts before the carbonation process, the liquid 306 that mixes with the flavor source is the original, uncarbonated liquid 306. However, if the flavoring process starts after the carbonation process, the liquid that mixes with the flavor source is at least partially carbonated. In some embodiments, the flavoring cycle takes approximately 15 seconds.

In the embodiment shown in FIG. 13, container 302 has a second container outlet valve 384 in shell 320 having a closed position and an open position. Carbonator 304 has a second carbonator outlet port 385 fluidly engageable with second container outlet valve 384 when second container outlet valve 384 is in the open position. When container 302 is disengaged from carbonator 304, second container outlet valve 384 is closed to fluidly seal container 302 containing the flavored liquid.

Continuing to refer to the example embodiment shown in FIG. 13, second carbonator outlet port 385 and carbonator inlet port 330 are fluidly connected to flavor chamber 383 containing flavor source 382 that produces a flavored liquid. At least one pump 350 is in fluid communication with container chamber 322 and flavor chamber 383 to circulate liquid 306 between container chamber 322 and flavor chamber 383 when container 302 is engaged with carbonator 304, thereby flavoring liquid 306. Liquid 306 flows from container chamber 322 into flavor chamber 383 to interact with flavor source 382 to form a flavored liquid in the flavor chamber 383. Pump 350 pumps liquid 306 along line 386 from second carbonator outlet port 385 to pump 350, then from pump 350 to flavor chamber 383 along line 356 then line 386. Pump 350 then pumps flavored liquid from flavor chamber 383 to carbonator inlet port 330 via line 387.

In some embodiments, pump 350 may pump fluid through the flavor cycle, while another pump (not shown) pumps fluid through the carbonation cycle. Optionally, as shown in FIG. 12, one pump 350 moves fluid through both the carbonation cycle and the flavor cycle. In this case, a manifold 388 having a carbonation solenoid valve 389 and a flavor solenoid valve 390 is used. In this case, a first carbonator valve 391 and a second carbonator valve 392 may also be used.

In one embodiment having only one pump 350 (as exemplified in FIG. 13), during the carbonation process, first carbonator valve 391 and carbonation solenoid valve 389 are opened. Liquid 306 then flows sequentially through first container outlet valve 324, first carbonator outlet port 328, first carbonator valve 391, line 355, pump 350, line 356, carbonation solenoid valve 389, line 356, carbonation chamber 342, line 357, carbonator inlet port 330, container inlet valve 326 and into container chamber 322.

In this embodiment shown in FIG. 13 having only one pump 350, during the flavoring process, second carbonator valve 392 and flavor solenoid valve 390 are opened. Liquid 306 then flows sequentially through second container outlet valve 384, second carbonator outlet port 385, line 386, pump 350, line 356, flavor solenoid valve 390, line 386, flavor chamber 383, line 387, carbonator inlet port 330, container inlet valve 326 and into container chamber 322.

Typically, the carbonation process and flavoring process occur at different times for the embodiment shown in FIG. 13. In this case, when first carbonator valve 391 and carbonation solenoid valve 389 are open to facilitate carbonation, second carbonator valve 392 and flavor solenoid valve 390 are closed to block the flavoring process. Similarly, when second carbonator valve 392 and flavor solenoid valve 390 are open to facilitate flavoring, first carbonator valve 391 and carbonation solenoid valve 389 are closed to block carbonation. Optionally, when the flavoring process is occurring, carbon dioxide gas may be moving passively (without the aid of pump 350) from high pressure carbonation chamber 342 via line 357 to container chamber 322.

Continuing to refer to the example embodiment shown in FIG. 13, first carbonator valve 391 and second carbonator valve 392 may be any suitable types of valves, including, but limited to, directional control valves, diaphragm valves, or pinch valves. Controller 363 may be configured to open and close the carbonator and solenoid valves.

In the embodiment shown in FIG. 13, first container outlet valve 324 and second container outlet valve 384 are shown as two separate outlets. Alternatively, the first container outlet valve 324 and the second container outlet valve 384 may be the same container outlet. In other words, liquid 306 may pass through the same container outlet to be flavored and, at a different point in time, to facilitate carbonation. For example, liquid 306 may pass through first container outlet valve 324 to be flavored, and then pass through first container outlet valve 324 to facilitate carbonation, in the absence of a separate second container outlet valve 384. In this case, if carbonation tube 358 is present, the volume of water above first end 160 of carbonation tube 358 should be sufficient for carbonation and flavoring purposes.

In the embodiment shown in FIG. 13, a single container inlet valve 326 and single carbonator inlet port 330 are present. In this case, the carbon dioxide gas and the flavored liquid enter container chamber 322 via the same container inlet valve 326 and carbonator inlet port 330. Alternatively, a second container inlet valve and a second carbonator inlet port (not shown) may be present so that the carbon dioxide gas and the flavored liquid enter container chamber 322 via different container inlet valve/carbonator inlet port.

For liquid 306 to be flavored, a flavor source 382 is present in flavor chamber 383. An example structure and process for providing flavor source 382 into flavor chamber 383 will now be discussed.

Figure 14:
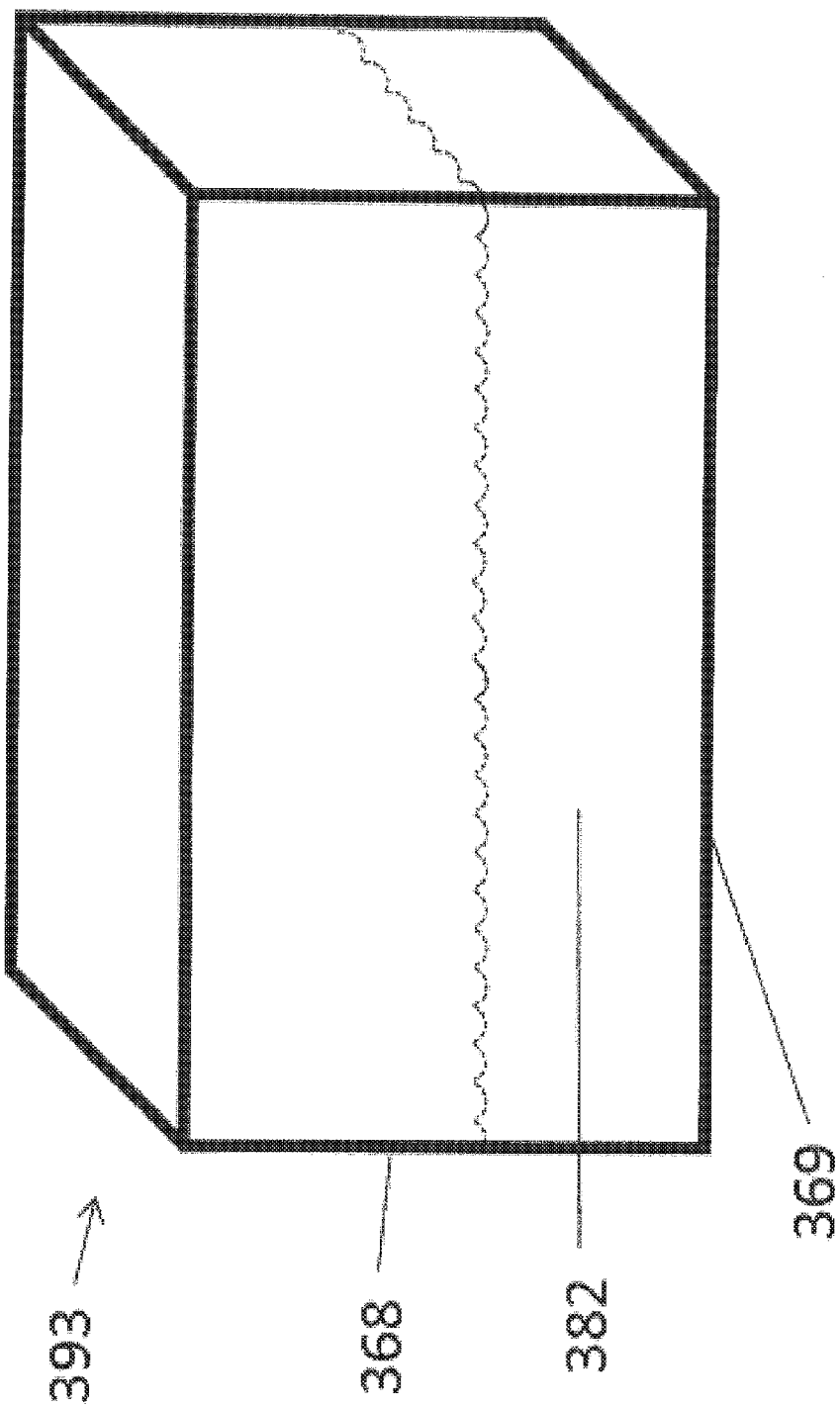
FIG. 14 is a perspective view of an exemplary flavor cartridge.

In some embodiments, beverage carbonation system 300 has a flavor cartridge 393 for containing flavor source 382. An example flavor cartridge is shown in FIG. 14. Carbonator 304 may have a cartridge holder 367 therein (see FIG. 13) for receiving at least a portion of flavor cartridge 393, shown in FIG. 14. Flavor cartridge 393 may be similar in structure and operation as the carbon dioxide cartridge 166 illustrated in FIG. 8. It will be appreciated that for simplicity and clarity of illustration, elements of carbon dioxide cartridge 166 corresponding or analogous to elements of flavor cartridge 393 are labeled with the same reference numerals as for carbon dioxide cartridge 166 (plus 200). For brevity, the description of corresponding or analogous elements is not repeated.

A transfer mechanism, similar in structure and operation to transfer mechanism 170 outlined above with respect to either of the embodiments shown in FIGS. 8-9 and FIGS. 10-11 may be used to release the flavor source 382 from flavor cartridge 393 (FIG. 14) into flavor chamber 383 (FIG. 13).

In an alternative embodiment, flavor cartridge may be manually openable by the user. It may be similar to a coffee creamer pack, for example, as is known in the art to have a peel-off lid. In this case, the user may open the flavor cartridge 393 (shown in FIG. 14) outside of the carbonator 104 and pour the flavor source 382 from the cartridge into the flavor chamber 383 (shown in FIG. 13), without inserting any portion of flavor cartridge 393 into carbonator 304.

Figure 15:
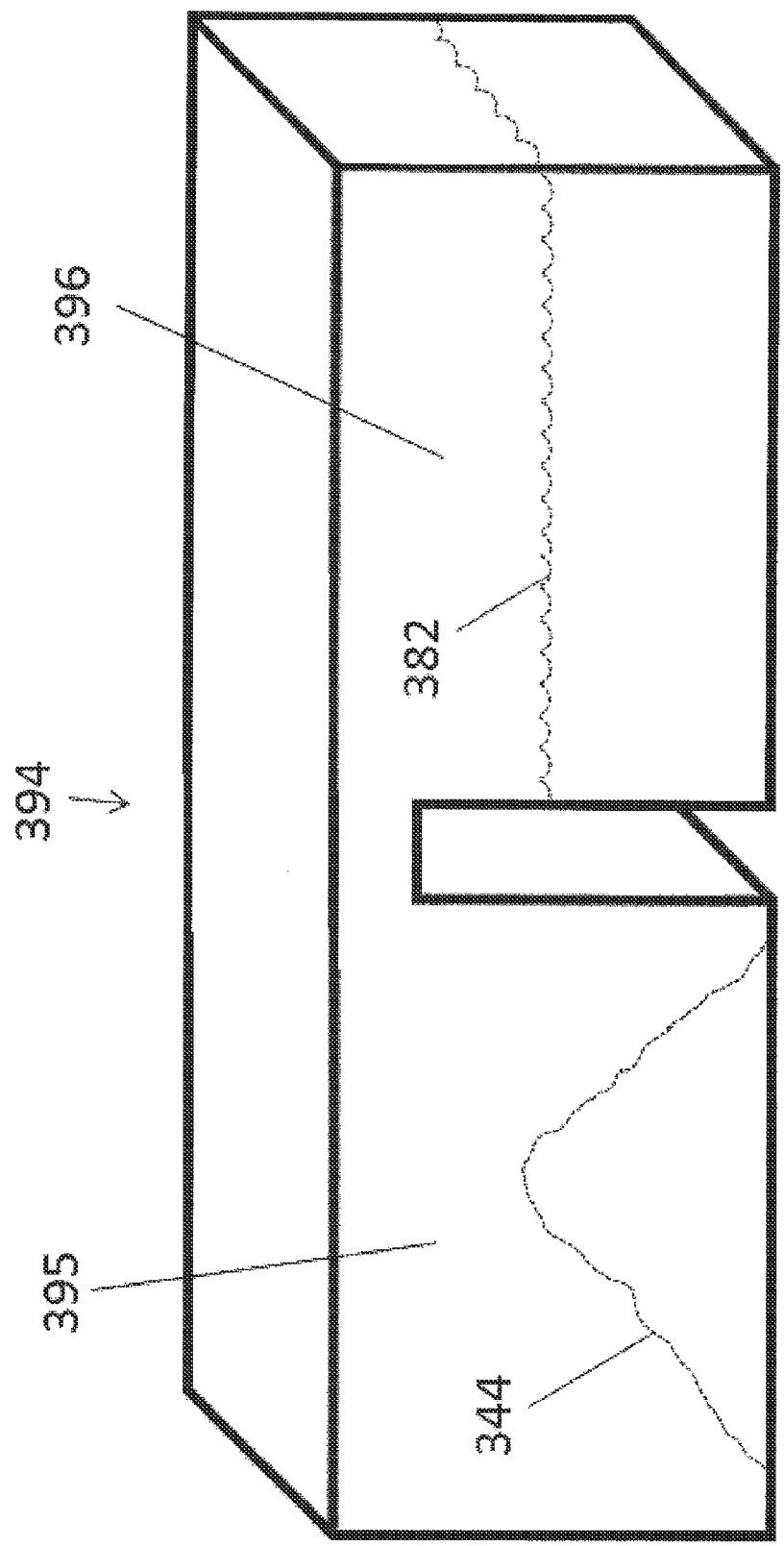
FIG. 15 is a perspective view of an exemplary combination cartridge having a carbon dioxide portion and a flavor portion.

FIG. 15 shows an alternative embodiment for the carbon dioxide and flavor cartridges. FIG. 15 provides an example embodiment of a combination cartridge 394 having a carbon dioxide portion 395 for containing carbon dioxide source 344. Combination cartridge 394, as exemplified in FIG. 15, also has a flavor portion 396 for containing flavor source 382. The beverage carbonation system may comprise at least one cartridge holder 367 (see FIG. 13) for receiving at least a portion of carbon dioxide portion 395 and flavor portion 396.

Referring to the example embodiment shown in FIG. 13, when combination cartridge 394 is present, beverage carbonation system 300 has at least one transfer mechanism (not shown) for transferring flavor source 382 from flavor portion 396 to flavor chamber 383 and carbon dioxide source 344 from carbon dioxide portion 395 to carbonation chamber 342. The at least one transfer mechanism may be similar in structure and operation to transfer mechanism 170 outlined above with respect to either of the embodiments shown in FIGS. 8-9 and FIGS. 10-11. There may be a corresponding transfer mechanism for each of the carbon dioxide portion 395 and flavor portion 396, or a single transfer mechanism for both.

As exemplified in FIG. 13, carbon dioxide portion 395 and flavor portion 396 may be coupled to one another. In some cases, this coupling allows for simultaneous insertion into at least one cartridge holder 367. It may be more convenient for the user to insert one cartridge body into the carbonator, instead of two separate cartridges. Carbon dioxide portion 395 and flavor portion 396 may be formed as one cartridge having a wall or partial gap therebetween. Optionally, combination cartridge 394 is removable from carbonator 304. When the cartridge portions are coupled together, it is easier for the user to remove and dispose of one cartridge body rather than two unconnected cartridges.

Figure 16:
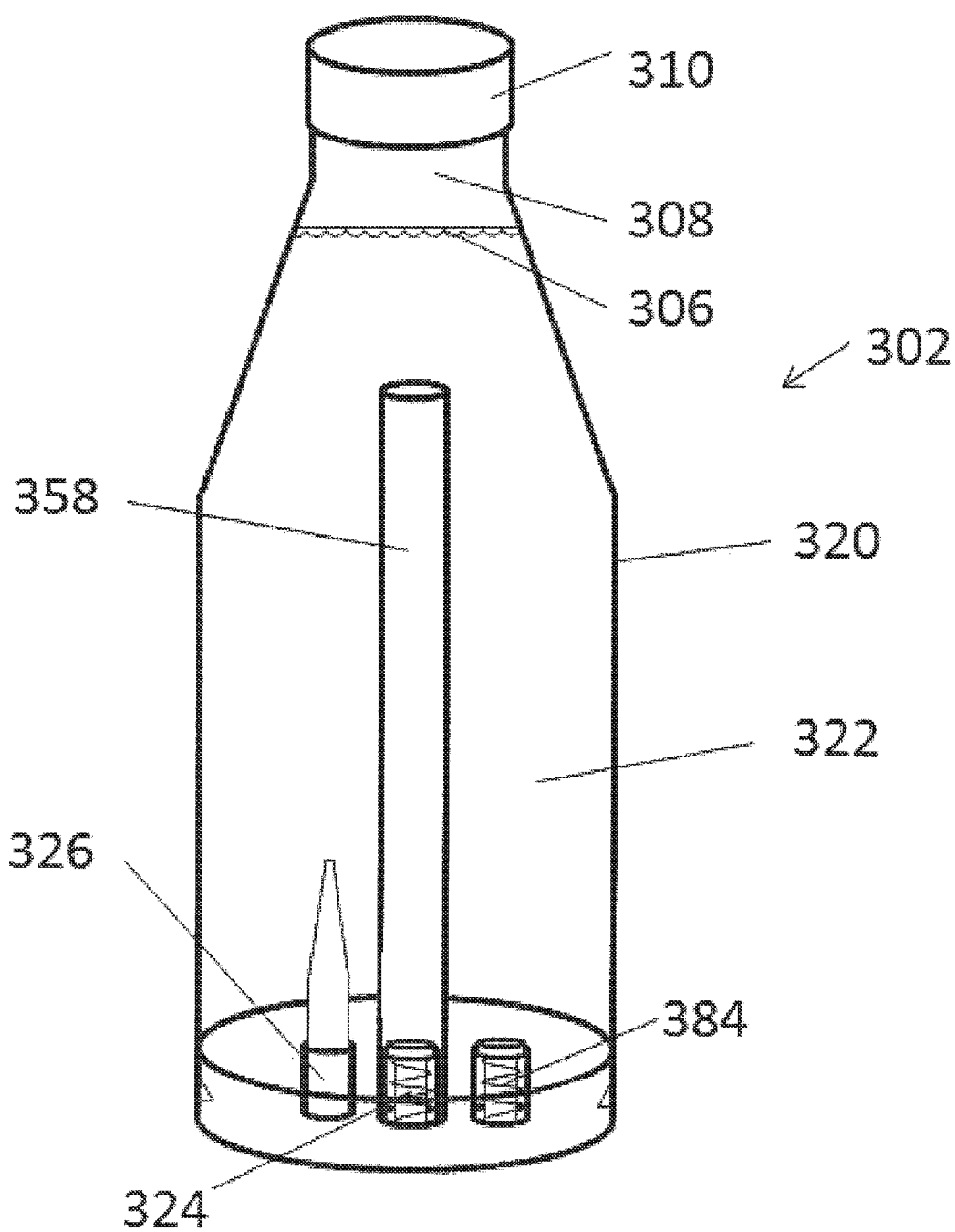
FIG. 16 is a cut-away perspective view of another exemplary container.

A further embodiment of the invention consists of container 302 for making a carbonated beverage, as illustrated in FIG. 16.

Container 302, as discussed above with respect to FIG. 13 and exemplified in FIG. 16 is removably engageable with a carbonator (such as carbonator 304 shown in FIG. 13, for example). Second container outlet valve 384 exemplified in FIG. 16 is fluidly engageable with second carbonator outlet port 385 of carbonator 304 (FIG. 13) when second container outlet valve 384 is in the open position.

Continuing to refer to the embodiments shown in FIGS. 13 and 16, container chamber 322 is fluidly engageable with at least one pump 350 in fluid communication with flavor chamber 383 (FIG. 13) to circulate liquid between container chamber 322 and flavor chamber 383 when container 302 is engaged with carbonator 304 (FIG. 13), thereby flavoring the liquid.

When container 302, as exemplified in FIG. 16, is disengaged from a carbonator (see carbonator 304 in FIG. 13, for example), second container outlet valve 384 may be closed to fluidly seal container 302 containing the flavored liquid.

Figure 17:
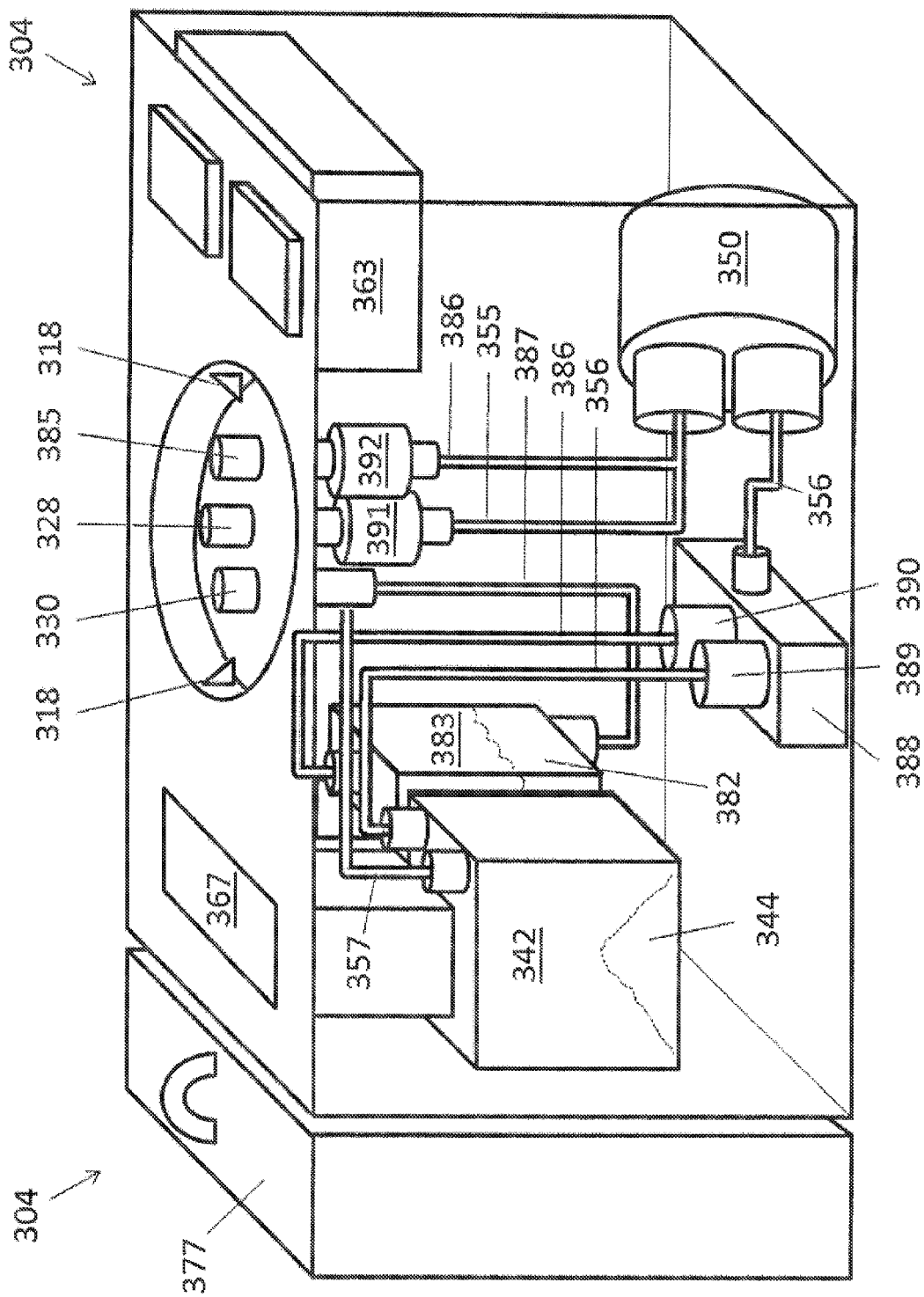
FIG. 17 is a cut-away perspective view of another exemplary carbonator.

A further embodiment of the invention consists of carbonator 304 for making a carbonated beverage, as discussed above with respect to FIG. 13 and exemplified in FIG. 17. Exemplary carbonator 304 has a flavor chamber 383 containing a flavor source 382 that produces a flavored liquid. As exemplified in FIG. 17, second carbonator outlet port 385 is fluidly connected to flavor chamber 383. When container 302 is disengaged from carbonator 304, second container outlet valve 384, along with first container outlet valve 324 and container inlet valve 384 (FIG. 13), is closed to fluidly seal container 302 containing the flavored liquid.

Figure 18:
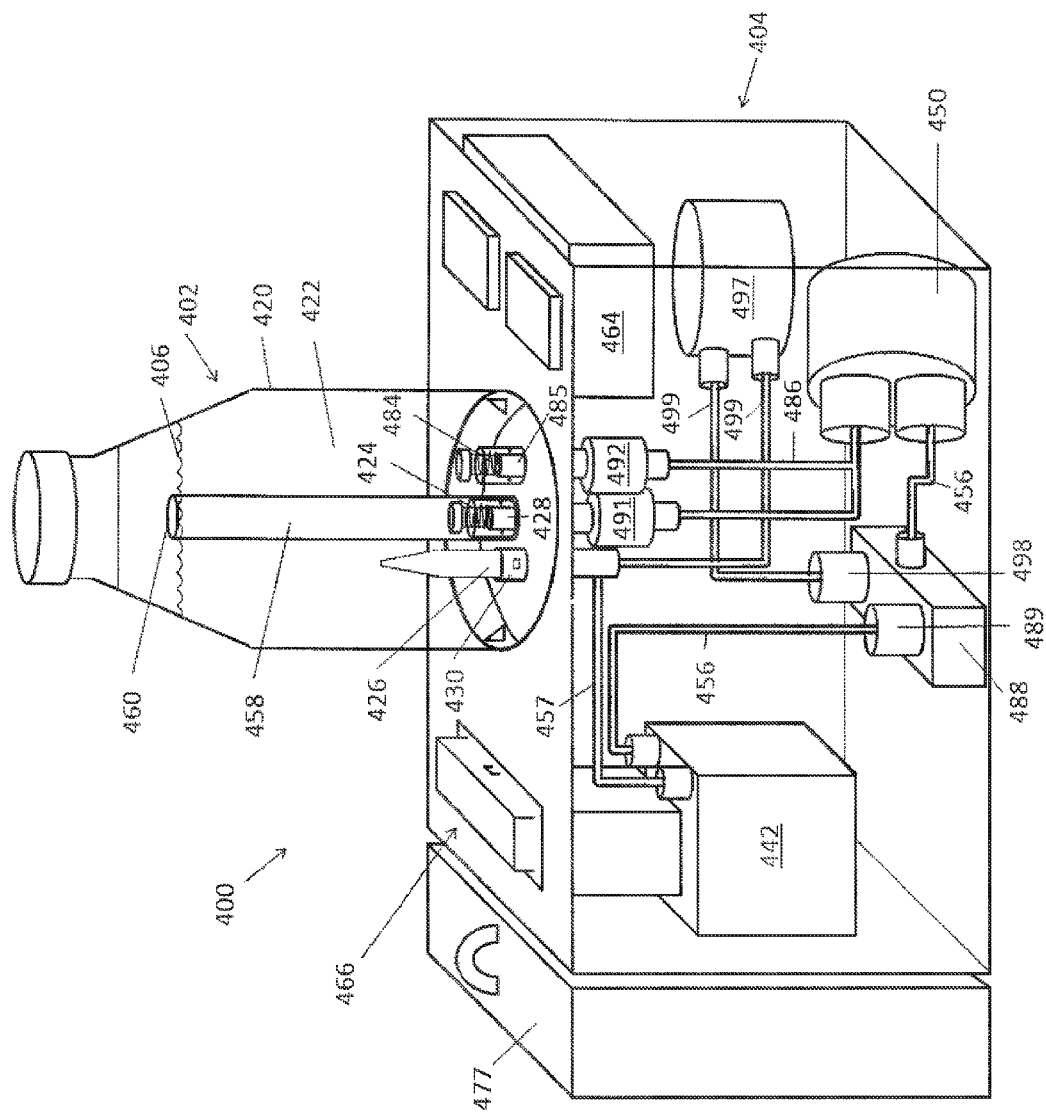
FIG. 18 is a cut-away perspective view of a further exemplary beverage carbonation system.

Another example beverage carbonation system 400 is shown in FIG. 18. It will be appreciated that for simplicity and clarity of illustration, elements of beverage carbonation system 400 corresponding or analogous to elements of beverage carbonation system 100 are labeled with the same reference numerals as for beverage carbonation system 100 (plus 300). For brevity, the description of corresponding or analogous elements is not repeated.

In this embodiment shown in FIG. 18, beverage carbonation system 400 has a removable filter (not shown) located in a filter chamber 497. As exemplified in FIG. 18, filter chamber 497 in carbonator 404 contains a removable filter (not shown) in fluid communication with container chamber 422 to filter liquid 406. In some cases, the user needs to replace the removable filter approximately every 50 filtration cycles.

The filtering process may start before or after the carbonation process outlined above. It will be appreciated that if the filtration process starts before the carbonation process, the liquid 406 that mixes with the flavor source is the original, uncarbonated liquid 406. However, if the filtering process starts after the carbonation process, the liquid that passes through the filter is at least partially carbonated. Preferably, liquid 106 is filtered before it is carbonated. Alternatively, the carbonated liquid can be subsequently filtered. However, it is preferred to run the carbonated liquid thorough the filter at an elevated pressure. At lower pressures, the filter may undesirably remove some carbonation from the carbonated liquid. In some embodiments, In some embodiments, the filtering process lasts for approximately 20 to 60 seconds.

Typically, the filtering process occurs before any flavoring process. Otherwise, the filter may undesirably remove some of the flavor from any flavored liquid.

The filtering process occurs when container 402 is engaged with carbonator 404, as exemplified in FIG. 18. In the example embodiment shown in FIG. 18, when second container outlet valve 484 is open and fluidly engages second carbonator outlet port 485, liquid 406 flows from container chamber 422 into filter chamber 497 to pass through a filter (not shown) therein, to form a filtered liquid. The filter may be an active carbon filter, for example. Alternatively, the filter (not shown) in filter chamber 497 may be a reverse osmosis filter, a ultra-violet filter, or a membrane filter, for example.

As exemplified in FIG. 18, when container 402 and carbonator 404 are engaged with one another, container inlet valve 426 is fluidly coupled to carbonator inlet port 430 to receive the filtered liquid from filter chamber 497.

Continuing to refer to the example embodiment in FIG. 18, at least one pump 450 circulates liquid 406. Pump 450 may pump liquid 406 sequentially through second container outlet valve 484, second carbonator outlet port 485, second carbonator valve 492, line 486, pump 450, line 456, filter solenoid valve 498, line 499, filter chamber 497, line 499, carbonator inlet port 430, container inlet valve 426 and into container chamber 422.

In some embodiments, pump 450 may pump fluid through the filter cycle, while another pump (not shown) pumps fluid through the carbonation cycle. Optionally, as shown in FIG. 15, one pump 450 pumps fluid through both the carbonation cycle and the filter cycle. In this case, a manifold 488 may be used.

Typically, the carbonation process and filtration process occur at different times. In this case, referring to the example shown in FIG. 18, when first carbonator valve 491 and carbonation solenoid valve 389 are open to facilitate carbonation, second carbonator valve 492 and filter solenoid valve 498 are closed to block the filtering process. Similarly, when second carbonator valve 492 and filter solenoid valve 498 are open to facilitate flavoring, first carbonator valve 491 and carbonation solenoid valve 489 are closed to block carbonation. While the filtering is occurring, carbon dioxide gas may be passively moving (i.e. without the aid of pump 450) from high pressure chamber 442 via line 457 to container chamber 422.

Referring to the example shown in FIG. 18, filter solenoid valve 498 may be any suitable type of valve, including, but limited to, a directional control valve, diaphragm valve, or pinch valve. Controller 463 may be configured to open and close filter solenoid valve 498.

In the embodiment shown in FIG. 18, first container outlet valve 424 and second container outlet valve 484 are shown as two separate outlets. Alternatively, the first container outlet valve 424 and the second container outlet valve 484 may be the same container outlet. In other words, liquid 406 may pass through the same container outlet to be filtered and, at a different point in time, to facilitate carbonation. For example, liquid 406 may pass through first container outlet valve 424 to be filtered, then pass through first container outlet valve 424 to be carbonated, in the absence of a separate second container outlet valve 484. In this case, if carbonation tube 458 is present, the volume of water above first end 460 of carbonation tube 458 should be sufficient for filtering and carbonation.

In the embodiment shown in FIG. 18, a single container inlet valve 426 and single carbonator inlet port 430 are present. In this case, the carbon dioxide gas and the filtered liquid enter container chamber 422 via the same container inlet valve 426 and carbonator inlet port 430. Alternatively, a second container inlet valve and a second carbonator inlet port (not shown) may be present so that the carbon dioxide gas and the filtered liquid enter container chamber 422 via different container inlet valve/carbonator inlet ports.

Figure 19:
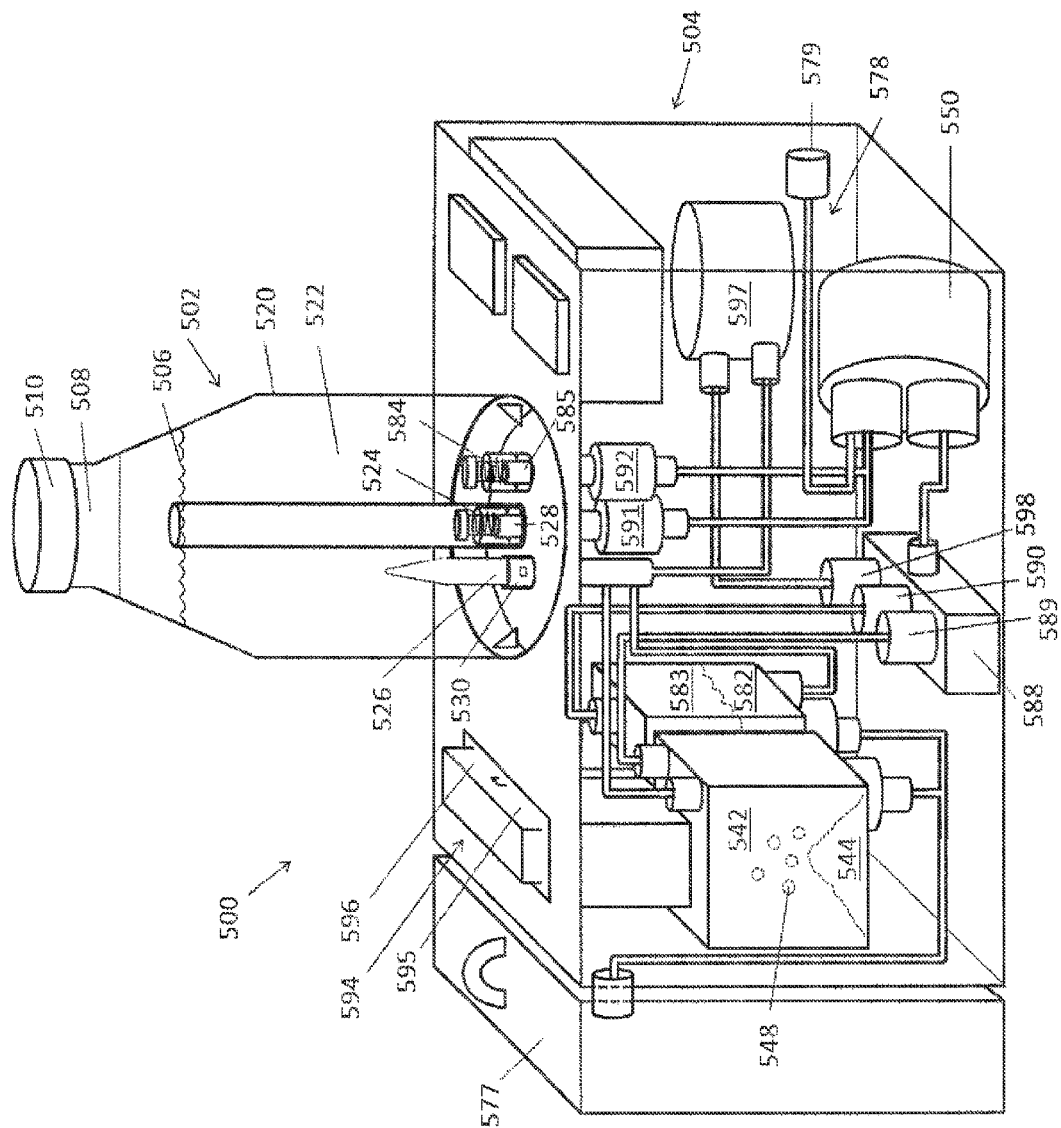
FIG. 19 is a cut-away perspective view of yet a further exemplary beverage carbonation system.

In a further embodiment, beverage carbonation system 500, as shown in FIG. 19, includes all of the features shown in FIGS. 5, 12, 13 and 18. FIG. 19 illustrates the respective features associated with carbonation, waste evacuation, flavoring and filtration. It will be appreciated that for simplicity and clarity of illustration, elements of beverage carbonation system 500 corresponding or analogous to elements of beverage carbonation systems 100, 200, 300 and 400 are labeled with the same reference numerals as for beverage carbonation systems 100, 200, 300 and 400 (but in the 500's). For brevity, the description of corresponding or analogous elements is not repeated.

In the embodiment shown in FIG. 19, beverage carbonation system 500 comprises carbonation chamber 542, evacuation system 578, flavor chamber 583 and filter chamber 597, each of which function as outlined above.

A further embodiment comprises a method of making a carbonated beverage. With reference to FIG. 19, the exemplary method comprises introducing liquid 506 into container 502. Container 502 is then sealed with closure 510. Container 502 is engaged with carbonator 504. A carbon dioxide source 544 is placed in carbonation chamber 542. This may be done by emptying the contents of the carbon dioxide portion 595 of combined cartridge 594 into carbonation chamber 542. This may be done before or after container 502 is engaged with carbonator 504. A first container outlet valve 524 in container 502 is opened to transfer a portion of liquid 506 to carbonation chamber 542 to react with carbon dioxide source 544 in carbonation chamber 542 to produce carbon dioxide gas 548. A container inlet valve 526 in container 502 is opened to transfer carbon dioxide gas 548 produced by carbon dioxide source 544 into container 502 to obtain a carbonated liquid in container 502. First container outlet valve 524 and container inlet valve 526 are then closed to seal container 502. Container 502 is then disengaged from carbonator 104. In some cases, this process takes approximately 40 seconds. In some cases, this process takes approximately 30 to 120 seconds.

Continuing to refer to FIG. 19, the following steps may occur prior to closing first container outlet valve 524 and container inlet valve 526 to seal container 502 and prior to disengaging container 502 from carbonator 504. A flavor source 582 may be placed in flavor chamber 583. This may be done before, after, or at the same time that carbon dioxide source 544 is placed in carbonation chamber 542. A second container outlet valve 584 is opened in container 502 to transfer a portion of liquid 506 to flavor chamber 583 to mix liquid 506 with flavor source 582 to produce a flavored liquid in flavor chamber 583. Container inlet valve 526 in container 502 is opened to transfer flavored liquid produced by flavor source 582 into container 502 to obtain a flavored liquid in container 502. Container inlet valve 526 may be opened before, during, or after liquid 506 initially mixes with flavor source 582. In some cases, the flavoring process takes approximately 15 seconds.

In some cases, liquid 506 is filtered by passing the liquid through a filter (not shown) located in carbonator 504 within filter chamber 597, to obtain a filtered beverage in container 502. In some cases, the filtration process takes approximately 20 seconds. In some embodiments, the filtration process takes approximately 20 to 60 seconds.

In some cases, external air is introduced into an evacuation system 578 to facilitate the removal of residual waste (not shown) and pressure from carbonation chamber 542. External air is introduced into carbonator 504 via evacuation inlet 579, passes through carbonation chamber 542 to dislodge residual waste therein, and then exits carbonator 504. In some cases, the external air is also introduced to the evacuation system to facilitate the removal of residual waste (not shown) and pressure from the flavor chamber 583 using the same process. In some cases, the external air cycles for approximately 15 seconds.

Continuing to refer to FIG. 19, an example method of producing a filtered, carbonated and flavored beverage is described below. In this case, liquid 506 is first filtered through filter chamber 597 and back to container chamber 522. After the filtering cycle completes, the carbonation cycle begins. As part of the carbonation cycle, liquid 506 is introduced to carbonation chamber 542 to react with carbon dioxide source 544 therein. After liquid 506 has been introduced to carbonation chamber 542, liquid 506 passes through flavor chamber 583 and back to container chamber 522 to produce a flavored beverage therein. During the flavoring cycle, carbon dioxide gas 548 passively moves from the higher pressure carbonation chamber 542 to the lower pressure container chamber 522, to inject the carbon dioxide gas 548 into container chamber 522. After the flavoring process has completed, carbon dioxide gas in headspace 163 of container chamber 522 is pumped through carbonation chamber 542 and back into container chamber 522. Alternatively, the entire carbonation cycle may be completed prior to the flavoring cycle (i.e. the process of carbon dioxide gas in headspace 163 of container chamber 522 passing through carbonation chamber 542 and back into container chamber 522 may also start and finish before the flavoring begins). After the cycling of the carbon dioxide gas and flavoring have been completed, waste evacuation system 578 is activated to remove a waste product from at least one of carbonation chamber 542 and flavor chamber 543. The entire process as described above, including container 102 and carbonator 104 engagement and disengagement, may take approximately the entire process may take approximately 70 to 210 seconds. In more specific embodiments, the entire process may take approximately 120 to 180 seconds, or, more specifically, 90 to 180 seconds. It will be appreciated that the timing of the entire process may vary in accordance with, for example, the quality of filtering desired, the speed of the pump, the level of carbonation desired, the volume of the system to be pressurized, the temperature of the liquid in the container, the type of carbon dioxide source and the type of flavor source.

In alternative embodiments, the example method of producing a filtered, carbonated and flavored beverage outlined above may be completed in the absence of at least one of the filtering cycle, the flavoring cycle and the waste evacuation cycle.

Figure 20:
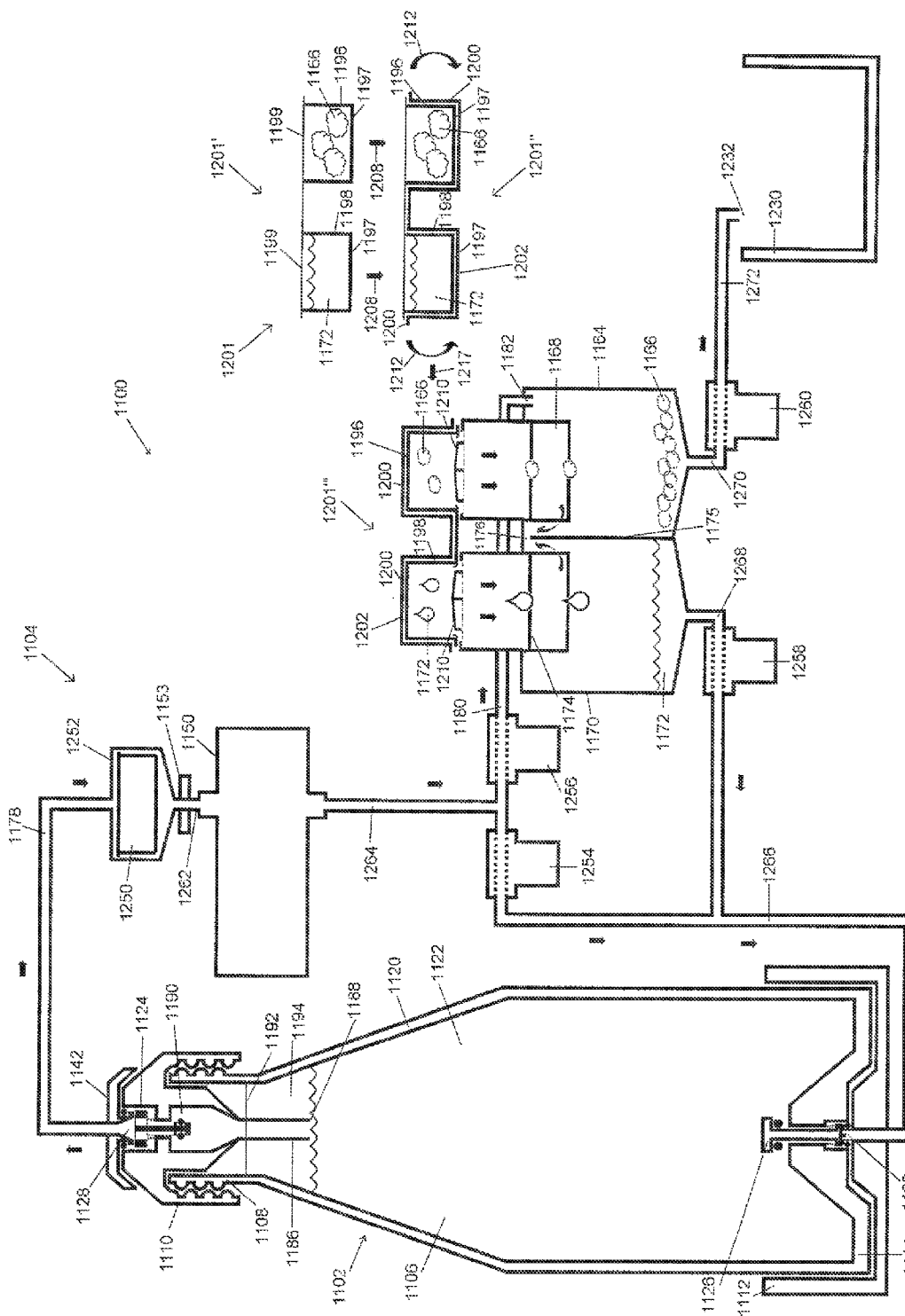
FIG. 20 is a schematic of yet another exemplary beverage carbonation system.

Reference is now made to FIG. 20, which shows a schematic of yet another example embodiment of a beverage carbonation system. In the example embodiment shown, a beverage carbonation system 1100 comprises a container 1102 and a carbonator 1104. Carbonator 1104 is removably engageable with container 1102.

Continuing to refer to FIG. 20, a user of beverage carbonation system 1100 may fill container 1102 with a liquid 1106, such as, but not limited to, water, juice, coffee and alcohol. In some cases, container 1102 has a mouth 1108 and a closure 1110 for sealing mouth 1108. After the user fills container 1102 with liquid 1106, the user may seal mouth 1108 with closure 1110. When container 1102 is filled with liquid 1106 and engaged with carbonator 1104, carbonator 1104 can draw a quantity of liquid 1106 from container 1102 for mixing with a reactive carbon dioxide source in the carbonator 1104 to produce gaseous carbon dioxide. The gaseous carbon dioxide is introduced into container 1102 to mix with the liquid therein to form a carbonated liquid in container 1102.

Optionally, the carbonator may also circulate the liquid through a flavor chamber containing a flavor source (e.g. flavor crystals, coffee grinds, or syrup) to obtain a flavored liquid. The user is able to disengage the container 1102 from carbonator 1104 to obtain a sealed carbonated beverage that may be opened for immediate consumption or stored for later use. The sealed carbonated beverage may share some characteristics with a store bought carbonated beverage, because sealed container 1102 limits exposure to ambient pressure and reduces carbonation losses.

Carbonator 1104 may include a container holder 1112 for receiving at least a portion of container 1102. In the example shown in FIG. 20, carbonator 1104 comprises a container holder 1112 sized to receive a base 1114 of container 1102. Optionally, container holder 1112 and base 1114 have corresponding circular shapes. In some embodiments, one or more of base 1114 and container holder 1112 comprise retentive elements for securing container 1102 to carbonator 1104. The retentive elements may comprise, for example, mating magnetic elements, mating threads, a friction grip or a detent mechanism.

Figure 21:
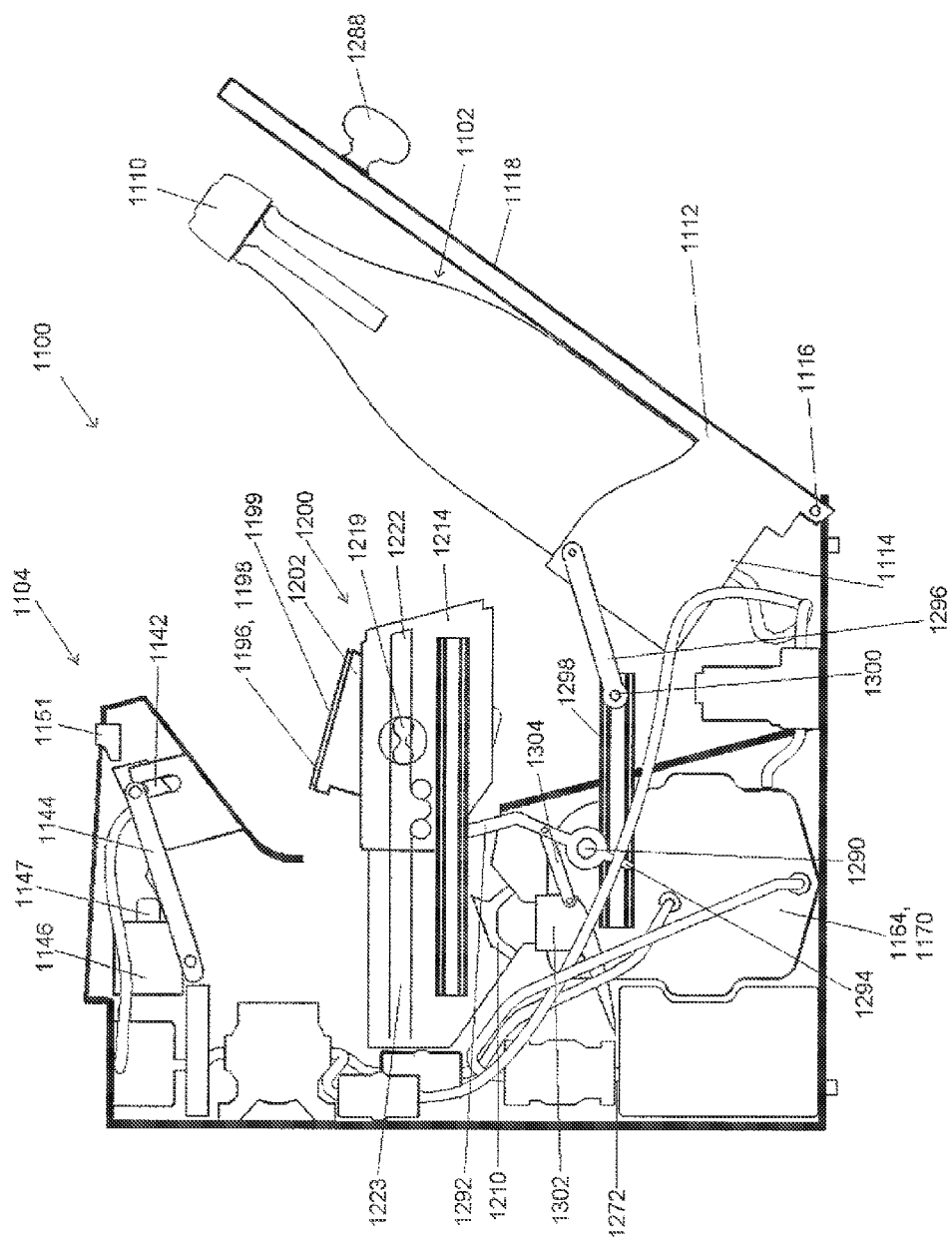
FIG. 21 is a cut-away side view of the beverage carbonation system schematically illustrated in FIG. 20, wherein the container holder is in the open position.
Figure 22:
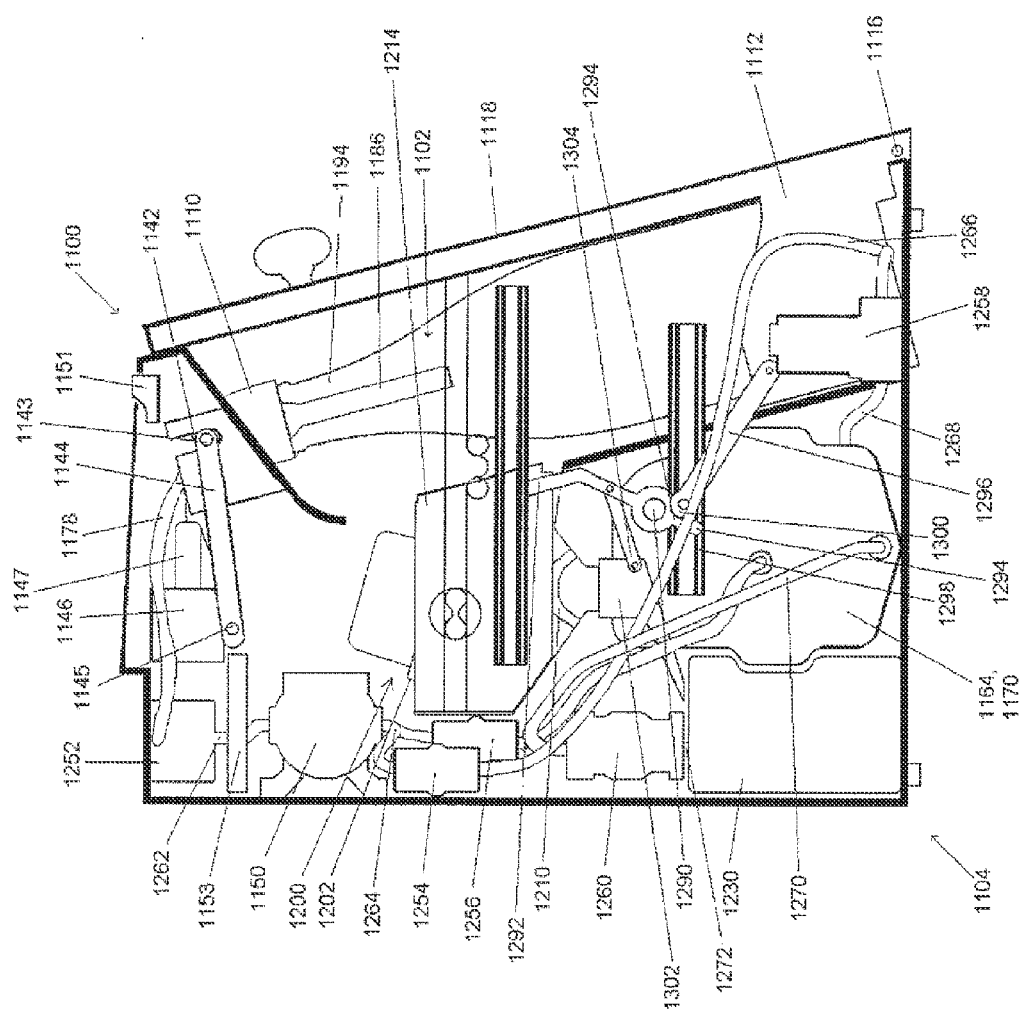
FIG. 22 is a cut-away side view of the beverage carbonation system of FIG. 21, wherein the container holder is in the closed position.

Reference is now made to FIGS. 21 and 22, which show side views of an exemplary carbonation system 1100 (shown schematically in FIG. 20) in accordance with at least one embodiment. In the example shown, container holder 1112 is rotatably connected to the remaining portion of carbonator 1104 about a pivot axis 1116. Container holder 1112 may be rotatable about the pivot axis 1116 between an open position and a closed position.

FIG. 21 shows container holder 1112 rotated about pivot axis 1116 to the open position. In the open position, a user has access to insert or remove container 1102 into or out of container holder 1112. FIG. 22 shows container holder 1112 rotated about pivot axis 1116 to the closed position. Beverage carbonation system 1100 may be configured to activate manually or automatically after container holder 1112 is rotated to the closed position when container 1102 is received in container holder 1112.

Optionally, retentive element(s) (not shown) can be engaged to lock container holder 1112 in the closed position. The retentive element(s) (e.g. a latch or magnetic lock) may automatically engage to lock container holder 1112 in the closed position when container holder 1112 is rotated into the closed position or when the operational cycle begins. The retentive element(s) may automatically disengage to permit container holder 1112 to rotate to the open position when the operational cycle completes. The retentive element(s) may be manually engaged or disengaged, using a lever or a button (not shown), for example.

Referring to FIG. 21, container holder 1112 may include a barrier 1118. Barrier 1118 may prevent fragments of container 1102 from projecting outwardly if pressure inside container 1102 causes container 1102 to shatter (e.g. where container 1102 is made of glass and container 1102 is structurally compromised by accident). Optionally, barrier 1118 is made of a transparent material, such as, for example plastic or glass. Under normal operating conditions, container 1102 is not expected to shatter; however barrier 1118 provides an additional layer of safety in the event of an accident.

Referring back to FIG. 20, container 1102 includes a shell 1120 defining a container chamber 1122 for holding liquid 1106. Shell 1120 may be made of ceramic, glass, plastic or metal, for example. As illustrated, base 1114 is a part of shell 1120. Container 1102 may be a bottle. Container 1102 may also have a mouth 1108 defined by shell 1120 for introducing the liquid 1106 into container chamber 1122. Optionally, mouth 1108 is located at the top of container 1102 and provides an upward facing opening when container 1102 stands upright. Optionally, at least a portion of shell 1120 tapers inwardly towards mouth 1108, to facilitate liquid consumption directly from mouth 1108, if desired.

In the example embodiment shown in FIG. 20, container 1102 comprises a closure 1110 for sealing mouth 1108. Closure 1110 may be configured to operatively open and seal mouth 1108. To open mouth 1108, closure 1110 may be removed entirely from mouth 1108. Closure 1110 may be a lid that is removably engageable with mouth 1108. Closure 1110 and mouth 1108 may have mating threads that permit a user to twist closure 1110 onto and off of container 1102. Optionally, closure 1110 is made of rubber material or has a rubber gasket therein to create a seal with mouth 1108. When the closure 1110 operatively opens mouth 1108, the user can pour a liquid into or out of mouth 1108. When closure 1110 operatively seals mouth 1108, mouth 1108 is sealed in a substantially gas-tight and liquid-tight manner.

Continuing to refer to the example embodiment shown in FIG. 20, container 1102 has a container outlet valve 1124. In the example shown, container outlet valve 1124 is located in closure 1110. Container outlet valve 1124 has a closed position and an open position. When closure 1110 is sealing mouth 1108, container outlet valve 1124 is in the open position and container 1102 is disengaged from carbonator 1104, container outlet valve 1124 provides an open passageway for fluid to travel between container chamber 1122 and the external atmosphere. When closure 1110 is sealing mouth 1108, and container outlet valve 1124 is in the closed position, fluid is blocked from exiting container chamber 1122 via container outlet valve 1124.

As exemplified in FIG. 20, container 1102 also has container inlet valve 1126. In some embodiments, container inlet valve 1126 is in shell 1120. Optionally, container inlet valve 1126 is located in base 1114. Container inlet valve 1126 has a closed position and an open position. If container inlet valve 1126 is open, and container 1102 is disengaged from carbonator 1104, container inlet valve 1126 provides an open passageway for fluid to travel between container chamber 1122 and the external atmosphere. When container inlet valve 1126 is closed, fluid is blocked from exiting container chamber 1122 via container inlet valve 1126.

When container 1102 is engaged with carbonator 1104, container outlet valve 1124 and container inlet valve 1126 may be opened to allow fluid to pass between container 1102 and carbonator 1104. When container 1102 is disengaged from carbonator 1104, container outlet valve 1124 and container inlet valve 1126 are closed to fluidly seal container 1102 containing carbonated liquid.

Container outlet valve 1124 and container inlet valve 1126 may be configured (e.g. biased by a spring or otherwise) to seal automatically upon, or prior to, the release of container 1102 from carbonator 1104. For example, container outlet valve 1124 and container inlet valve 1126 may be, as non-limiting examples, a mechanical spring valve or a check valve.

Container outlet valve 1124 and container inlet valve 1126 may be one-way valves. When open, container outlet valve 1124 may only allow fluid to flow out of container chamber 1122. When open, container inlet valve 1126 may only allow fluid to flow into container chamber 1122. More specifically, container outlet valve 1124 and container inlet valve 1126 may be a ball check valve, a stop check valve, a lift check valve, or a duckbill valve.

As previously discussed, recall that the terminology of container "outlet" and "inlet" valves used throughout this disclosure refer to the flow direction of fluid relative to the container (exemplified as container 102 in FIG. 1). A container "outlet valve" is applicable to fluid flow out of the container. Conversely, a container "inlet valve" is applicable to fluid flow into the container.

As shown in the example embodiment of FIG. 20, carbonator 1104 has a carbonator outlet port 1128. Carbonator outlet port 1128 is fluidly engageable with container outlet valve 1124 when container outlet valve 1124 is in the open position. When carbonator outlet port 1128 is fluidly engaged with container outlet valve 1124, carbonator outlet port 1128 and the container outlet valve 1124 are, directly or indirectly, fluidly coupled to one another. When the container outlet valve 1124 is open and fluidly engages carbonator outlet port 1128, fluid is able to flow through container outlet valve 1124 and carbonator outlet port 1128. In this manner, fluid passes between container chamber 1122 and carbonator 1104.

As shown in the example embodiment of FIG. 20, carbonator 1104 also has a carbonator inlet port 1130. Carbonator inlet port 1130 is fluidly engageable with container inlet valve 1126 when container inlet valve 1126 is in the open position. When carbonator inlet port 1130 is fluidly engaged with container inlet valve 1126, the carbonator inlet port 1130 and container inlet valve 1126 are, directly or indirectly, fluidly coupled to one another. When the container inlet valve 1126 is open and fluidly engages carbonator inlet port 1130, fluid is able to flow through container inlet valve 1126 and carbonator inlet port 1130. In this manner, fluid passes between carbonator 1104 and container chamber 1122 (see FIG. 20).

As previously discussed, recall that the terminology of carbonator "outlet" and "inlet" ports used throughout this disclosure refer to the flow direction of fluid relative to the container (exemplified as container 1102 in FIG. 20). An "outlet port" of the carbonator (exemplified as carbonator outlet port 1128 of carbonator 1104 in FIG. 20) engages an outlet valve of the container (exemplified as outlet valve 1124 of container 1102 in FIG. 1) and represents a carbonator port that provides fluid flow out of the container. Conversely, an "inlet port" of the carbonator (exemplified as carbonator inlet port 1130 of carbonator 1104 in FIG. 20) engages an inlet valve of the container (exemplified as inlet valve 1126 of container 1102 in FIG. 20) and represents a carbonator port that provides fluid flow into the container.

Figure 23:
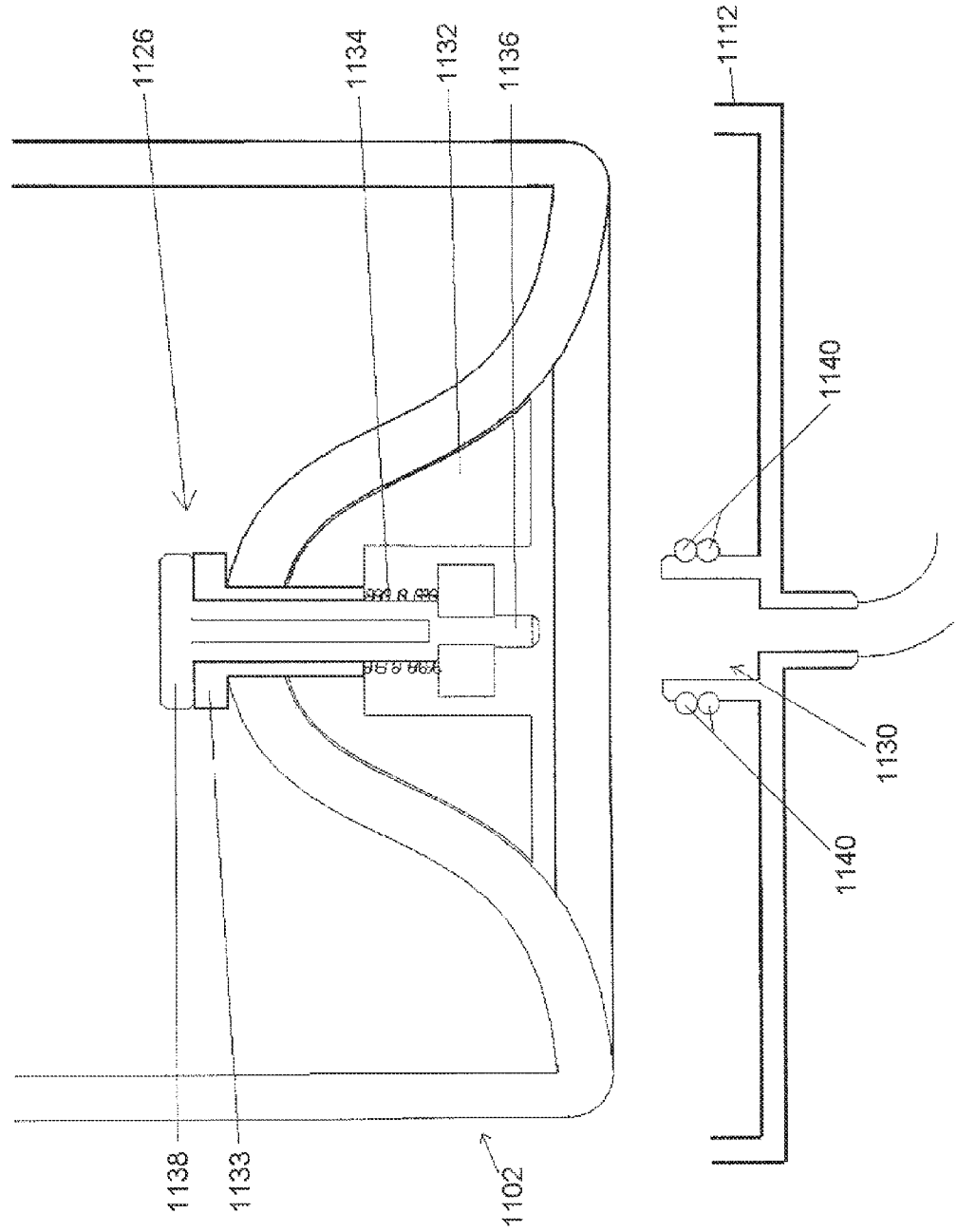
FIG. 23 is a cut-away side view of an exemplary container inlet valve and carbonator inlet port of the beverage carbonation system schematically illustrated in FIG. 20, in the closed position.

FIG. 23 shows a cross-sectional view of an exemplary container inlet valve 1126. Container inlet valve 1126 may be a mechanical spring valve or a check valve, for example. In the example shown, container inlet valve 1126 includes a housing 1132, a seat 1133, a spring 1134, a shaft 1136, and a cap 1138. Carbonator outlet port 1128 is receivable by housing 1132. Carbonator inlet port 1130 and housing 1132 may have corresponding hollow cylindrical shapes. Spring 1134 is coupled to seat 1133 and shaft 1136 to bias cap 1138 toward a closed position against the top of housing 1132. FIG. 23 shows container inlet valve 1126 in the closed position.

When carbonator inlet port 1130 is received by housing 1132, seals 1140 become wedged against housing 1132 and shaft 1136 along with cap 1138 are urged upwardly. In this manner, a fluid tight seal may be provided by seals 1140 and cap 1138 is moved away from seat 1133. When shaft 1136 rises, spring 1134 compresses to accommodate the movement of shaft 1136. The gap created between cap 1138 and seat 1133 provides an open passage (i.e. the valve is open). When open, container inlet valve 1126 permits fluid to pass from carbonator 1104 into container chamber 1122 (see FIG. 20) via carbonator inlet port 1130. Conversely, when carbonator inlet port 1130 is withdrawn from housing 1132, cap 1138 seats onto and forms a seal with seat 1133 under the bias of spring 1134, thereby closing container inlet valve 1126.

In the example embodiment shown in FIG. 23, carbonator inlet port 1130 is located in container holder 1112.

Referring to back to FIG. 21, container 1102 is shown engaged with carbonator 1104. When container holder 1112 is rotated to the open position, as shown, a user can insert container 1102 into container holder 1112 to fluidly engage container inlet valve 1126 with carbonator inlet port 1130 (as shown in FIG. 20).

FIG. 22 shows container 1102 engaged with carbonator 1104 and container holder 1112 rotated into the closed position. When container holder 1112 is rotated into the closed position while a container 1102 is engaged with carbonator 1104, a crown 1142 may manually or automatically engage container 1102. In the example shown, crown 1142 is connected to a first end 1143 of a lever 1144. As exemplified in FIG. 21, crown 1142 and lever 1144 can pivot about a second end 1145 of lever 1144 to move crown 1142 into engagement with container 1102.

Continuing to refer to FIG. 21, crown 1142 may be manually or automatically engaged with container 1102. For example, a controller 1153 may activate a solenoid 1146 to extend a shaft 1147. Solenoid 1146 may hydraulically or electromagnetically extend shaft 1147, for example. When extended, shaft 1147 may urge crown 1142 and lever 1144 to pivot about second end 1145 thereby moving crown 1142 into engagement with closure 1110 of container 1102 and facilitating the stabilization of container 1102 in carbonator 1104. In a variant embodiment, container holder 1112 may be coupled to lever 1144 (e.g. by cable(s) or a mechanical linkage, not shown) so rotating container holder 1112 into the closed position rotates lever 1144 and moves crown 1142 into engagement with closure 1110. Generally, controller 1153 may comprise any logic board suitably configured to control the operation of carbonator 1104, such as an Arduino™ controller, for example. Controller 1153 may automatically activate solenoid 1146 when container holder 1112 is rotated into the closed position, or by a user activated switch or button, for example.

Optionally, crown 1142 includes retentive elements (not shown). The retentive elements may releasably couple crown 1142 to closure 1110 when crown 1142 is engaged with closure 1110. For example, crown 1142 may include tabs (not shown) that mate with grooves (not shown) in closure 1110.

Referring again to FIG. 20, carbonator outlet port 1128 may be located in crown 1142. FIG. 20 shows crown 1142 engaged with closure 1110. As exemplified, when crown 1142 is engaged with closure 1110, carbonator outlet port 1128 engages container outlet valve 1124.

Figure 24:
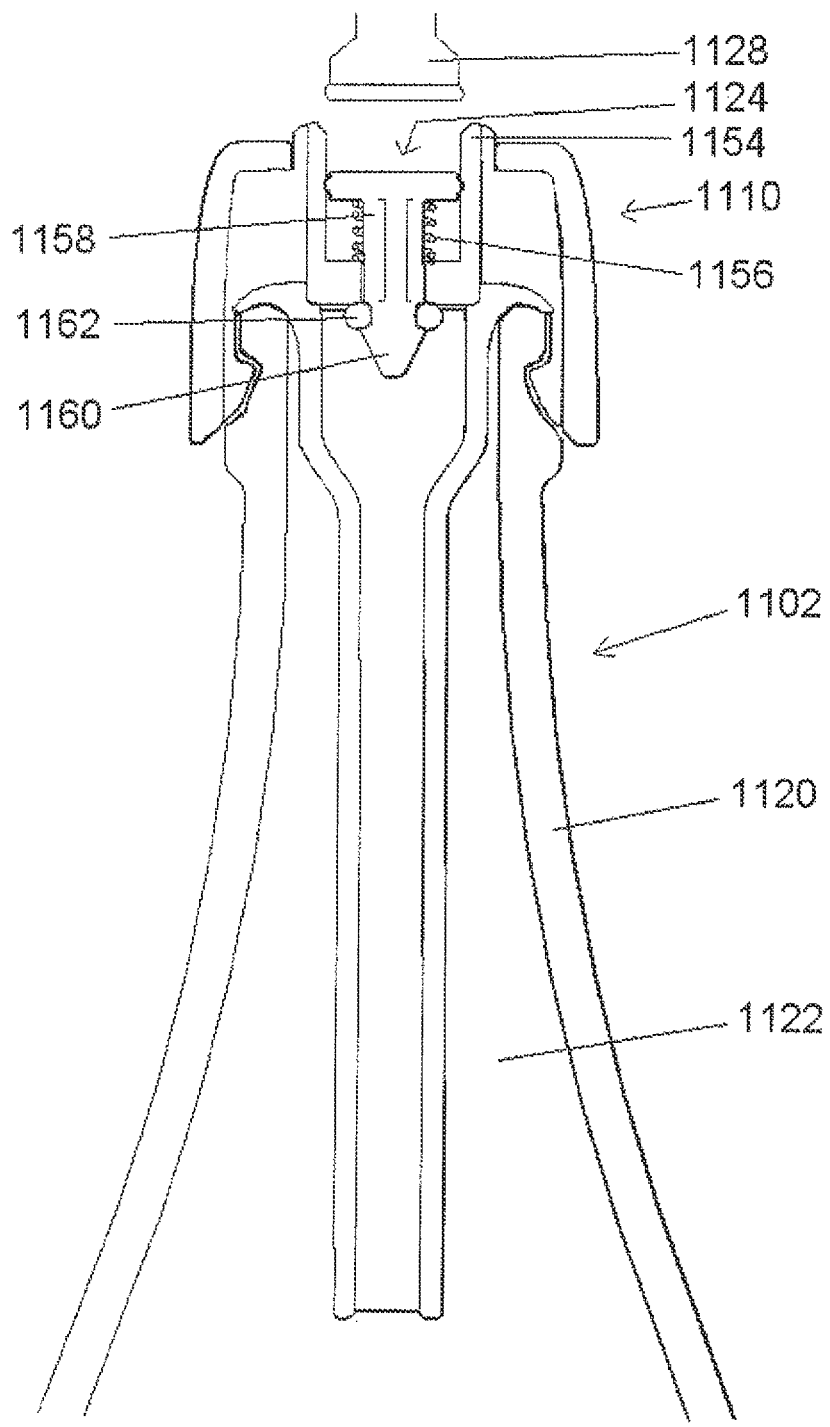
FIG. 24 is a cut-away side view of an exemplary container outlet valve and carbonator outlet port of the beverage carbonation system schematically illustrated in FIG. 20, in the closed position.

FIG. 24 shows a cross-sectional view of an exemplary closure 1110. In the example embodiment shown, a container outlet valve 1124, in the form of a mechanical spring valve, is located in closure 1110. As exemplified, container outlet valve 1124 comprises a housing 1154, a spring 1156, a shaft 1158, a cap 1160 and a seals 1162. Carbonator outlet port 1128 of carbonator 1104 may be receivable by housing 1154. Carbonator outlet port 1128 and housing 1154 may have corresponding cylindrical shapes. Seals 1162 are located between cap 1160 and housing 1154. Spring 1156 is coupled to housing 1154 and shaft 1158 to bias cap 1160 toward a closed position against housing 1154.

FIG. 24 shows container outlet valve 1124 in a closed position, with carbonator outlet port 1128 disengaged from container outlet valve 1124. In the illustrated position, cap 1160 is biased upwardly by spring 1156 thereby wedging seals 1162 between cap 1160 and housing 1154. This creates a fluid tight seal preventing fluid (gas or liquid) from exiting container chamber 1122 to the environment through container outlet valve 1124.

Continuing to refer to FIG. 24, carbonator outlet port 1128 may be received by housing 1154 when crown 1142 is engaged with closure 1110 (see crown 1142 in FIG. 22). When carbonator outlet port 1128 is received by housing 1154, it displaces shaft 1158 such that seals 1162 separate from housing 1154 breaking the aforementioned seal. In this condition, fluid can exit the container chamber 1122 through container outlet port 1128 to the carbonator 1104 (see carbonator 1104 in FIG. 20). For the example embodiment shown in FIG. 24, when carbonator outlet port 1128 is withdrawn from housing 1154, shaft 1158 returns under the bias of spring 1156 wedging seals 1162 between cap 1160 and the bottom of housing 1154, thereby closing container outlet valve 1124.

Referring again to FIG. 22, carbonator 1104 may optionally have a start actuator 1151, which is optionally in the form of a depressible button or switch connected to the controller 1153. Start actuator 1151 may be mounted to an external surface of carbonator 1104. Activation of start actuator 1151 may send a signal to controller 1153 to activate the operation cycle.

Start actuator 1151 may be activated after the container 1102 and carbonator 1104 are engaged. In the example embodiment shown in FIG. 22, start actuator 1151 may be activated after container 1102 is received in container holder 1112 and container holder 1112 is rotated into the closed position. In some embodiments, activation of start actuator 1151 opens one or both of container outlet valve 1124 and container inlet valve 1126 (see FIG. 20 for the container valves). In some embodiments, activation of start actuator 1151 temporarily locks container 1102 and carbonator 1104 into engagement with one another. For example, activation of start actuator 1151 may engage crown 1142 with closure 1110. In some embodiments, activation of start actuator 1151 simultaneously opens one or both of container valves 1124, 1126 (see FIG. 20 for the container valves) and temporarily locks container 1102 to carbonator 1104.

Activation of start actuator 1151 may send a corresponding signal to controller 1153 to activate at least pump 1150.

Referring again to the example embodiment shown in FIG. 20, carbonator 1104 has a carbonation chamber 1164. Carbonation chamber 1164 may be integrally formed in carbonator 1104. As exemplified in FIG. 20, carbonation chamber 1164 contains a carbon dioxide source 1166. Optionally, carbonation chamber 1164 has an access hatch 1168 that opens to introduce carbon dioxide source 1166 into carbonation chamber 1164.

Continuing to refer to FIG. 20, carbon dioxide source 1166 is reactive with liquid 1106 to produce carbon dioxide gas when liquid 1106 contacts carbon dioxide source 1166. Optionally, carbon dioxide source 1166 is a solid material that is chemically reactive with liquid 1106 to emit carbon dioxide gas when the liquid contacts the solid material. Examples of liquid 1106 include, but are not limited to, water, juice, tea and alcohol. Carbon dioxide source 1166 may be, for example, an acid mixed with a carbonate, in wet or dry form, combined or separate until required. In some cases, a solid material carbon dioxide source 1166 is a mixture of sodium bicarbonate and citric acid, and liquid 1106 is water. More specifically, the solid material may be a dry solid material, such as a powder. Sodium bicarbonate and citric acid can be advantageous for use with water because when they react with water they do not create heat during the reaction. This is desirable when producing a cooled carbonated beverage. In some cases, dry citric acid and sodium bicarbonate have some benefits, including for example, being relatively inexpensive, non-toxic, relatively easy to handle and/or capable of pre-mixing.

Continuing to refer to the example embodiment shown in FIG. 20, carbonator 1104 optionally includes a flavor chamber 1170. It will be appreciated that example embodiment shown in FIG. 20 may not have a flavor chamber 1170, in which case liquid 1106 would carbonator 1104 would carbonate the liquid, but not flavor the liquid. Flavor chamber 1170 may be integrally formed in carbonator 1104. If flavor chamber 1170 is present, it can contain a flavor source 1172. Optionally, flavor chamber 1170 has an access hatch 1174 that opens to introduce flavor source 1172 into flavor chamber 1170.

Flavor source 1172 may be, for example, flavor crystals, coffee grinds, instant coffee, syrup, minerals, concentrated juice, honey or any other beverage additive. Optionally, flavor source 1172 alters the taste of liquid 1106.

As exemplified in FIG. 20, carbonator outlet port 1128 is fluidly connected to carbonation chamber 1164 containing carbon dioxide source 1166 that produces carbon dioxide gas. When container outlet valve 1124 is open and fluidly engages container outlet port 1128, liquid 1106 can flow from container chamber 1122 into carbonation chamber 1164 to form carbon dioxide gas in carbonation chamber 1164.

In the example embodiment shown in FIG. 20, carbonator outlet port 1128 is fluidly connected to carbonation chamber 1164 through a line 1180. Line 1180 is shown including a carbonation inlet 1182 to carbonation chamber 1164.

In the example shown in FIG. 20, carbonation chamber 1164 and flavor chamber 1170 are both present, and are divided by a chamber wall 1175. As shown, a chamber aperture 1176 in chamber wall 1175 fluidly connects carbonation chamber 1164 and flavor chamber 1170.

Referring to the example embodiment shown in FIG. 20, when container inlet valve 1126 is open and engages with carbonator inlet port 1130, carbon dioxide gas produced in carbonation chamber 1164 can flow from carbonation chamber 1164, through chamber aperture 1176 to container chamber 1122 to mix with liquid 1106 in container chamber 1122 to form a carbonated liquid in container chamber 1122. As exemplified, the carbon dioxide gas flows through flavor chamber 1170 as it travels to container chamber 1122 and acts upon (optionally pushing) flavor source 1172 to force flavor source 1172 into container chamber 1122 to mix with liquid 1106 inside container chamber 1122 and produce a flavored and carbonated liquid.

In the example shown in FIG. 20, carbonator 1104 has at least one pump 1150. As previously discussed, a pump (exemplified as pump 1150 in FIG. 20) is any mechanism capable of facilitating fluid flow through the system. Pump 1150 may be, but is not necessarily limited to, an electrical pump. The pump may include, as non-limiting examples, a mechanism that facilitates fluid flow using differential pressure, negative pressure, gravity, or a combination thereof. Pump 1150 may pump liquid 1106 from carbonator outlet port 1128 to pump 1150 via line 1178, then from pump 1150 to carbonation chamber 1164 via lines 1264 and 1180. In the example shown, carbonation chamber 1164 has a carbonation inlet 1182 that feeds fluid into carbonation chamber 1164.

In the example embodiment shown in FIG. 20, flavor chamber 1170 does not have a flavoring inlet, and all fluid exiting line 1180 is directed to carbonation chamber 1164 via carbonation inlet 1182.

In an alternative embodiment, when a flavor chamber (such as flavor chamber 1170 shown in FIG. 20 is present), flavor chamber 1170 may include a flavoring inlet (not shown) from line 1180 to flavor chamber 1170. In this alternative embodiment, when container outlet valve 1124 is open and fluidly engages container outlet port 1128, liquid 1106 can flow from container chamber 1122 into both flavor chamber 1170 and carbonation chamber 1164. In at least one embodiment, mixing liquid 1106 with flavor source 1172 inside flavor chamber 1170 reduces the viscosity of flavor source 1172. A low-viscosity mixture may flow more easily through the conduits of carbonator 1104 into container chamber 1122 than an undiluted flavor source. The cross-sectional areas (ex. diameters) of carbonation inlet 1182 and the flavoring inlet (not shown) may be sized to control what fraction of liquid 1106 exiting line 1180 is directed to each of carbonation chamber 1164 and flavor chamber 1170. In some cases, more liquid 1106 from line 1180 is distributed into carbonation chamber 1164 than flavor chamber 1170. Optionally, approximately ⅔ of liquid 1106 exiting line 1180 is directed into carbonation chamber 1164 via carbonation inlet 1182, while approximately ⅓ of liquid 1106 exits line 1180 into flavor chamber 1170 via a flavoring inlet (not shown). This may be achieved by the cross-sectional area of carbonation inlet 1182 being larger than the cross-sectional area of the flavoring inlet (not shown). In some cases, the cross-sectional area of carbonation inlet 1182 may be substantially larger than the cross-section area of the flavoring inlet (not shown), such that substantially all of liquid 1106 exits line 1180 into carbonation chamber 1164 via carbonation inlet 1182.

In some cases, all of liquid 1106 exits line 1180 into flavor chamber 1170. In these cases, the liquid may first enter flavor chamber 1170, then travel into carbonation chamber 1164 via chamber aperture 1176 in chamber wall 1175. This may occur when the carbonation inlet 1182 shown (as shown in FIG. 20) is not present, or when carbonation inlet 1182 has a cross-sectional area that is significantly smaller than the cross-sectional area of the flavoring inlet (not shown).

Between approximately 1/10 and 9/10 of liquid 1106 exiting line 1180 may be directed to carbonation chamber 1164.

It will be appreciated that, for some embodiments, flavor chamber 1170 is removed from the example embodiment shown in FIG. 20 and liquid 1106 flows into carbonation chamber 1164 via carbonation inlet 1182, then though line 1266 and into container 1102 via carbonator inlet port 1130, without passing through a flavor chamber, to provide a carbonated but not flavored beverage in container chamber 1122.

Continuing to refer to FIG. 20, beverage carbonation system 1100 may have carbonation tube 1186. Carbonation tube 1186 is fluidly connected to container outlet valve 1124 and extends inwardly into container chamber 1122. Optionally, carbonation tube 1186 is in the shape of a straw, and extends vertically downwardly into container chamber 1122 from closure 1110. To carbonate liquid 1106, a portion of liquid 1106 enters a first end 1188 of carbonation tube 1186. Optionally, first end 1188 is the bottom end of carbonation tube 1186. Optionally, second end 1190 of carbonation tube 1186 is connected to container outlet valve 1124.

In some cases, it may be desirable to limit the quantity of liquid that is drawn into carbonation chamber 1164. For the example embodiment shown in FIG. 20, when pump 1150 is activated, a portion of liquid 1106 is drawn through first end 1188 of carbonation tube 1186 and drawn to carbonation chamber 1164 and optionally flavor chamber 1170. As this process continues, the level of liquid 1106 inside the container chamber 1122 falls. At a certain point, the liquid becomes level with first end 1188 of carbonation tube 1186. When the level of liquid 1106 is at or below first end 1188 of carbonation tube 1186, no more liquid is drawn through carbonation tube 1186. Accordingly, the height of carbonation tube 1186 limits the amount of liquid 1106 that may be drawn into the carbonation chamber 1164 of carbonator 1104. More specifically, the maximum volume of liquid 1106 that may be drawn into the carbonation chamber 1164 may be equal to the volume of container chamber 1122 situated at an elevation above first end 1188 of carbonation tube 1186. In some cases, it takes approximately 10 seconds to lower the level of liquid 1106 to first end 1188 of carbonation tube 1186. In some embodiments, as the level of liquid 1106 is lowered, liquid 1106 is pumped into carbonation chamber 1164 for approximately 5 to 15 seconds.

In some embodiments, shell 1120 of container 1102 may have a fill line 1192. Fill line 1192 may correspond to an ideal level of liquid 1106. When the liquid is filled to fill line 1192, there may be an ideal volume of liquid 1106 located at an elevation above first end 1188 of carbonation tube 1186. The ideal volume of liquid 1106 may correspond with the specific quantity of liquid required to mix with carbon dioxide source 1166 to produce carbon dioxide gas at a rate sufficient to carbonate the liquid 1106 inside container chamber 1122. Optionally, fill line 1192 corresponds to a volume of between 5% and 20%, of the total volume of liquid 1106 prior to commencement of the carbonation process. As one example, prior to commencement of the carbonation process, the total volume of liquid 1106 in container chamber 1122 may be 1000 mL and the volume of liquid 1106 between fill line 1192 and first end 1188 may be approximately 50 mL to 200 mL. More specifically, the volume of liquid between fill line 1192 and first end 1188 may be approximately 50 mL to 120 mL.

In the example embodiment shown in FIG. 20, carbonation tube 1186 is configured to receive air and carbon dioxide gas from container chamber 1122 for recirculation between container outlet valve 1124 and container inlet valve 1126. Once the level of liquid falls at or below first end 1188 of carbonation tube 1186, no more liquid enters the carbonation tube. However, as the process continues, air and some carbon dioxide gas that was injected into container chamber 1122 from carbonation chamber 1164 passes through the liquid in container chamber 1122 and into headspace 1194. Recirculating gas from headspace 1194 permits carbon dioxide gas that passed through liquid 1106, but did not diffuse into the liquid, to diffuse back into liquid 1106. This can reduce the time required to reach a desirable level of beverage carbonation because the recycled carbon dioxide gas is forced through the liquid at a faster rate than if it were to passively dissolve from headspace 1194 into liquid 1106.

When flavor chamber 1170 is present (as exemplified in FIG. 20), the air and carbon dioxide gas mixture may flow through flavor chamber 1170 as it is recirculated from headspace 1194 through container inlet valve 1126 into container chamber 1122. When the gas mixture flows through flavor chamber 1170 it can act upon flavor source 1172 that remains in flavor chamber 1170 to force that flavor source 1172 into container chamber 1122 to mix with liquid 1106 inside container chamber 1122. The gas mixture can also combine with additional carbon dioxide gas from carbonation chamber 1164 that enters flavor chamber 1170, to increase the proportion of carbon dioxide gas in the gas mixture that travels through the flavor chamber.

Optionally, pump 1150 is a liquid-gas pump that can pump liquid 1106 from container chamber 1122, into carbonation chamber 1164, as well as pump carbon dioxide gas along a similar flow path. Alternatively, one gas pump and one liquid pump may be used to pump carbon dioxide gas and liquid 1106, respectively.

In some embodiments, a diffuser (not shown) may be fluidly connected to container inlet valve 1126 (see FIG. 20). The diffuser can include a nozzle that can accelerate fluid passing through it to produce a jet. This can facilitate the diffusion of carbon dioxide gas and flavor source 1172 into liquid 1106 to carbonate and flavor liquid 1106 at a faster rate. The diffuser can also help to send carbonated liquid away from container inlet valve 1126 at such a rate that liquid 1106 is agitated and increases the surface area of the liquid that is in contact with the carbon dioxide. In this manner, the diffuser may be used to increase the rate at which sufficient carbonation of liquid 1106 is achieved.

Continuing to refer to FIG. 20, once the beverage has been carbonated to the desired extent, the user may activate a stop actuator (not shown) to shutdown pump 1150. Activation of a stop actuator can send a corresponding signal to controller 1153 to perform the desired operation. Shutting down pump 1150 may stop the carbonation process described above.

In at least one embodiment, pump 1150 may automatically shut down when a sensor (not shown) indicates to the controller 1153 that a sufficient level of pressure has been achieved in container chamber 1122 to indicate a satisfactory level of beverage carbonation. The sensor can be mounted to carbonator inlet port 1130.

In some embodiments, pump 1150 shuts down after the pressure within the system (equalized across carbonator 1104 and container 1102) reaches a predetermined threshold. For example, pump 1150 may automatically shut down when the pressure within the system reaches a threshold of between approximately 50 to 80 psi.

In some embodiments, pump 1150 may be shut down after a pre-programmed time period. In some more specific embodiments, liquid 1106 may be delivered to carbonation chamber 1164 for approximately 5 to 15 seconds, and carbon dioxide gas in headspace 1194 may be recirculated out of and back into container 1102 for approximately 30 to 120 seconds (which may overlaps with the delivery of liquid 1106 to carbonation chamber 1164). In these cases, pump 1150 may be shut down after a predetermined time corresponding to the completion of the delivery of liquid 1106 to carbonation chamber 1164 and after the recirculation of carbon dioxide gas from headspace 1194. However, the appropriate time duration varies with the volume and type of liquid 1106 to be carbonated.

If pump 1150 is shut down by controller 1153 (e.g. by activation of a stop actuator or automatically according to a sensor or time expiry), container outlet valve 1124 and container inlet valve 1126 may be closed prior to container 1102 being disengaged from carbonator 1104. For example, controller 1153 may disengage crown 1142 from closure 1110 (e.g. by operating solenoid 1146 to retract shaft 1147—see FIG. 21). In this manner, carbonator outlet port 1128 may be disengaged from container outlet valve 1124 and to close container outlet valve 1124 (see FIG. 24).

When pump 1150 is shut down by controller 1153, controller 1153 may also unlock container 1102 from carbonator 1104. For example, controller 1153 may disengage crown 1142 from closure 1110.

When controller 1153 performs certain operations automatically (e.g. shut down pump 1150 or unlock container 1102 from carbonator 1104) an indicator (such as a light or sound, for example) may activate (e.g. to let the user know that carbonation has completed and that the container 1102 may be disengaged from carbonator 1104). In some cases, a user can manually unlock container 1102 from carbonator 1104 using a manual latch (not shown) after a timed cycle is complete.

Continuing to refer to FIG. 20, in some cases, during the carbonation process, carbon dioxide gas can be continually generated by carbon dioxide source 1166 and pumped into container chamber 1122 for mixing with liquid 1106 and carbonated liquid inside of container chamber 1122. As carbon dioxide gas is generated, the equalized system pressure of container 1102 and carbonator 1104 rises. Furthermore, as carbon dioxide gas is circulated and recirculated through the liquid inside container chamber 1122, the liquid becomes even more carbonated.

As discussed above, when container 1102 is disengaged from carbonator 1104, container outlet valve 1124 and container inlet valve 1126 close to seal container chamber 1122. In this manner, during disengagement of container 1102 and carbonator 1104, the elevated pressure is substantially maintained in the container chamber. In some cases, a pressure of approximately 50 to 80 psi is maintained in container chamber 1122 following the disengagement of container 1102 and carbonator 1104. This is advantageous because the user can store the container (in a refrigerator or on a counter, for example) for later consumption. The closed container valves allow the container to remain sealed, to minimize carbonation losses to the external atmosphere. This can help to prevent the carbonated beverage from going "flat" during storage, and to preserve the carbonated taste for later consumption.

As discussed above, liquid 1106 is carbonated by the carbon dioxide gas emitted from the carbon dioxide source 1166 present in the carbonation chamber 1164 (see FIG. 20). Exemplary structures and processes related to providing the carbon dioxide source to carbonation chamber 1164 will now be discussed in detail.

Figure 25:
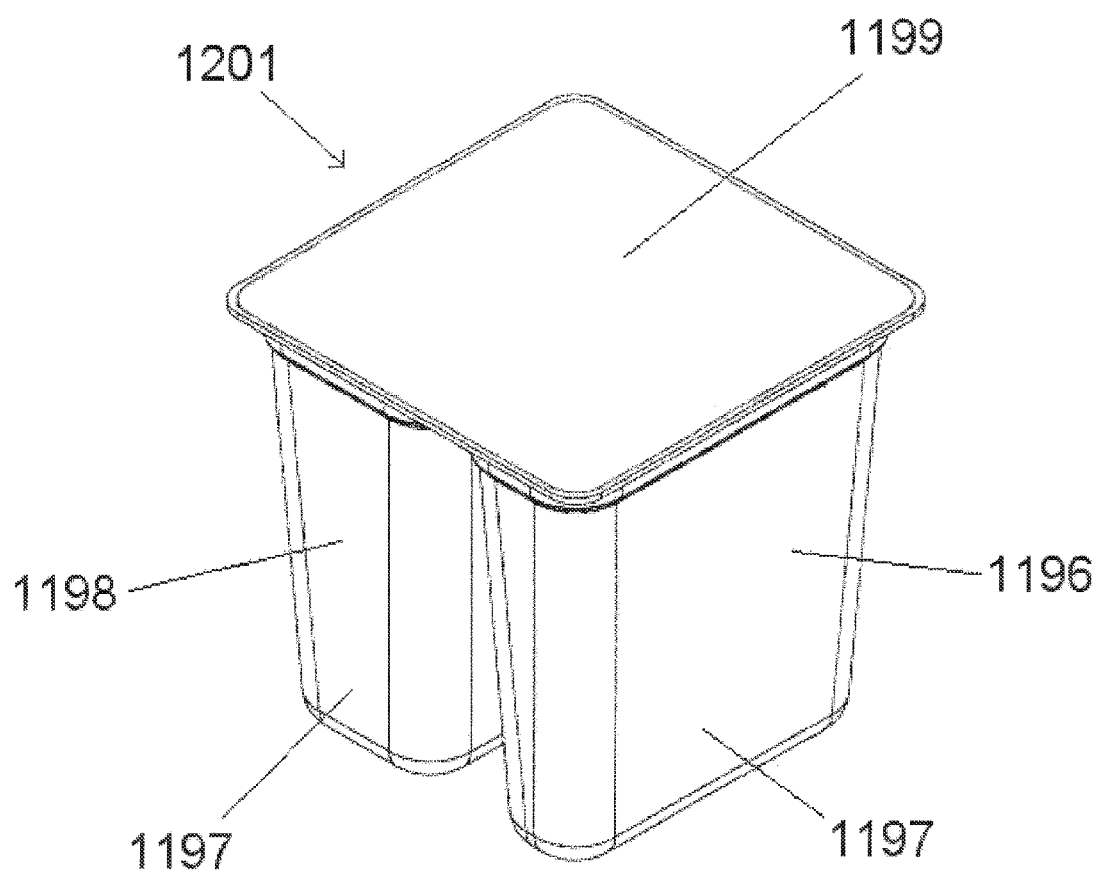
FIG. 25 is a perspective view of an exemplary combination cartridge.
Figure 26:
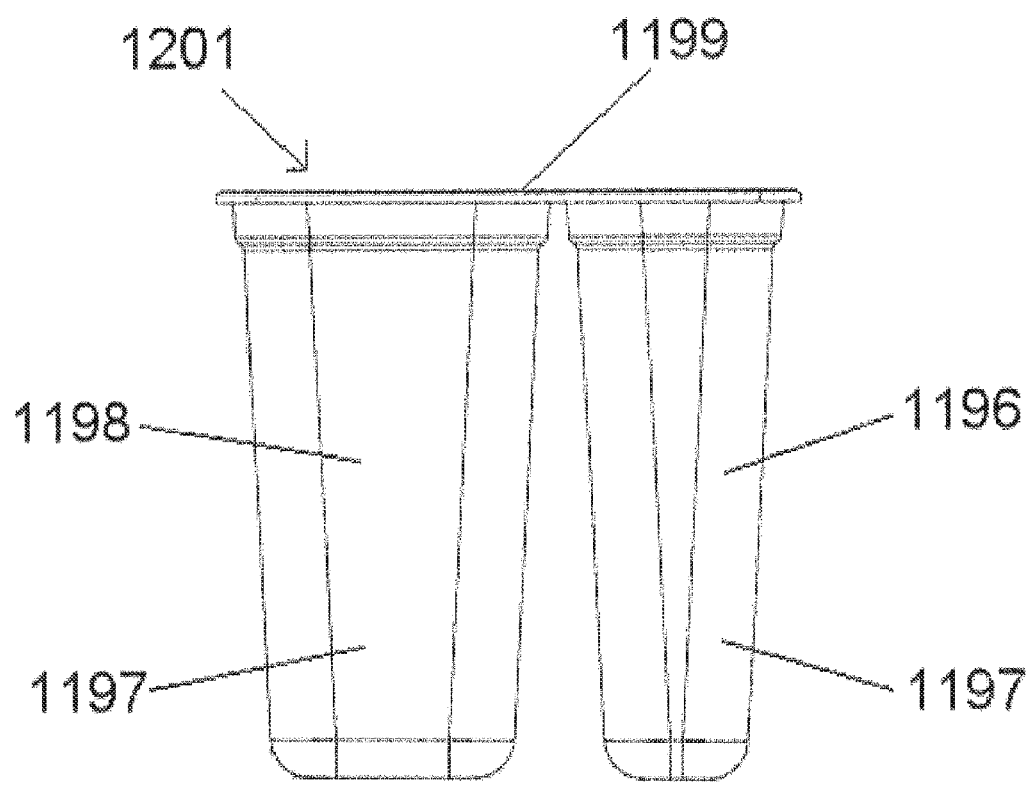
FIG. 26 is a front view of the combination cartridge of FIG. 25.

As shown in FIGS. 20, 25 and 26, beverage carbonation system 1100 may comprise a carbon dioxide cartridge 1196 for containing carbon dioxide source 1166. Optionally, as exemplified, the beverage carbonation system also includes a flavor cartridge 1198 for containing flavor source 1172. The cartridges 1196, 1198 may be separate cartridges, or they may be connected as a combined cartridge having separated compartments, as shown.

FIGS. 20, 25 and 26 show an example embodiment for combination cartridge 1201. FIG. 25 provides a perspective view of combination cartridge 1201, while FIG. 26 provides a front view of exemplary combination cartridge 1201.

Optionally, cartridges 1196 and 1198 include a hollow housing 1197 and a pierceable cover 1199. Pierceable cover 1199 may run along a top surface of hollow housing 1197. Optionally, pierceable cover 1199 is made of aluminum foil or plastic wrap, while the remainder of hollow housing 1197 is made of molded plastic. Alternatively, combination cartridge 1201 may have two pierceable covers, to separately cover cartridges 1196 and 1198, respectively.

Figure 27:
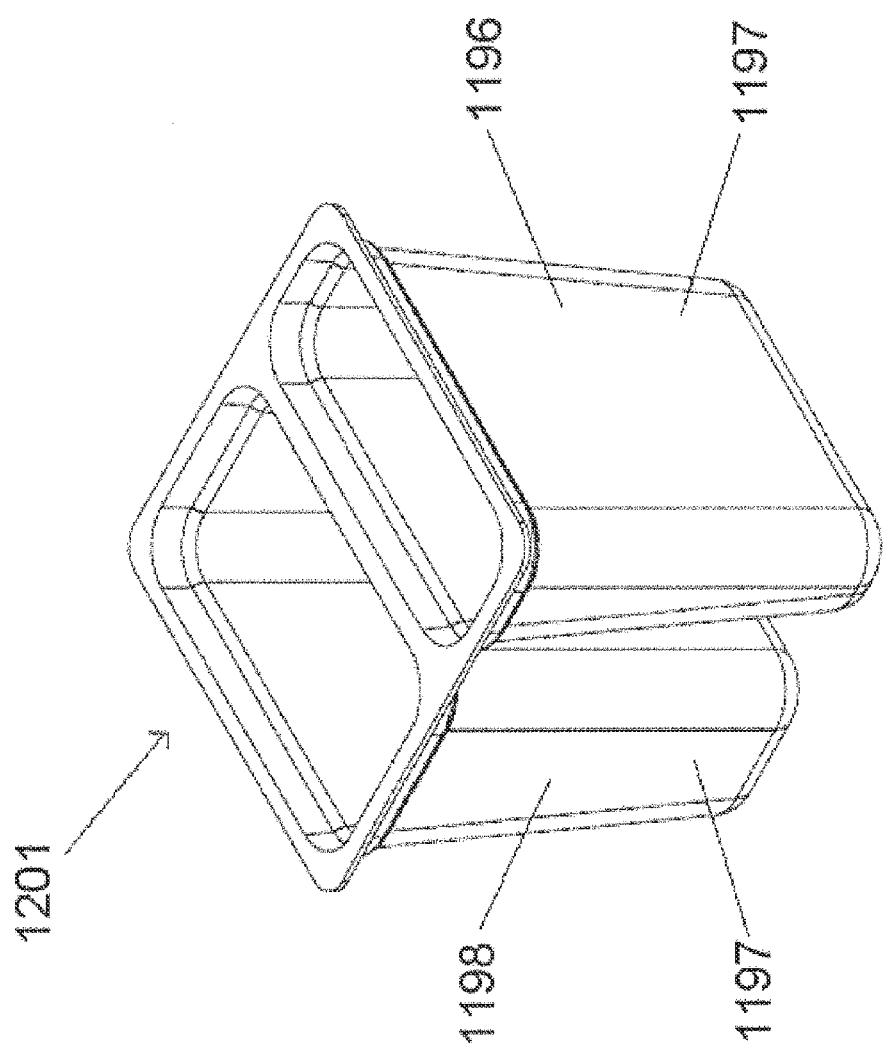
FIG. 27 is a perspective view of the combination cartridge of FIGS. 25 and 26 with the pierceable cover removed.
Figure 28:
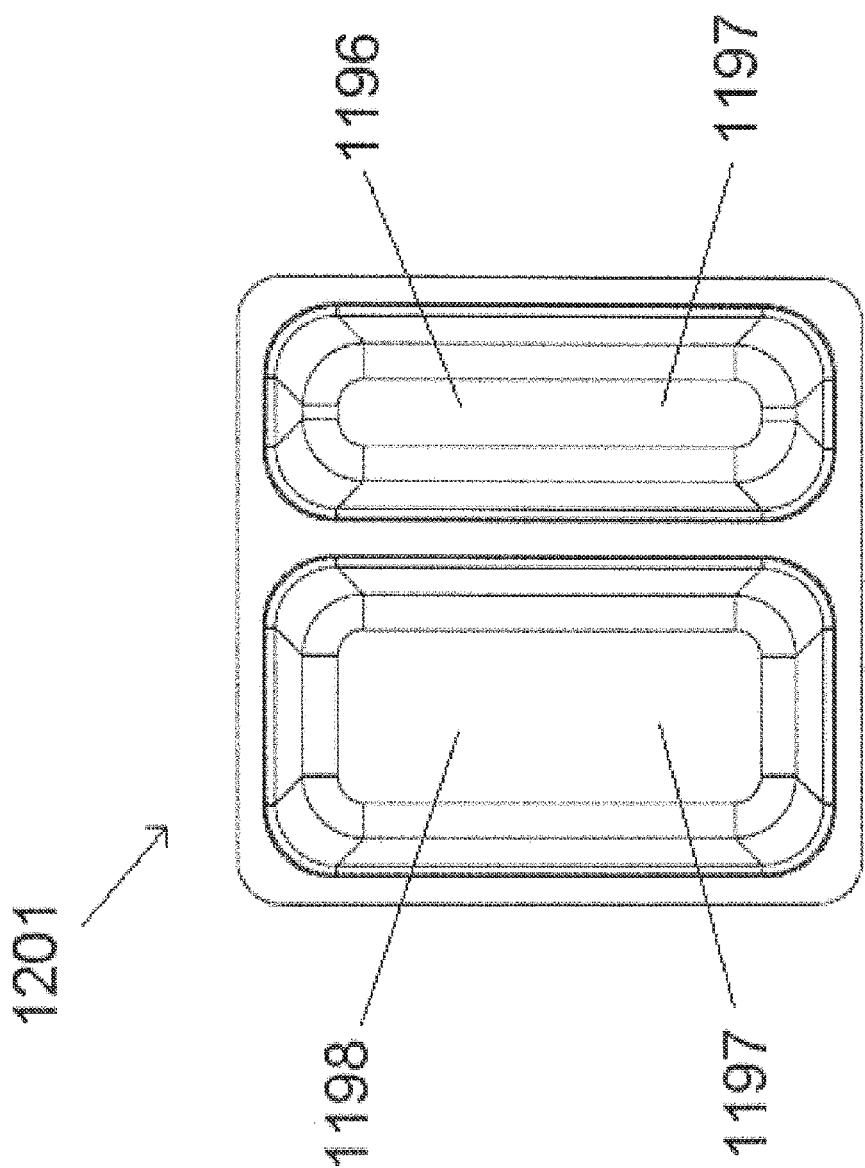
FIG. 28 is a top view of the combination cartridge of FIG. 27.

FIGS. 27 and 28 provide a perspective view and top view, respectively, of the combination cartridge 1201 of FIGS. 20, 25 and 26 with pierceable cover 1199 removed to show the interior of combination cartridge 1201.

Carbonator 1104 is exemplified in FIG. 20 as having a transfer mechanism 1200. Generally, transfer mechanism 1200 receives carbon dioxide cartridge 1196 and deposits the carbon dioxide source 1166 therein into carbonation chamber 1164. When a flavor cartridge 1198 and flavor chamber 1170 are optionally present, transfer mechanism 1200 receives flavor cartridge 1198 and deposits flavor source 1172 therein into flavor chamber 1170.

Figure 29:
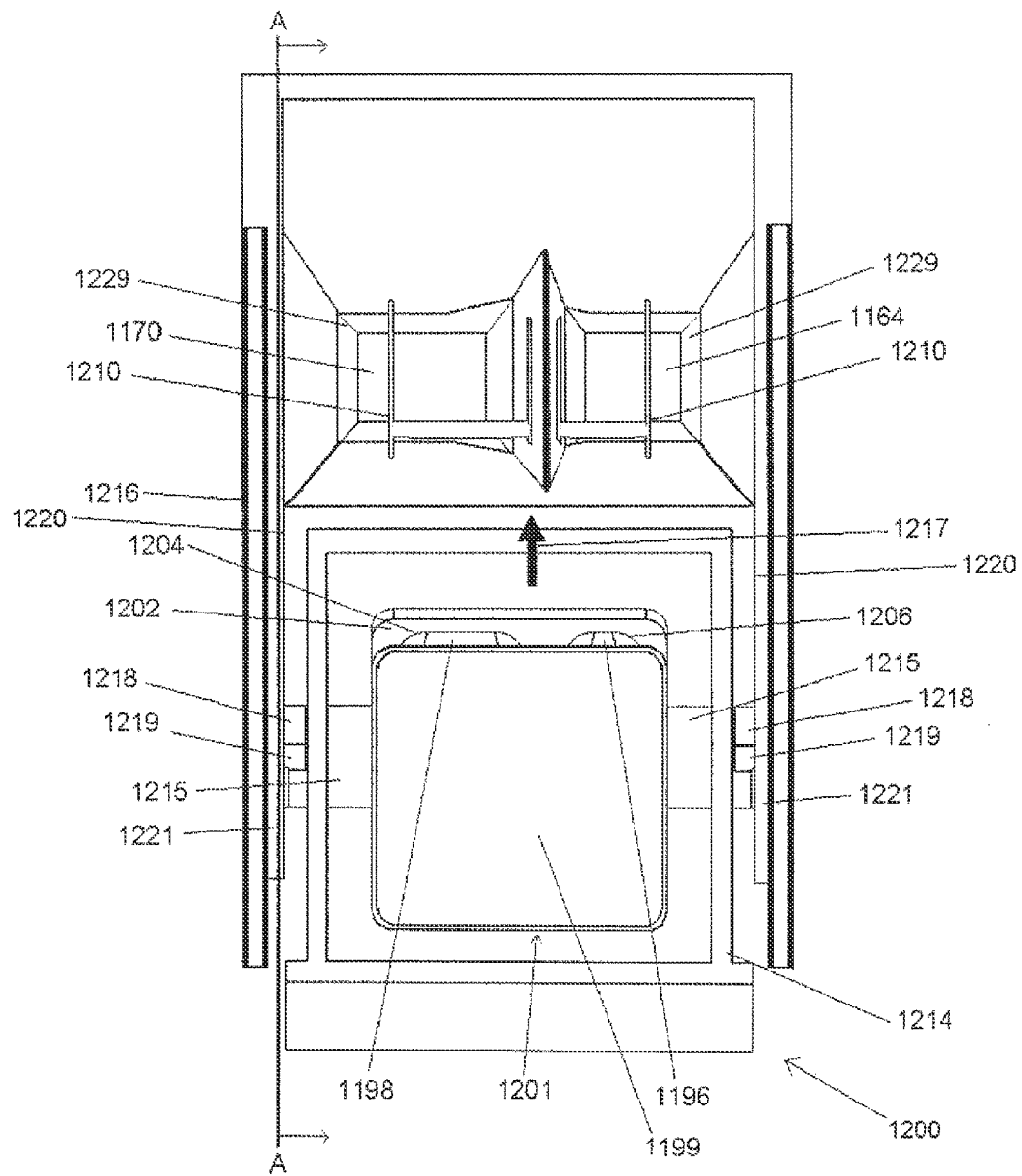
FIG. 29 is a top view of an exemplary transfer mechanism of the beverage carbonation system schematically illustrated in FIG. 20.
Figure 30:
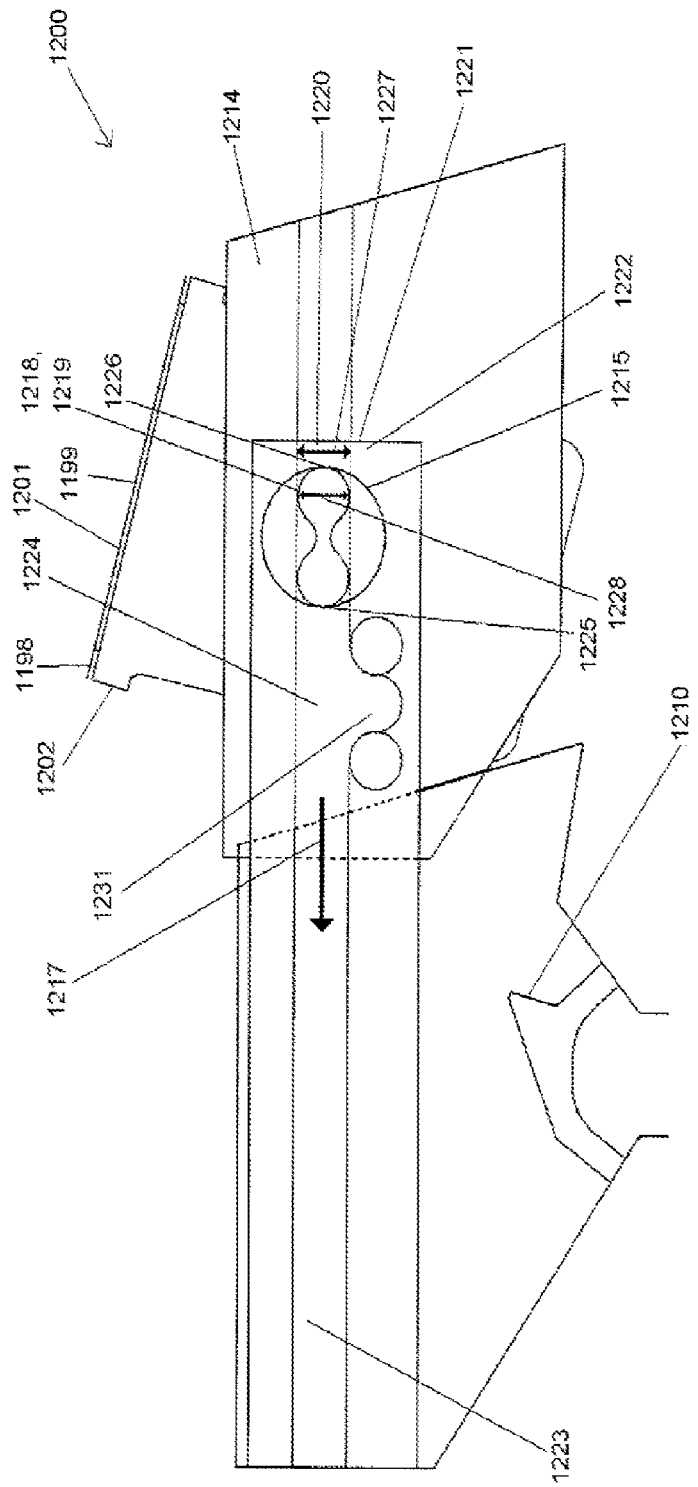
FIG. 30 is a cut-away side view of the transfer mechanism of FIG. 29, taken along line A-A in FIG. 29.

An exemplary transfer mechanism 1200 is shown in FIG. 21. FIGS. 29 and 30 show a top view and a side view, respectively, of the transfer mechanism exemplified in FIG. 21.

In the example embodiment shown in FIG. 20, transfer mechanism 1200 includes a cartridge holder 1202 having a cavity 1204 sized to receive a flavor cartridge 1198, and a cavity 1206 sized to receive a carbon dioxide cartridge 1196. FIG. 20 shows an exemplary combination cartridge 1021 moved to a first, second and third position, represented by 1201', 1201'' and 1201''', respectively. As exemplified, at the first position 1201', the combination cartridge 1201 contains carbon dioxide source 1166 and flavor source 1172. In the second position, arrows 1208 schematically illustrate that cartridges 1196 and 1198 can be inserted into cartridge holder 1202 (as shown at second position 1201''). Optionally, as shown in FIG. 20, cartridges 1196 and 1198 may be inserted into cartridge holder 1202, hollow housing 1197 first. This leaves the pierceable cover 1199 of cartridges 1196, 1198 facing outward and upward from cavities 1204 and 1206. Cartridges 1196 and 1198 are preferably inserted into cartridge holder 1202 at second position 1201'' with pierceable covers 1199 intact and affixed to housing 1197 (as shown in FIGS. 25 and 26).

In the example embodiment shown in FIG. 20, transfer mechanism 1200 includes at least one cutter 1210. Optionally, and as shown, transfer mechanism 1200 includes two cutters 1210, one for each cartridge 1196, 1198. As exemplified, cutters 1210 are configured to cut away at least a portion of a respective cartridge 1196, 1198 to release the carbon dioxide source 1166 and flavor source 1172 contained therein into carbonation chamber 1164 and flavor chamber 1170, respectively.

Optionally, cartridges 1196 and 1198 include pierceable cover 1199 which faces outward and upward from cavities 1204 and 1206 when cartridges 1196 and 1198 are received in cartridge holder 1202. In the example embodiment shown in FIG. 20, transfer mechanism 1200 is configured to rotate (optionally, invert) cartridge holder 1202 to align the outward facing pierceable cover 1199 with a respective cutter 1210, as shown at third cartridge position 1201''' in FIG. 20. The movement from the second cartridge position 1201'' to the third cartridge position 1201''' is schematically illustrated by arrows 1212 and 1217 in FIG. 20.

Transfer mechanism 1200 can move a cartridge, such as combination cartridge 1201 from second position 1201'' to third position 1201''' (see FIG. 20). An exemplary structure and operation of transfer mechanism 1200 will now be discussed in detail with respect to FIGS. 29 and 30.

In the example embodiment shown in FIGS. 29 and 30, cartridge holder 1202 is rotatably coupled to a carrier 1214. Cartridge holder 1202 may be suspended inside of carrier 1214 by support members 1215. As exemplified, support members 1215 may be cylindrical. Cartridge holder 1202 may be fixedly coupled to support members 1215, to rotate along with support members 1215. Support members 1215 may extend from cartridge holder 1202 through openings (not shown) in carrier 1214. In at least one embodiment, support members 1215 and the openings in carrier 1214 are sized and shaped to permit support members 1215 to rotate inside the openings, to permit cartridge holder 1202 to rotate with respect to carrier 1214.

In the embodiment shown in FIG. 29, carrier 1214 is slideably coupled to rails 1216 by at least one sliding connection member (not shown). In the example embodiment shown in FIG. 29, carrier 1214 is suspended on rails 1216 and can translate in the direction of arrow 1217 along a linear path between rails 1216 to align cartridges 1196 and 1198 above carbonation chamber 1164 and flavor chamber 1170, respectively.

As exemplified in FIGS. 29 and 30, a distal end 1218 of each support member 1215 includes an end projection 1219. In the embodiment shown in FIGS. 29 and 30, each end projection 1219 extends through a passage 1220 of a frame 1221. As exemplified in FIG. 30, passage 1220 is an opening in frame 1221 sized to receive end projection 1219. In some embodiments, passage 1220 may be formed in an interior surface of carbonator 1104. End projection 1219 can move along passage 1220 (see FIG. 30), as carrier 1214 slides in the direction of arrow 1217 along rails 1216 (see FIG. 29).

As exemplified in FIG. 30, passage 1220 includes a first portion 1222, a second portion 1223 and a rotary portion 1224 intermediate the first and second portions 1222 and 1223. Also, end projection 1219 is shown in FIG. 30 having a dumbbell or peanut-like shape including a first end 1225 and a second end 1226. As exemplified in FIG. 30, a width 1227 of passage 1120 generally corresponds to a width 1228 of end projection 1219. For example, width 1227 may be equal to or slightly larger than width 1228. This may constrain the rotation of end projection 1219 (and therefore cartridge holder 1202) when end projection 1219 is located in the first portion 1222 or second portion 1223 of passage 1220. In the example embodiment shown in FIG. 30, when end projection 1219 is in the first portion 1222, the first and second ends 1225 and 1226 of end projection 1219 align with an axis of passage 1220 and the orientation of cartridge holder 1202 positions covers 1199 of cartridges 1196 and 1198 generally upwardly (cartridges 1196 and 1198 are shown in FIG. 29).

In the example embodiment shown in FIG. 30, end projection 1219 can slide along passage 1220 from the first portion 1222, through the rotary portion 1224, to the second portion 1223 as carrier 1214 (and cartridge holder 1202) slides in the direction of arrow 1217 along rails 1216 (rails 1216 are shown in FIG. 29). In at least one embodiment, end projection 1219 (and cartridge holder 1202) inverts (e.g. rotates approximately 180 degrees) when it travels through rotary portion 1224. For example, when end projection 1219 enters rotary portion 1224 from first portion 1222, first end 1225 of end projection 1219 may enter pocket 1231. In this example, as carrier 1214 moves into second portion 1223, end projection 1219 pivots about first end 1225 in pocket 1231, rotating second end 1226 forward. In this example embodiment shown in FIG. 30, as end projection 1219 moves from the first portion 1222 to the second portion 1223, end projection 1219 and cartridge holder 1202 rotate approximately 180 degrees (counterclockwise from the perspective of FIG. 30) such that pierceable cover 1199 of cartridges 1196 and 1198 faces generally downwardly (not shown).

Continuing to refer to the example embodiment shown in FIG. 30, when end projection 1219 enters the second portion 1221, the rotation of cartridge holder 1202 faces pierceable cover 1199 downwardly (not shown). When pierceable cover 1199 faces downwardly, moving carrier 1214 further in the direction of arrow 1217 causes blades 1210 makes contact with and pierce cover 1199. Optionally, blades 1210 scrape a substantial portion of pierceable cover 1199 off of cartridges 1196 and 1198 (cartridges 1196 and 1198 are shown in FIG. 29). When pierceable cover 1199 is pierced, carbon dioxide source 1166 and flavor source 1172 may flow out of cartridges 1196 and 1198, respectively, and into funnels 1229 (see FIG. 29). In this example, funnels 1229 direct flavor source 1172 into flavor chamber 1170, and direct carbon dioxide source 1166 into carbonation chamber 1164 (as shown by the third cartridge position 1201''' in FIG. 20)

As exemplified in FIG. 21, in use, a user may pull on handle 1288 to rotate container holder 1112 to the open position. Pulling on handle 1288 (see FIG. 21) may provide access to manually pull carrier 1214 and thereby move end projection 1219 from the second portion 1222 to the first portion 1223 and thereby rotating cartridge holder 1202 to receive cartridges 1196 and 1198 from above (see FIGS. 29 and 30). Referring to FIGS. 29 and 30, after cartridges 1196 and 1198 have been inserted into cartridge holder 1202, a user may manually push on carrier 1214 moving end projection 1219 from the first portion 1223 to the second portion 1222, and thereby inverting cartridge holder 1202. The user may continue to push carrier 1214 further along the second portion 1222 and thereby pierce cover 1199 of cartridges 1196 and 1198 on blades 1210, and deposit carbon dioxide source 1166 and flavor source 1172 from cartridges 1196 and 1198 into carbonation chamber 1164 and flavor chamber 1170 (as shown in FIG. 20 at third cartridge position 1201")'. Afterward, the user may push on handle 1288 to rotate container holder 1112 to the closed position (shown in FIG. 22). In alternative embodiments, carrier 1214 may be coupled to container holder 1112 so that carrier 1214 is automatically moved by the opening and closing of container holder 1112. Carrier 1214 may be mechanically linked to container holder 1112 by linkages, for example. In alternative embodiments, the movement of carrier 1214 may be automated by controller 1153.

Referring now to the example embodiment shown in FIG. 20, carbonation chamber 1164 may include an access hatch 1168 that can open to permit the deposit of carbon dioxide source 1166 into carbonation chamber 1164 from carbon dioxide cartridge 1196. In some cases, access hatch 1168 may close to seal the carbonation chamber 1164 from carbon dioxide cartridge 1196. Similarly, when a flavor chamber 1170 is present, flavor chamber 1170 may include an access hatch 1174 that can open to permit the deposit of flavor source 1172 into flavor chamber 1170 from flavor cartridge 1198. In some cases, access hatch 1174 may close to seal flavor chamber 1170 from flavor cartridge 1172.

As exemplified in FIG. 20, access hatches 1168 and 1174 are shown as hinged doors. Access hatches 1168 and 1174 may be coupled to a rod 1290 (see FIGS. 21 and 22).

Referring now to FIGS. 21 and 22, as exemplified in these figures, rod 1290 can rotate counterclockwise to open access hatches 1168 and 1174, and can rotate clockwise to close access hatches 1168 and 1174 (access hatches 1168 and 1174 are shown in FIG. 20, but are not shown in FIGS. 21 and 22).

In the example embodiment shown in FIGS. 21 and 22, rod 1290 (shown as extending into the page) is coupled to lever arms 1292 and 1294. As exemplified, when carrier 1214 moves from the position shown in FIG. 21 as to the left, carrier 1214 may urge lever arm 1292 to the left (from the perspective of FIGS. 21 and 22) thereby rotating rod 1290 to open the access hatches 1168 and 1174 (shown in FIG. 20, not shown in FIGS. 21 and 22). This may permit carrier 1214 to cause the access hatches to be opened just before covers 1199 of cartridges 1196 and 1198 are pierced, so that once pierced the carbon dioxide source 1166 and flavor source 1172 of cartridges 1196 and 1198 deposit into chambers 1164 and 1170, respectively (as shown by third cartridge position 1201''' in FIG. 20).

In the example embodiment shown in FIGS. 21 and 22, a link 1296 is rotatably connected to container holder 1112 and slidably connected to rail 1298. As exemplified, when container holder 1112 rotates from the open position (shown in FIG. 21) to the closed position (shown in FIG. 22), a first end 1300 of link 1296 may slide along rail 1298 and urge lever arm 1294 to the left (from the perspective of FIGS. 21 and 22) thereby rotating rod 1290 clockwise (from the perspective of FIGS. 21 and 22) to close access hatches 1168 and 1174 (the hatches are shown in FIG. 20, but are not shown in FIGS. 21 and 22). This may permit access hatches 1168 and 1174 to be closed, sealing chambers 1164 and 1170 (shown in FIG. 20), as container holder 1112 is rotated into the closed position, readying chambers 1164 and 1170 for an operational cycle (i.e. at least liquid carbonation) to occur.

Referring back to FIG. 20, in an alternative embodiment, the condition of access hatches 1168, 1174 may be controlled by controller 1153. At some time before carbon dioxide cartridge 1196 (and, if present, flavor cartridge 1198) is pierced by cutters 1210, controller 1153 opens access hatch 1168 of carbonation chamber 1164 (and optionally access hatch 1174 of flavor chamber 1170, if the flavor chamber is present), to permit the contents of cartridges 1196 (and optionally 1198) to be deposited into the corresponding chamber. For example, controller 1153 may open access hatches 1168, 1174 when container 1102 is engaged with carbonator 1104. Alternatively, controller 1153 may open access hatches 1168, 1174 at the end of a previous operation cycle, when container 1102 is disengaged from carbonator 1104 (i.e. before container 1102 is re-engaged with carbonator 1104 and a new operation cycle is started).

Controller 1153 may close access hatches 1168 to carbonation chamber 1164 (and, if present, access hatch 1174 to flavor chamber 1170) upon the expiry of a predetermined time after carbon dioxide cartridge 1196 (and if present, flavor cartridge 1198) is been pierced by cutters 1210. The predetermined time can be selected to correspond with the expected time required for the cartridge contents to deposit into the chambers 1164, 1170. In some cases, controller 1153 waits approximately 5 seconds after cartridges 1196, 1198 have been pierced before closing access hatches 1168, 1174.

Referring again to the example embodiment shown in FIG. 20, carbonator 1104 has a waste reservoir 1230. Some particular liquids and carbon dioxide sources react with one another to produce residual waste products. For example, tap water will react with a mixture of citric acid and sodium bicarbonate to produce a residual slurry waste product, such as, for example, sodium citrate. As illustrated in FIG. 20, waste reservoir 1230 may be located in carbonator 1104 outside of carbonation chamber 1164. Waste reservoir 1230 is at least partially removable from a remaining portion of carbonator 1104 (i.e. the portion of carbonator remaining after waste reservoir 1230 is removed). Waste reservoir 1230 may be a container that is removable from the remainder of carbonator 1104, as shown in FIG. 20. In some embodiments, waste reservoir 1230 is a sliding tray the user can pull at least partially out of carbonator 1104 to access a waste product therein (not shown).

Waste reservoir 1230 may be removed from carbonator 1104 and rinsed or dumped into the trash, then reinserted into carbonator 1104 for reuse. The user may clean and/or empty waste reservoir 1230 after approximately every 5 to 10 carbonation cycles. In some more specific embodiments, the user may clean and/or empty waste reservoir 1230 after approximately 5 cycles. Alternatively, waste reservoir 1230 may be configured to be cleaned out after each carbonation cycle. However, this will vary with the volume of liquid being carbonated per cycle, and the type of liquid and carbon dioxide source used.

In some embodiments, waste reservoir 1230 may be fluidly communicated with a piping system, to allow a waste product to drain from the carbonation chamber 1164 without requiring waste reservoir 1230 to be at least partially removed from carbonator 1104. In some embodiments, carbonation chamber 1164 may be directly connected a piping system (in the absence of waste reservoir 1230) to allow a waste product to be evacuated from the carbonator 1104 by fluid flow. This piping system may tap into a household piping system, for example.

Continuing to refer to FIG. 20, in the example shown, waste reservoir 1230 includes a waste inlet 1232. As shown, waste can be ejected from carbonation chamber 1164 into waste reservoir 1230 through waste inlet 1232.

In cases where a flavor chamber is present (as exemplified in FIG. 20) After access hatches 1168 and 1174 are closed, some residual amount of carbon dioxide source 1166 or flavor source 1172 may remain in carbon dioxide cartridge 1196 and flavor cartridge 1198, respectively. Accordingly, in the example shown in FIGS. 21 and 22, carbonator 1104 includes a drip slide 1302 that can be positioned between transfer mechanism 1200 and chambers 1164 and 1170 to direct dripping residual cartridge contents into a waste reservoir 1230. This may prevent residual carbon dioxide source 1166 and residual flavor source 1172 from dripping onto access hatches 1168 and 1174 of chamber 1164 and 1170 (see FIG. 20) when these access doors are closed. In some cases, residual cartridge contents may drip for approximately 1 minute, during which time drip slide 1302 may be in place to protect the access hatches from the dripping residual cartridge contents.

In the example embodiment shown in FIGS. 20 and 21, a link 1304 couples drip slide 1302 to lever arm 1292. As shown in FIG. 21 and discussed above, when container holder 1112 is moved to the closed position, rod 1290 rotates to close access hatches 1168 and 1174 (access hatches are shown in FIG. 20). Rotating rod 1290 to close the access hatches (counterclockwise in the example of FIGS. 21 and 22) moves lever arm 1292 and link 1304, and drip slide 1302 moves to the right (from the perspective of FIGS. 21 and 22), and thereby positions drip slide 1302 between transfer mechanism 1200 and chambers 1164 and 1170. Accordingly, in the example embodiment shown in FIGS. 21 and 22, the closure of access hatches 1168 and 1174 (shown in FIG. 20), is coordinated with the movement of drip slide 1302 into position between transfer mechanism 1200 and chambers 1164 and 1170. Drip slide 1302 may be positioned between transfer mechanism 1200 and chambers 1164 and 1170 before access hatches 1168 and 1174 (FIG. 20) are closed so that residue does not drip onto the access hatches.

Referring again to FIG. 20, carbonator outlet port 1128 may be disengaged from container outlet valve 1124 after the carbonation cycle is complete, exposing carbonator outlet port 1128 to atmospheric air. In this condition, pump 1150 can be activated to draw atmospheric air into carbonation chamber 1164 to eject the waste therein into waste reservoir 1230. In some embodiments, atmospheric air is pumped through carbonation chamber 1164 into waste reservoir 1230 for approximately 15 seconds. In some embodiments, atmospheric air is pumped through carbonation chamber 1164 for approximately 5 to 15 seconds.

Continuing to refer to the example embodiment shown in FIG. 20, beverage carbonation system 1100 optionally has a removable filter 1250 located in a filter chamber 1252. As exemplified, filter chamber 1252 contains a removable filter 1250 in fluid communication with container chamber 1122 to filter liquid 1106. In some cases, the user needs to replace the removable filter approximately every 50 filtration cycles.

In the example embodiment shown in FIG. 20, filter chamber 1252 is located between pump 1150 and carbonator outlet port 1128. As exemplified, all fluid (liquid and/or gas) that is drawn from container chamber 1122 into carbonator 1104 flows through, and is filtered by, filter 1250.

In alternative embodiments, filter chamber 1252 may be differently located so that fluid from filter chamber 1252 can be optionally filtered. In such embodiments, the filtering process may start before or after carbonating liquid 1106. It will be appreciated that if the filtration process starts before the carbonation process, the liquid 1106 that passes through the filter is the original, uncarbonated liquid 1106. However, if the filtering process starts after the carbonation process, the liquid that passes through the filter is at least partially carbonated. Preferably, liquid 1106 is filtered before it is carbonated. Alternatively, the carbonated liquid may be subsequently filtered. However, if carbonated liquid is filtered, it is preferred to run the carbonated liquid thorough the filter at an elevated pressure. At lower pressures, the filter may undesirably remove some carbonation from the carbonated liquid. In some embodiments, In some embodiments, the filtering process lasts for approximately 20 to 60 seconds. The timing for the filtering process may vary depending on the quality of filtering desired and the speed of pump 1150, for example.

The operation of beverage carbonation system 1100 will now be described in greater detail. FIG. 21 shows beverage carbonation system 1100 with container holder 1112 in the open position. With container holder 1112 in the open position, container 1102 can be disengaged from carbonator 1104, and closure 1110 removed to fill container 1102 with a liquid 1106 of choice up to fill line 1192. Afterwards, closure 1110 can be replaced onto mouth 1108 of container 1102, and container 1102 can be replaced onto container holder 1112.

In the example shown in FIG. 21, access is provided to transfer mechanism 1200 to insert carbon dioxide cartridge 1196 (and optionally, flavor cartridge, 1198) when container holder 1112 is rotated about pivot axis 1116 into the open position. In this condition, a user may insert cartridges 1196, 1198 into cavities 1204, 1206 of cartridge holder 1202. Optionally, transfer mechanism 1200 may be located or oriented differently than the example shown so that there is access to insert cartridges 1196, 1198 even after container holder 1112 is rotated into the closed position.

FIG. 22 shows transfer mechanism 1200 after cartridges 1196, 1198 have been inverted and pierced by cutters 1210.

Once the cartridges are pierced, the contents of cartridges 1196, 1198 may be deposited into chambers 1164, 1170 respectively (as shown by third cartridge position 1201''' in FIG. 20).

Referring to FIG. 22, start actuator 1151 may be activated to send a signal to controller 1153 to begin the operation cycle. In an alternative embodiment, however, controller 1153 may begin the operation cycle automatically when it detects that at least one cartridge is inserted into cartridge holder 1202, a container 1102 is engaged with container holder 1112, and the container holder 1112 is rotated into the closed position, as exemplified in FIG. 22.

Referring to FIG. 20, controller 1153 may begin by engaging container outlet port 1124 with carbonator outlet port 1128. Referring to FIG. 22, controller 1153 may then activate solenoid 1146 to extend shaft 1147 and urge crown 1142 containing carbonator outlet port 1128 (shown in FIG. 20) into engagement with closure 1110 containing container outlet valve 1124 (shown in FIG. 20).

Referring to FIG. 20, in alternative embodiments, carbonator outlet port 1128 may engage with container outlet valve 1124 absent a signal from controller 1153.

Referring to FIG. 22, lever 1144 may be manually operable (e.g. by a user) to engage crown 1142 with closure 1110. In another embodiment, a mechanical linkage (not shown) rotates lever 1144 and moves crown 1142 into engagement with closure 1110 in response to the rotation of container holder 1112 into the closed position, for example.

Referring to FIG. 20, container inlet valve 1126 may automatically engage carbonator inlet port 1130 when container 1102 is inserted into container holder 1112. However, in alternative embodiments, controller 1153 activates an actuator (not shown) to move carbonator inlet port 1130 (ex. generally upwardly) into engagement with container inlet valve 1126.

Continuing to refer to FIG. 20, after container 1102 is engaged with carbonator 1104 (i.e. carbonator inlet port 1130 is engaged with container inlet valve 1126 and carbonator outlet port 1128 is engaged with container outlet valve 1124) controller 1153 may activate pump 1150 to begin circulating fluid through the system. Controller 1153 may selectively control the open and closed condition of a plurality of solenoid valves to direct the flow of fluids through carbonator 1104. In the example shown schematically in FIG. 20, carbonator 1104 includes four valves: a filter solenoid valve 1254, a cartridge solenoid valve 1256, a container solenoid valve 1258 and a waste solenoid valve 1260. Each solenoid valve may be one of any suitable type of valve, including, but limited to, a directional control valve, a diaphragm valve, or a pinch valve. Although system 1100 is shown including four solenoid valves, alternative embodiments may include more or less valves.

Continuing to refer to the example embodiment shown in FIG. 20, in embodiments including filter chamber 1252, controller 1153 may begin by configuring a filtration cycle including a fluid connection between container chamber 1122, filter chamber 1252, and pump 1150. In the example shown schematically in FIG. 20, controller 1153 opens filter solenoid valve 1254 and closes all of the other solenoid valves 1256, 1258 and 1260. In this configuration, a fluid connection is formed including line 1178, line 1262, line 1264 and line 1266. As exemplified, liquid 1106 may flow into carbonation tube 1186, through container outlet valve 1124, carbonator outlet port 1128, line 1178, filter chamber 1252, line 1262, pump 1150, line 1264, solenoid valve 1254, line 1266, container inlet valve 1126 and re-enter container chamber 1122, filtered.

Controller 1153 may continue the filtration cycle for a predetermined period of time. Alternatively, controller 1153 continues the filtration cycle until a stop filtration actuator (not shown) is activated (e.g. manually by a user).

In some embodiments, after the filtration cycle is complete (if system 1100 includes a filter chamber 1252), controller 1153 continues with the carbonation cycle.

In the example embodiment shown in FIG. 20, controller 1153 configures a carbonation cycle including at least container chamber 1122, pump 1150 and carbonation chamber 1164. In the example shown in FIG. 20, controller 1153 opens cartridge solenoid valve 1256 and container solenoid valve 1258, and closes the other solenoid valves 1254 and 1260. In this configuration, a fluid connection is formed including line 1178, line 1262, line 1264, line 1180, line 1268 and line 1266.

As exemplified, initially, liquid 1106 flows from container chamber 1122 into carbonation tube 1186, through container outlet valve 1124, carbonator outlet port 1128, line 1178, filter chamber 1252, line 1262, pump 1150, line 1264, solenoid valve 1256, line 1180 and then into carbonation chamber 1164.

As exemplified, as liquid enters carbonation chamber 1164, it mixes with carbon dioxide source 1166 to produce carbon dioxide gas. In some embodiments, liquid 1106 may be delivered to carbonation chamber 1164 for approximately 5 to 15 seconds. In the embodiment shown in FIG. 20, the carbon dioxide gas flows into flavor chamber 1170 though chamber aperture 1176 in chamber wall 1175. In this embodiment, the carbon dioxide gas pressurized in carbonation chamber 1164 travels into and through the flavor chamber to force flavor source 1172 in flavor chamber 1170 into container 1102. As carbon dioxide gas is generated in carbonation chamber 1164, the pressure inside of flavor chamber 1170 rises ejecting flavor source 1172 out of flavor chamber 1170 and into container chamber 1122 via container inlet valve 1126. The carbon dioxide gas also exits flavor chamber 1170 and flows into container chamber 1122 through container inlet valve 1126. The flavoring and carbon dioxide is thereby transferred into container 1102, to flavor and carbonate liquid 1106 in the container.

In some cases, liquid 1106 will cease to flow from container chamber 1122 when the water level inside container chamber 1122 is level with first end 1188 of carbonation tube 1186. Afterward, gas from headspace 1194 instead of liquid 1106 may be drawn through first end 1188 of carbonation tube 1186. The gaseous flow may enter flavor chamber 1170 and augment the pressure provided by the carbon dioxide gas. This may accelerate the transfer of flavor source 1172 and carbon dioxide gas from flavor chamber 1170 to container chamber 1122. The transfer of carbon dioxide gas from headspace 1194 out of container chamber 1122, through carbonation chamber 1164 and back to container chamber 1122. In some embodiments, this circulation of carbon dioxide gas takes approximately 30 to 120 seconds. In some cases, the circulation of carbon dioxide gas occurs almost simultaneously (or after a short delay) from the time that liquid 1106 is drawn from container 1102 to react with carbon dioxide source 1166 in carbonation chamber 1164. In some cases, liquid 1106 is transferred from container 1102 to carbonation chamber 1164 for approximately 5 to 15 seconds. It will be appreciated that there may some overlap between the liquid carbonation cycle (which may be 5 to 15 seconds, for example) and the portion of the carbonation cycle involving the recirculation of carbon dioxide gas from headspace 1194 (which may be 30 to 120 seconds, for example).

In the embodiment shown in FIG. 20, flavor source 1172 that enters container chamber 1122 through container inlet valve 1126 mixes with liquid 1106 to produce a flavored liquid. Similarly, carbon dioxide gas that enters container chamber 1122 through container inlet valve 1126 bubbles (optionally, generally upwardly) through liquid 1106, diffusing into liquid 1106 to produce a carbonated liquid.

Some carbon dioxide gas may not diffuse into liquid 1106 before it rises into headspace 1194. At least some of this carbon dioxide gas may subsequently drawn in through carbonation tube 1186 and re-enter container chamber 1122 through container inlet valve 1126. Recirculating the undiffused carbon dioxide gas in headspace 1194 may accelerate the carbonation cycle, thereby reducing the time required to carbonate liquid 1106 to the desired level.

For the embodiment shown in FIG. 20, during the carbonation cycle, the system pressure rises as carbon dioxide gas is generated by flavor source 1172. Carbonator 1104 may include a pressure relief valve (not shown) to prevent the system pressure from rising to unsafe levels. For example, the pressure relief valve may be configured to open when the pressure rises to approximately 70 psi to 80 psi. In some embodiments, the pressure relief valve may be configured to open when the pressure rises above 70 psi. In more specific embodiments, the pressure relief valve may be configured to open when the pressure rises above 80 psi. The pressure at which the pressure relief valve opens may vary depending on the strength of material used for shell 1120 of container 1102 (such as, but not limited to, glass or plastic).

Controller 1153 may end the carbonation cycle after a predetermined time period. Optionally, controller 1153 ends the carbonation cycle after approximately 30 to 120 seconds. Generally, the predetermined time period can correspond to an estimated time required to diffuse an optimal volume of carbon dioxide gas into liquid 1106 inside of container chamber 1122. Accordingly, the predetermined time period can vary according to the volume of liquid 1106 inside of container chamber 1122, the flow rate of pump 1150 and the potency of carbon dioxide source 1166 to produce carbon dioxide gas.

Continuing to refer to FIG. 20, when the carbonation cycle ends, controller 1153 may configure a waste evacuation cycle including carbonation chamber 1164 and waste reservoir 1230. In the example shown in FIG. 20, controller 1153 may close container solenoid valve 1258 and open waste solenoid valve 1260 so that cartridge solenoid valve 1256 and waste solenoid valve 1260 are the only open valves. In this case, the pressure differential present in the system can passively force at least some (preferably a substantial amount) of residual carbon dioxide source waste in carbonation chamber 1164 into waste reservoir 1230 through waste inlet 1232.

In cases where a filter chamber 1252, carbonation chamber 1164, flavor chamber 1170 and waste reservoir are present (as exemplified in FIG. 20), the entire filtering, carbonation, flavoring and waste evacuation process may take approximately 70 to 210 seconds. In more specific embodiments, the entire process may take approximately 120 to 180 seconds. It will be appreciated that the timing of the entire process may vary in accordance with, for example, the quality of filtering desired, the speed of pump 1150, level of carbonation desired, volume of the system to be pressurized, the temperature of liquid 1106, the type of carbon dioxide source 1166 and the type of flavor source 1172.

Continuing this example with reference to FIG. 20, controller 1153 may cause carbonator outlet port 1128 to disengage from container outlet valve 1124 to expose carbonator outlet port 1128 to external air. In the exemplified embodiment, a fluid connection is formed between atmospheric air, line 1178, filter chamber 1252, line 1262, pump 1150, line 1264, cartridge solenoid valve 1256, line 1180, carbonation chamber 1164, line 1270, waste solenoid valve 1260, line 1272 and waste reservoir 1230. In some cases, the disengagement of carbonator outlet port 1128 and container outlet valve 1124 may occur after the pressure differential is used to passively force at least some (preferably a substantial amount) of residual carbon dioxide waste into waste reservoir 1230. In these cases, when the carbonator outlet port and container inlet valve are disengaged, pump 1150 may be activated to facilitate the flow of external air from carbonator outlet port 1128 into carbonation chamber 1164 to eject remaining residual carbon dioxide source waste in carbonation chamber 1164 into waste reservoir 1230 through waste inlet 1232.

Optionally, controller 1153 stops the waste evacuation cycle after a predetermined time period, such as 10 seconds for example. Optionally, controller 1153 stops the waste evacuation cycle after a flow sensor (not shown) detects there is no more waste flowing from carbonation chamber 1164 to waste reservoir 1230. Optionally, when a stop actuator (not shown) is depressed, a signal is sent to controller 1153 to stop the waste evacuation cycle.

Optionally, waste reservoir 1230 is removable to empty the waste collected therein. Waste reservoir 1230 is sized to hold waste from approximately 5 to 10 carbonation cycles. More specifically, waste reservoir 1230 may be sized to hold waste from approximately 5 carbonation cycles.

Continuing to refer to FIG. 20, container 1102 may be removed from carbonator 1104 after the waste evacuation cycle has finished. Referring to FIG. 21, container holder 1112 may be unlocked automatically by controller 1153 or manually by a user to permit container holder 1112 to rotate to the open position. Referring to FIGS. 20 and 22, in some cases, carbonator outlet port 1128 is in connected to crown 1142 and carbonator outlet port 1128 engages container 1102 to temporarily prevent container 1102 from being removed from container holder 1112. When container 1102 is removed from container holder 1112, carbonator inlet port 1130 may disengage container inlet valve 1126 and container inlet port 1126 automatically closes. Container 1102 seals the carbonated (and optionally flavored) beverage from the exterior to prevent the beverage from losing carbonation and going "flat". The beverage can be stored for a prolonged period with minimal loss of carbonation. Closure 1110 can be removed when a user is ready to consume the beverage.

Referring to FIG. 21, with container holder 1112 in the open position, a user can manually pull on carrier 1214 to rotate cartridge holder 1202 and cartridges 1196 and 1198 to face generally upwardly. Alternatively, the movement of carrier 1214 may be automated. Afterward, the expended cartridges 1196, 1198 can be removed from cartridge holder 1202 and disposed by trash (or recycled). Optionally, cartridges 1196, 1198 can be cleaned, refilled, resealed and reused.

Figure 31:
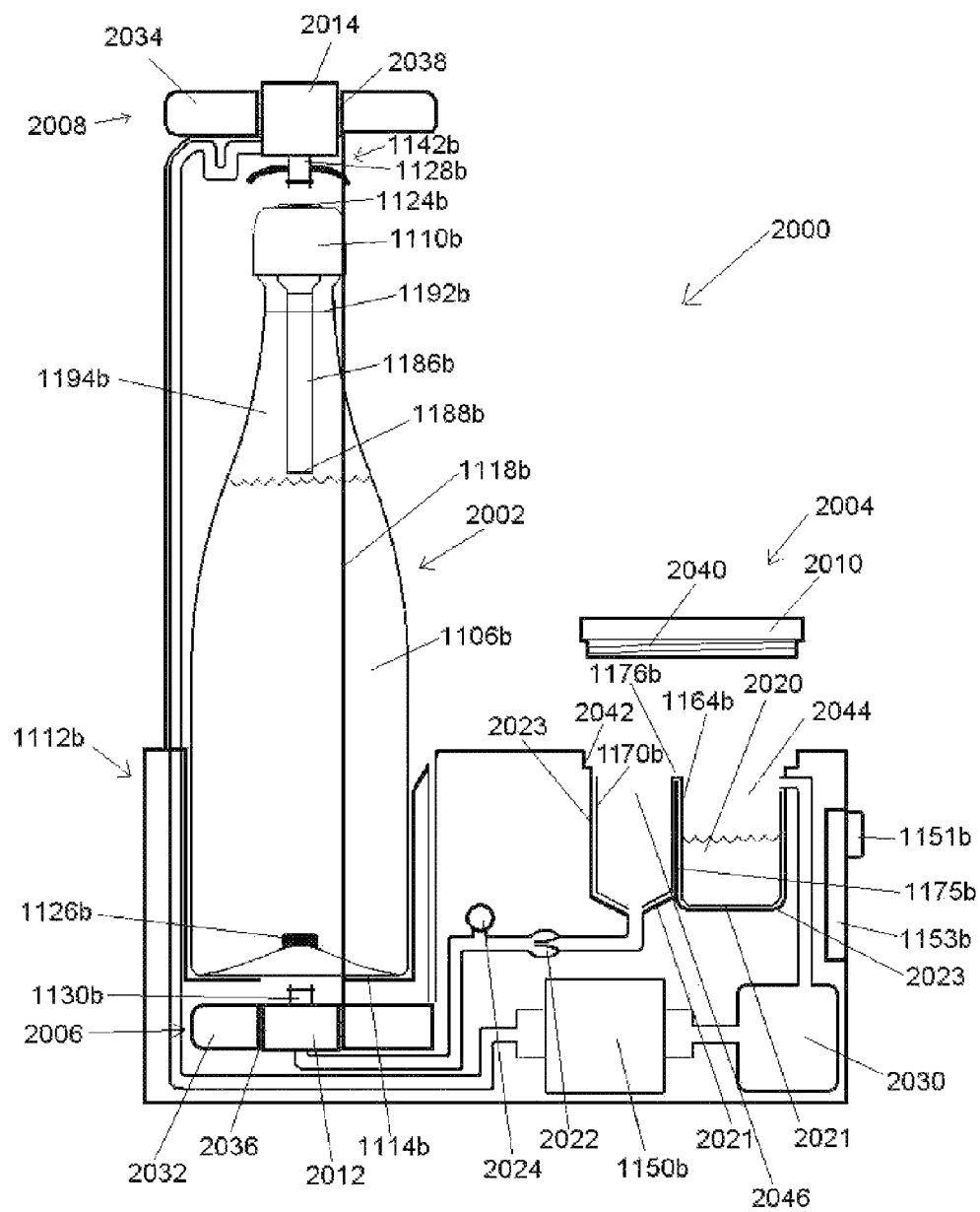
FIG. 31 is a cut-away side view of another beverage carbonation system, with a chamber lid removed from the remainder of the carbonator, in accordance with at least one embodiment.

Reference is now made to FIG. 31, which shows a schematic of yet another example embodiment of a beverage carbonation system 2000. In the example shown, beverage carbonation system 2000 includes container 2002 and carbonator 2004.

In at least some examples, container 2002 has one or more features that are generally analogous to those of container 1102 described above in connection with beverage carbonation system 1100 (shown in FIGS. 20 to 22, for example). Those elements of container 2002 labeled by a reference numeral suffixed "b", are in at least some embodiments analogous to the corresponding element of container 1102 labeled by the same reference numeral (without the suffix "b").

In at least some examples, carbonator 2004 has one or more features that are generally analogous to those of carbonator 1104. Those elements of carbonator 2004 labeled by a reference numeral suffixed "b", are in at least some embodiments analogous to the corresponding element of carbonator 1104 labeled by the same reference numeral (without the suffix "b").

In the example shown in FIG. 31, container 2002 is removably engageable with carbonator 2004. As shown, carbonator 2004 includes a container holder 1112b for receiving at least a portion of container 2002. Carbonator 2004 may be sized to receive base 1114b of container 2002. Optionally, carbonator 2004 includes a barrier 1118b for protecting the user from, for example, a damaged container 2002 exploding under pressure. In some cases, barrier 1118b is moved to an open position to insert container into container holder 1112b, and afterwards moved to a closed position. In some embodiments, container 2002 is positionable behind barrier 1118b without moving barrier 1118b.

As exemplified in FIG. 31, carbonator 2004 includes carbonator inlet port 1130b removably engageable with container inlet valve 1126b, and carbonator outlet port 1128b removably engageable with container outlet valve 1124b. In at least some cases, when a carbonator port and a container valve are engaged with one another, they become fluidly coupled and thereby permit fluid (i.e. gas and/or liquid) to flow between container 2002 and carbonator 2004 across the engaged port and valve.

In the example shown in FIG. 31, carbonator inlet port 1130b is located in container holder 1112b, and carbonator outlet port 1128b is located in crown 1142b. Container 2002 is shown including a base 1114b and a removable closure 1110b. As exemplified in FIG. 31, container inlet valve 1126b is located in base 1114b, and container outlet valve 1124b is located in closure 1110b. In alternative embodiments, one or more of carbonator ports 1128b and 1130b is located elsewhere on carbonator 2004, and/or one or more of container valves 1124b and 1126b is located elsewhere on container 2002. In these alternative embodiments, each carbonator port 1128b and 1130b is aligned or alignable to engage with a respective container valve 1124b or 1126b.

The terminology of carbonator "outlet" and "inlet" ports used throughout this disclosure refer to the flow direction of fluid relative to the container (exemplified as container 2002 in FIG. 31). An "outlet port" of the carbonator (exemplified as carbonator outlet port 1128b of carbonator 2004 in FIG. 31) engages an outlet valve of the container (exemplified as container outlet valve 1124b of container 2002 in FIG. 31) and represents a carbonator port that provides fluid flow out of the container. Conversely, an "inlet port" of the carbonator (exemplified as carbonator inlet port 1130b of carbonator 2004 in FIG. 31) engages an inlet valve of the container (exemplified as container inlet valve 1126b of container 2002 in FIG. 31) and represents a carbonator port that provides fluid flow into the container.

Referring to FIG. 31, carbonator 2004 is shown including inlet port actuator 2006 for selectively moving carbonator inlet port 1130b into engagement with container inlet valve 1126b, and outlet port actuator 2008 for selectively moving carbonator outlet port 1128b into engagement with container outlet valve 1124b. In the example shown, each port actuator 2006 and 2008 includes a respective port holder 2012 or 2014 for holding a respective port 1130b or 1128b. In the example shown, each port holder 2006 and 2008 also includes a respective port driver 2032 or 2034 for driving a respective port holder 2012 or 2014. Each of port drivers 2032 and 2034, as shown, acts upon a respective port holder 2012 or 2014 to selectively move the port 1130b or 1128b held by that port holder 2012 or 2014, respectively, into or out of engagement with a respective valve 1126b or 1124b.

Figure 32:
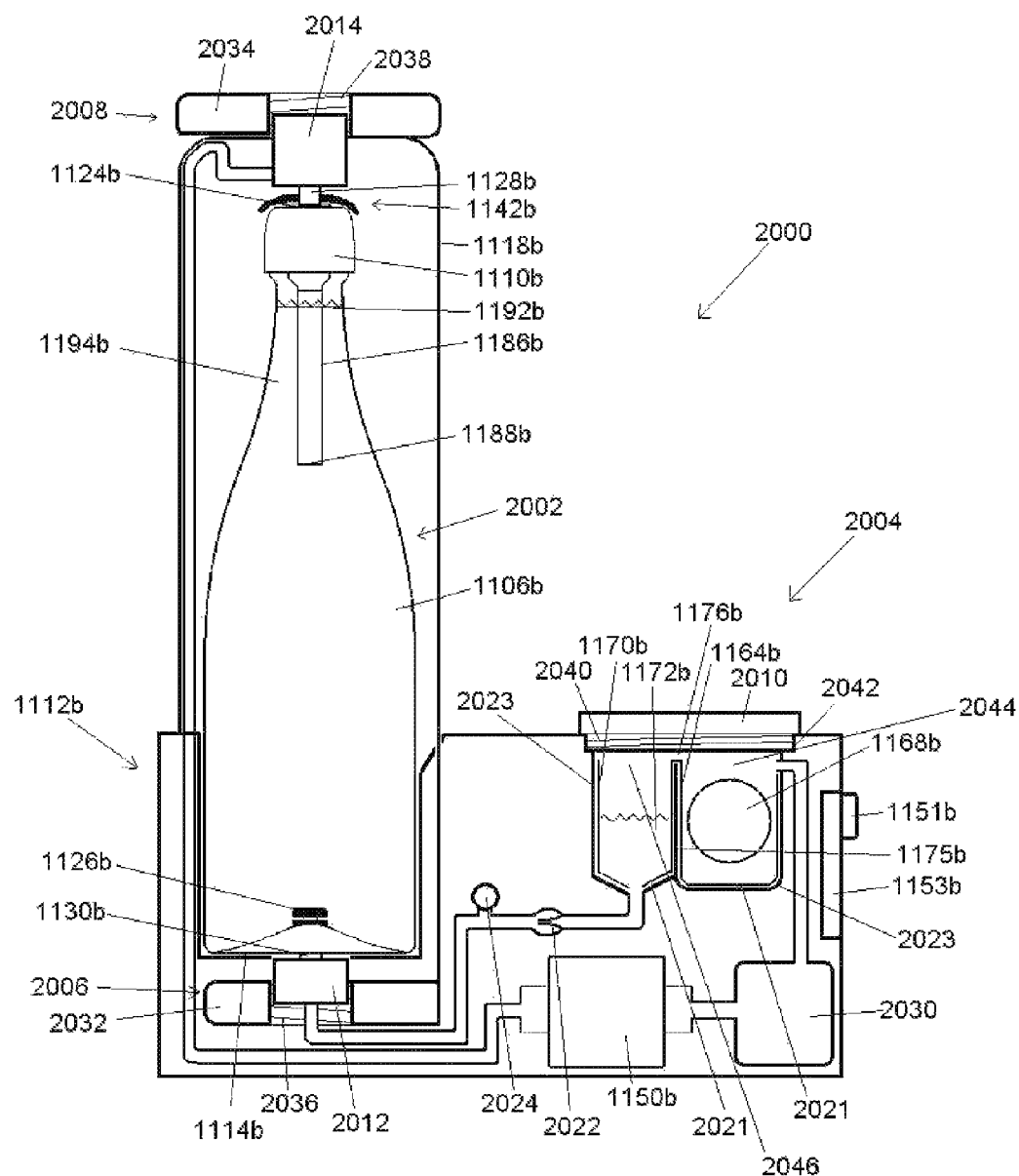
FIG. 32 is a cutaway side view of the beverage carbonation system of FIG. 31, with the chamber lid attached to the remainder of the carbonator, in accordance with at least one embodiment.

In some examples, each of port holders 2012 and 2014 includes external threads which interface with mating threads 2036 or 2038 of a respective port driver 2032 or 2034. In at least some of these examples, each of port drivers 2032 and 2034 can rotate (e.g. manually by a user, or automatically by a motor) their respective threads 2036 or 2038 to move a respective port holder 2012 or 2014 toward a respective valve 1126b or 1124b. FIG. 31 exemplifies port holders 2012 and 2014 moved by a respective port driver 2032 or 2034 to a first position in which the port holder's respective port 1130b or 1128b is disengaged from the port's respective valve 1126b or 1128b. FIG. 32 shows an example of port holders 2012 and 2014 moved by a respective port driver 2032 or 2034 to a second position in which the port holder's respective port 1130b or 1128b is engaged with the port's respective valve 1126b or 1128b.

In alternative embodiments, one or both of port drivers 2032 and 2034 interfaces with respective port holder 2012 or 2014 by other than mating threads. In one example, a port driver (e.g. 2032 or 2034) includes one or more electromagnets which can be selectively activated to attract or repel a respective port holder (e.g. 2012 or 2014). The port holder in this example may include ferromagnetic material (e.g. iron, or nickel) or have a selectively activated electromagnet.

In another example, a port driver (e.g. 2032 or 2034) includes a mechanical linkage (e.g. a pivoting arm activated by a motor, or the depression of a lever) which moves a respective port holder (e.g. 2012 or 2014) to selectively engage or disengage the port held by that port holder (e.g. 1130b or 1128b) with a respective valve (e.g. 1126b or 1124b).

In some embodiments, a port driver and a port holder are integrally formed. Port driver 2034 may be a pivotally mounted lid. In one such example, port holder 2014 is defined by interior walls of an aperture through the lid 2034. Carbonator outlet port 1128b in this example is held by those interior walls, inside that aperture, such that when lid 2034 with port holder 2014 is pivoted, carbonator outlet port 1128b moves toward or away from container outlet valve 1124b.

In some embodiments, carbonator 2004 includes only one port actuator (e.g. 2006 or 2008). In some examples, the actuator's port driver (e.g. 2032 or 2034) may be activated to selectively engage and disengage one or both of carbonator ports 1130b and 1128b with the port's respective container valve 1126b or 1124b. In one such example, carbonator 2004 includes inlet port actuator 2006 with a port driver 2032 that can be activated to move inlet port holder 2012 by a distance sufficient to (i) engage carbonator inlet port 1130b with container inlet valve 1126b, and (ii) raise container 2002 until a stationary carbonator outlet port 1128b engages with container outlet valve 1124b. In some examples, carbonator 2004 includes outlet port actuator 2006. In one such example, carbonator inlet port 1130b is positioned such that the user engages carbonator inlet port 1130b with container inlet valve 1126b by inserting container 2002 into container holder 1112b. Alternatively, carbonator 2004 lowers container 2002 until stationary carbonator inlet port 1130b engages with container inlet valve 1126*b*. Subsequently, outlet port actuator 2006 can be activated to lower outlet port holder 2014 until carbonator outlet port 1128*b* engages with container outlet valve 1124*b*.

Each of port actuators 2006 and 2008 may be manually or automatically activated. In one example (not shown), port driver 2034 of port actuator 2008 is rotatable by hand to manually move port holder 2014 and port 1128*b* toward or away from container outlet valve 1124*b*. In alternative examples, one or both of port actuators 2006 and 2008 is electrically activated (e.g. by motor or electromagnet).

In some embodiments, port actuators 2006 and 2008 are activated in direct response to a user action (e.g. manually rotating port driver 2034, or depressing a special purpose button), or collaterally activated as part of a mechanical and/or electrical sequence of events. In one example of a collateral activation, closing barrier 1118*b* with container 2002 in container holder 1112*b* completes an electrical circuit which powers one or both of port actuators 2006 and 2008 to move their respective port holder 2012 or 2014 to engage the port 1130*b* or 1128*b* held by that port holder 2012 or 2014 with the port's respective valve 1126*b* or 1124*b*. In an alternative example, closing barrier 1118*b* is detected by a sensor communicatively coupled to controller 1153*b*, and in response controller 1153*b* sends a signal to activate one or both of port actuators 2006 and 2008. In another example, inserting container 2002 into container holder 1112*b* is detected by a sensor communicatively coupled to controller 1153*b*, which in response both closes barrier 1118*b* and activates one or both of port actuators 2006 and 2008 (e.g. simultaneous, or in sequence).

Continuing to refer to FIG. 31, in one example, a user of at least one embodiment of beverage carbonation system 2000 fills container 2002 with a liquid 1106*b* through container mouth 1108*b*, and then seals mouth 1108*b* with container closure 1110*b*. In this example, the filled container 2002 is placed into container holder 1112*b*, and each of carbonator ports 1128*b* and 1130*b* are engaged with a respective container valve 1124*b* or 1126*b*. Continuing with this example, after engaging the carbonator ports and container valves, liquid 1106*b* in container 2002 is carbonated and optionally flavored by circulating fluid (e.g. liquid 1106*b*, flavor source, and generated carbon dioxide) through carbonator 2004 and container 2002. Finally, the user in this example disengages container 2002 from carbonator 2004 to obtain a sealed container 2002 containing a flavored and/or carbonated liquid 1106*b* for immediate or deferred consumption.

Referring to FIG. 31, carbonator 2004 is shown including a flavor chamber 1170*b*, and a carbonation chamber 1164*b*. In some examples, carbonator 2004 includes carbonation chamber 1164*b* but does not include flavor chamber 1170*b*. As shown, flavor chamber 1170*b* and carbonation chamber 1164*b* are fluidly coupled to carbonator inlet and outlet ports 1128*b* and 1130*b*. Engaging each of carbonator ports 1128*b* and 1130*b* with a respective container valve 1124*b* and 1126*b*, may permit fluid (i.e. gas and/or liquid) to be circulated between container 2002 and carbonator 2004 through flavor chamber 1170*b* and carbonation chamber 1164*b*.

Referring now to FIGS. 31 and 32, carbonator 2004 is shown including a chamber lid 2010. Generally, chamber lid 2010 is sized and positionable to seal an opening 2042 to flavor chamber 1170*b* and carbonation chamber 1164*b*. In at least some examples, chamber lid 2010 is selectively positionable in the open position, in which the flavor and carbonation chambers 1170*b* and 1164*b* are uncovered, or in the closed position, in which chamber lid 2010 seals the flavor and carbonation chambers 1170*b* and 1164*b* from the outside atmosphere. FIG. 31 shows an example of chamber lid 2010 in an open position. FIG. 32 shows an example of chamber lid 2010 in a closed position. In various examples, carbonator 2004 can have one chamber lid 2010 as shown sized to cover both chambers 1170*b* and 1164*b*, or a separate chamber lid (not shown) for each of chambers 1170*b* and 1164*b*.

As exemplified in FIGS. 31 and 32, carbonator 2004 may have one or more retention members which act to secure chamber lid 2010 in the closed position. The retention member(s) are in some examples located on chamber lid 2010, in some examples located other than on chamber lid 2010, and in still other examples located on both chamber lid 2010 and other than chamber lid 2010. Chamber lid 2010 is shown including retention members 2040, which are threads that cooperate with opening 2042. In some examples, opening 2042 also includes retention members, such as mating threads. In use, the user can twist chamber lid 2010 to seal chambers 1170*b* and 1164*b*, or to remove chamber lid 2010 and gain access to chambers 1170*b* and 1164*b*. In other examples, the retentive members include one or more of snaps, clips, clamps, buckles, straps, magnets, thumbscrews and any other suitable retentive members. In some examples, the retentive members include a four-prong screw thread (e.g. like a gas cap).

In some embodiments, carbonator 2004 includes one or more gaskets (e.g. an O-ring) to help chamber lid 2010 form a gas-tight seal when in the closed position. In some embodiments, chamber lid 2010 is tethered to the remainder of carbonator 2004 by, for example, a rope, chain, length of fabric, or mechanical linkage. In some examples, a collateral action is triggered when, for example, closing or opening chamber lid 2010 moves a button, triggers a sensor, or completes an electric circuit. In these examples, the collateral action can be, for example, closing barrier 1118*b*, activating one or more of port actuators 2006 and 2008, or starting or stopping the carbonation cycle.

Referring now to FIG. 32, carbonator 2004 is shown including a pump 1150*b*. As shown, pump 1150*b* is fluidly coupled to carbonator outlet port 1128*b*, chambers 1170*b* and 1164*b*, and carbonator inlet port 1130*b*. When container 2002 is fluidly engaged with carbonator 2004, pump 1150*b* in the example shown may pump fluids (i.e. gas and/or liquid) from container 2002, through carbonator outlet port 1128*b*, through chambers 1170*b* and 1164*b* and back into container 2002 through carbonator inlet port 1130*b*. Pump 1150*b* in this example can pump both fluids and liquids. However, in alternative embodiments, carbonator 2004 includes separate pumps for pumping liquid and gas.

In one example, a user of at least one embodiment of beverage carbonation system 2000 can fill container 2002 with liquid 1106*b* to fill line 1192*b* above first end 1188*b* of carbonation tube 1186*b*, and then engage container 2002 with carbonator 2004.

Continuing to refer to FIG. 32, the user may deposit flavor source 1172*b* into flavor chamber 1170*b*, and carbon dioxide source 1168*b* into carbonation chamber 1164*b*. In some cases, the user pours or places each of flavor source 1172*b* and carbon dioxide source 1168*b* from a multi-use container or a single-use package into a respective chamber 1170*b* or 1164*b*. In other cases, the user may insert a flavor source cartridge containing flavor source 1172*b* into flavor chamber 1170*b*, and a carbon dioxide source cartridge container carbon dioxide source 1168*b* into carbonation chamber 1164*b*. After depositing flavor source 1172*b* and carbon dioxide source 1168*b*, the user moves chamber lid 2010 into the closed position. In at least some examples, closing chamber lid 2010 seals flavor chamber 1170*b* and carbonation chamber 1164*b* from the outside atmosphere.

Continuing to refer to the example shown in FIG. 32, the user may start pump 1150*b* after the flavor source 1172*b* and carbon dioxide source 1168*b* are deposited into their respective chambers 1170*b* and 1164*b*. In some cases, carbonator 2004 includes start actuator 1151*b* coupled to a controller 1153*b*. In this case, the user may start pump 1150*b* by pressing start actuator 1151*b* which sends a signal to controller 1153*b* to begin the carbonation cycle which may begin by starting pump 1150*b*. In alternative embodiments, the activation of pump 1150*b* is triggered by another process, such as closing chamber lid 2010, closing barrier 1118*b*, or fluidly engaging container 2002 with carbonator 2004. In some examples, when one or more of these processes is detected by controller 1153*b*, controller 1153*b* starts the carbonation cycle, which may begin with starting pump 1150*b*.

As exemplified in FIG. 32, pump 1150*b* pumps liquid 1106*b* through carbonation tube 1186*b* and carbonator outlet port 1128*b* into carbonation chamber 1164*b* until the liquid level inside container 2002 falls below carbonation tube 1186*b*. In some examples, approximately 30 mL of liquid 1106*b* is pumped into carbonation chamber 1164*b*. As described in connection with beverage carbonation system 1100, when liquid 1106*b* contacts carbon dioxide source 1168*b* they react to form carbon dioxide gas ($CO_2$).

In at least some examples, pump 1150*b* continues pumping gas from container headspace 1194*b* (now vacated of liquid 1106*b* as in FIG. 31) into carbonation chamber 1164*b*, which displaces the carbon dioxide gas generated in carbonation chamber 1164*b*. As exemplified, the displaced carbon dioxide gas flows through a chamber aperture 1176*b* in chamber wall 1175*b* into flavor chamber 1170*b*. In some examples, flavor chamber 1170*b* and carbonation chamber 1164*b* are not separated by a common chamber wall 1175*b*. In such cases, chambers 1164*b* and 1170*b* are otherwise fluidly coupled (e.g. by a conduit) such that gas from carbonation chamber 1164*b* can flow into flavor chamber 1170*b*.

As carbon dioxide gas is generated in carbonation chamber 1164*b*, and pump 1150*b* is optionally running, the pressure downstream of pump 1150*b* to flavor source 1172*b* rises eventually forcing flavor source 1172*b* to evacuate flavor chamber 1170*b* and enter container 2002 through engaged carbonator inlet port 1130*b* and container inlet valve 1126*b*. In some cases, some carbon dioxide gas accompanies flavor source 1172*b* into container 2002. The flavor source 1172*b* may mix with liquid 1106*b* flavoring liquid 1106*b*.

The introduction of flavor source 1172*b* into container 2002 may raise the level of liquid 1106*b* inside of container 2002 above first end 1188*b* of carbonation tube 1186*b*. In at least some embodiments, the volume of liquid 1106*b* that has risen above first end 1188*b* corresponds to the volume of flavor source 1172*b* introduced into container 2002. In at least some examples, pump 1150*b* pumps the volume of liquid 1106*b* above first end 1188*b* into carbonation chamber 1164*b*. In some cases, the new volume of liquid 1106*b* pumped into carbonation chamber 1164*b* accelerates the reaction between liquid 1106*b* and carbon dioxide source 1168*b*, thereby increasing the rate of carbon dioxide formation in carbonation chamber 1164*b*.

Continuing to refer to the example shown in FIG. 32, carbon dioxide gas continues to form in carbonation chamber 1164*b*, and pump 1150*b* continues to pump carbon dioxide from carbonation chamber 1164*b* into container 2002, and to recirculate gas (i.e. a mixture of air and carbon dioxide) from headspace 1194*b* back into container 2002. In some examples, this carbonation process continues for a predetermined duration, or until a predetermined carbonation level is detected (e.g. when controller 1153*b* detects a predetermined system pressure level). In some cases, the user may manually end the process. Generally, when pump 1150*b* is turned off, the carbonation process is terminated.

When the carbonation process is complete, the user may disengage container 2002 from carbonator 2004. Disengaging container 2002, in some examples, exposes carbonator ports 1128*b* and 1130*b* to atmospheric air thereby depressurizing carbonator 2004. In some examples, disengaging container 2002 from carbonator 2004 includes activating port actuators 2006 and 2008 either manually or automatically, and either directly (e.g. by special purpose button) or collaterally (e.g. in response to opening chamber lid 2010). In at least some examples, container 2002 remains sealed after disengagement and contains a carbonated and optionally flavored liquid 1106*b* for immediate or deferred consumption.

Referring back to FIG. 31, after the carbonation process is complete, chamber lid 2010 may be manually or automatically moved to the open position. FIG. 31 shows beverage carbonation system 2000 after the carbonation process is complete with container 2002 disengaged from carbonator 2004 and chamber lid 2010 in the open position, in accordance with at least one embodiment. In some examples, when chamber lid 2010 is in the open position, the user may access one or both of flavor chamber 1170*b*, to clean out any flavor source residue (e.g. syrup or powder), and carbonation chamber 1164*b*, to clean out waste 2020.

The composition of waste 2020 depends on liquid 1106*b* and carbon dioxide source 1168*b* which reacted to form carbon dioxide. In some examples, waste 2020 is a liquid or a slurry. In at least some embodiments, one or both of chambers 1170*b* and 1164*b* contains a liner 2021 that can be removed for cleaning (e.g. at a sink) or disposal (e.g. into the garbage, recycling or compost) and then replaced. In at least some examples, the liner is disposable and is replaceable with a new liner. Alternatively or in addition, chambers 1170*b* and 1164*b* optionally include fixed reinforced (e.g. thicker or ribbed) walls 2023 upon which the internal gas pressures bear.

In some examples, pump 1150*b*, or another pump, is coupled to a liquid reservoir for providing the initial fill of liquid 1106*b* to container 2002. In these examples, container 2002 may be inserted into container holder 1112*b* and engaged with carbonator 2004 while empty, and the pump will fill container 2002 with a predetermined quantity of liquid from the reservoir. This may ensure that container 2002 is filled to the proper level relative to carbonation tube 1186*b*. In turn, this may provide the desired quantity of liquid 1106*b* above first end 1188*b* of carbonation tube 1186*b* for pumping into carbonation chamber 1164*b*. In some embodiments, pumping too little liquid 1106*b* into carbonation chamber 1164*b* may result in insufficient carbon dioxide generation, and pumping too much liquid 1106*b* into carbonation chamber 1164*b* may result in waste 2020 overflowing into flavor chamber 1170*b* and possibly being pumped into container 2002.

In the example shown in FIG. 31, carbonator 2004 includes a one-way valve 2022. One-way valve 2022 allows fluid to flow from flavor chamber 1170*b* to carbonator inlet port 1130*b* while preventing fluid from flowing from carbonator inlet port 1130*b* to flavor chamber 1170*b*. In some examples, this may prevent liquid 1106b from container 2002 backing up into flavor chamber 1170b. One-way valve 2022 is in various examples one of a check valve, a duckbill valve, and any other suitable one-way valve.

As exemplified in FIG. 31, carbonator 2004 may include pressure relief valve 2024. In at least some embodiments, pressure relief valve 2024 is configured to open and allow gas to escape to atmosphere when the system pressure rises above a threshold value. This may help to prevent container 2002 and/or other elements of beverage carbonation system 2000 from becoming overpressurized and exploding.

In at least some embodiments, one or both of flavor source 1172b and carbon dioxide source 1168b is a solid tablet. In some examples, carbon dioxide source 1168b is a coin-shaped tablet, a triangular-shaped tablet or a cubical tablet. In some examples, carbon dioxide source 1168b is a plurality of solid tablets.

Referring to FIG. 32, in some embodiments, carbonation chamber 1164b includes an upper wall defining an opening through which carbon dioxide source 1168b may be inserted. Similarly, in some embodiments, flavor chamber 1170b includes an upper wall defining an opening through which flavor source 1172b can be inserted. In at least one embodiment, the opening of one or both of chambers 1164b and 1170b has a size that corresponds with a solid source tablet 1172b or 1168b.

In some embodiments, the openings to flavor chamber 1170b and carbonation chamber 1164b are sized to help prevent a user from accidentally inserting the carbon dioxide source 1168b into flavor chamber 1170b. In one example, carbonation chamber 1164b has opening 2044 sized to permit a carbon dioxide source tablet 1168b to pass therethrough and into carbonation chamber 1164b, and flavor chamber 1170b has an opening 2046 through which flavor source 1172b is receivable therethrough and into flavor chamber 1170b. In some cases, carbon dioxide source tablet 1168b is larger than the opening of flavor chamber 1170b, whereby flavor chamber 1170b blocks the passage of carbon dioxide source tablet 1168b through the opening and into the flavor chamber. In some cases, the opening of carbonation chamber 1164b is larger than the opening of flavor chamber 1170b. In some cases, the opening of flavor chamber 1170b is sized too small for the carbon dioxide source tablet 1168b to pass therethrough. This may prevent the carbon dioxide source tablet 1168b from being inserted into flavor chamber 1170b. In some examples, carbon dioxide source tablet 1168b is thin and generally cylindrical (e.g. like a coin). In one such example, the opening to carbonation chamber 1164b has a diameter that is equal to or greater than the diameter of carbon dioxide source tablet 1168b, and the opening to flavor chamber 1170b has a diameter that is less than the diameter of carbon dioxide source tablet 1168b.

In some embodiments, a carbon dioxide source tablet 1168 may react more slowly with liquid 1106b inside carbonation chamber 1164b than an equal mass of granular or liquid carbon dioxide source 1168b. For example, a carbon dioxide source tablet 1168b may expose less surface area for contact with liquid 1106b than would a granular or liquid carbon dioxide source 1168b.

In some embodiments, carbonator 2004 includes a heater 2030 to heat liquid 1106b. In at least some cases, carbon dioxide source 1168b reacts more quickly upon contact with warmer liquid. In some examples, heater 2030 is positioned to heat liquid 1106b inside of container 2002. However, in many cases, carbon dioxide diffuses more slowly into warmer liquid. Moreover, a user may prefer to consume a cold liquid 1106b upon completion of the carbonation process, which may be frustrated by heater 2030 heating liquid 1106b. Therefore, it may be preferable for heater 2030 to be located, as shown, in the flow path between carbonation outlet port 1128b and carbonation chamber 1164b for heating the small quantity of liquid which is pumped from container 2002 into carbonation chamber 1164b. In the example shown, heater 2030 is downstream of pump 1150b. In alternative embodiments, heater 2030 is upstream of pump 1150b.

As exemplified in FIG. 32, heater 2030 heats liquid 1106b pumped from container 2002 toward carbonation chamber 1164b. In some examples, heater 2030 compensates for a slower rate of reaction of a carbon dioxide source tablet 1168b. In some examples, carbon dioxide source tablet 1168b reacts more quickly with heated liquid and thereby produces carbon dioxide at an equal or faster rate than would an equal mass of powered carbon dioxide source 1168b when contacted by unheated liquid 1106b. In some embodiments, carbon dioxide source 1168b is a plurality of tablets. This may provide carbon dioxide source 1168b with additional surface area for reaction with liquid 1106b and thereby increase the rate of carbon dioxide production. This may also permit smaller or thinner carbon dioxide source tablets 1168b and a correspondingly smaller or thinner opening to carbonation chamber 1164b into which a user may find it even more difficult to pour or insert flavor source 1172b into carbonation chamber 1164b.

The present invention has been described here by way of example only. Various modification and variations may be made to these exemplary embodiments without departing from the spirit and scope of the invention, which is limited only by the appended claims.

I claim:

1. A method of making a carbonated beverage, comprising:
   introducing a liquid into a container;
   sealing the container with a closure;
   engaging the container with a carbonator;
   placing a carbon dioxide source in a carbonation chamber of the carbonator;
   opening a container outlet valve in the container to transfer a portion of the liquid to the carbonation chamber to react with the carbon dioxide source in the carbonation chamber to produce a carbon dioxide gas;
   opening a container inlet valve in the container to transfer the carbon dioxide gas produced by the carbon dioxide source into the container to obtain a carbonated liquid in the container;
   closing the container outlet valve and the container inlet valve to seal the container; and
   disengaging the container from the carbonator.

2. The method of claim 1, further comprising:
   prior to closing the container outlet valve and the container inlet valve to seal the container and disengaging the container from the carbonator
      placing a flavor source in a flavor chamber of the carbonator; and
      transferring the pressurized carbon dioxide gas produced in the carbonation chamber into and through the flavor chamber to transport the flavor source and the carbon dioxide gas to the container inlet valve, wherein
   opening the container inlet valve in the container transfers the carbon dioxide gas produced by the carbon dioxide source and the flavor source into the container to produce a carbonated and flavored liquid in the container.

3. The method of claim 1, further comprising:
heating the portion of the liquid transferring from the container chamber to the carbonation chamber.

4. The method of claim 1, further comprising:
recirculating carbon dioxide gas from a headspace in the container above the liquid into the container inlet valve.

5. The method of claim 1, wherein the carbon dioxide source is a solid material that is chemically reactive with the liquid to emit the carbon dioxide gas when the liquid contacts the carbon dioxide source.

6. The method of claim 5, wherein the solid material comprises a mixture of an acid and a bicarbonate, and the liquid is water.

7. The method of claim 5, wherein the carbon dioxide source is a tablet.

8. The method of claim 1, wherein the carbon dioxide source is reactive with the portion of the liquid to produce residual waste in the carbonation chamber, and the method further comprises ejecting the residual waste from the carbonation chamber into a waste reservoir.

9. A method of making a carbonated beverage, comprising:
generating carbon dioxide gas in a carbonation chamber;
providing a flavor source in a flavor chamber, the flavor chamber in fluid communication with the carbonation chamber and a container of liquid; and
directing the generated carbon dioxide gas from the carbonation chamber into the container via the flavor chamber to carbonate the liquid, the carbon dioxide gas driving the flavor source into the container to flavor the liquid.

10. The method of claim 9, wherein said generating carbon dioxide gas comprises transferring a portion of the liquid from the container to the carbonation chamber.

11. The method of claim 10, wherein said generating carbon dioxide gas further comprises reacting the portion of the liquid with a carbon dioxide source in the carbonation chamber to produce the carbon dioxide gas.

12. The method of claim 10, further comprising heating the portion of the liquid transferring to the carbonation chamber.

13. The method of claim 10, wherein said transferring the portion of the liquid comprises pumping the portion of liquid from an upper portion of the container to the carbonation chamber.

14. The method of claim 9, wherein the carbon dioxide source is a solid material that is chemically reactive with the liquid to emit the carbon dioxide gas when the liquid contacts the carbon dioxide source.

15. The method of claim 14, wherein the solid material comprises a mixture of an acid and a bicarbonate, and the liquid is water.

16. The method of claim 14, wherein the carbon dioxide source is a tablet.

17. The method of claim 9, wherein said directing the carbon dioxide gas into the container comprises directing the carbon dioxide gas into an inlet in a lower portion of the container.

18. The method of claim 17, further comprising:
recirculating carbon dioxide gas from a headspace in the container above the liquid into the inlet.

19. The method of claim 18, further comprising:
detecting a gas pressure in the container; and
discontinuing said recirculating in response to detecting the gas pressure is equal to or greater than a predetermined value.

20. The method of claim 11, wherein said reacting produces residual waste in the carbonation chamber, and the method further comprises ejecting the residual waste from the carbonation chamber into a waste reservoir.

* * * * *